United States Patent [19]
Etoh

[11] Patent Number: 6,157,408
[45] Date of Patent: Dec. 5, 2000

[54] HIGH-SPEED CCD IMAGE TRANSFER APPARATUS

[75] Inventor: Takeharu Etoh, 21-2, Aomatanihigashi 7-chome, Mino-shi, Osaka-fu, Japan

[73] Assignees: Takeharu Etoh; Kinki University, both of Osaka-fu, Japan

[21] Appl. No.: 08/660,214

[22] Filed: Jun. 3, 1996

[30] Foreign Application Priority Data

Jun. 6, 1995 [JP] Japan .................................. 7-139394
Dec. 8, 1995 [JP] Japan .................................. 7-345847
May 21, 1996 [JP] Japan .................................. 8-126034

[51] Int. Cl.⁷ .............................................. H04N 5/335
[52] U.S. Cl. .......................... 348/316; 348/311; 348/337
[58] Field of Search .................................. 348/207, 294, 348/311, 315, 316, 318, 319, 320, 322, 324, 335–339, 756, 343, 757, 344, 779, 780, 781, 782, 786; 359/363; H04N 5/335, 5/225

[56] References Cited

U.S. PATENT DOCUMENTS

| | | | |
|---|---|---|---|
| 3,303,278 | 2/1967 | Beno et al. ............................... | 348/336 |
| 3,333,053 | 7/1967 | Back ........................................ | 348/338 |
| 4,064,533 | 12/1977 | Lampe et al. . | |
| 4,330,796 | 5/1982 | Anagnostopoulos et al. . | |
| 4,685,776 | 8/1987 | Inoue et al. .............................. | 359/363 |
| 4,851,914 | 7/1989 | Pfanhouser et al. .................... | 348/217 |
| 5,221,998 | 6/1993 | Sugahara . | |
| 5,291,294 | 3/1994 | Hirota ..................................... | 348/316 |
| 5,355,165 | 10/1994 | Kosonocky et al. .................... | 348/111 |
| 5,387,935 | 2/1995 | Kobayashi .............................. | 348/316 |
| 5,400,071 | 3/1995 | Yamada .................................. | 348/316 |
| 5,410,349 | 4/1995 | Tanigawa et al. . | |
| 5,600,369 | 2/1997 | Cazaux et al. . | |

FOREIGN PATENT DOCUMENTS

4243116 7/1994 Germany .
4-68876 3/1992 Japan .
5-336420 12/1993 Japan .

OTHER PUBLICATIONS

"The Study of a Photosite For Snapshot Video", by M. Elloumi et al., published at pp. 37–39 of the 21 International Congress On High Speed Photography And Photonics (Aug. 29–Sep. 2, 1994).

"4500 Frames/Sec. High–Speed Video Camera", by Takeharu Etoh, published at pp. 543–545 of vol. 46, No. 5 (1992) of Journal of Television Society.

"A Survey By Questionnaires On Use of High–Speed Image Sensing And A Proposal of A 30,000,000 Frames /Sec Video Camera", by Takeharu Etoh et al., published at pp. 109–112 of Proceedings Of The 1993 Comprehensive Synposium On High–Speed Image Sensing and Photonics (1993).

Primary Examiner—Tuan Ho
Attorney, Agent, or Firm—Greenblum & Bernstein, P.L.C.

[57] ABSTRACT

The photo-receptive area (21) of an image sensor is formed from a plurality of pixels (20) each having a sensor (23) for generating an electric signal in response to a brightness of incident light. To the sensors (23) are connected signal storage/read-out CCDs (24A–24F), respectively, each comprising a plurality of charge storages (25a–25f) and being elongated over two or more of the plurality of pixels (20). A plurality of the linear-shaped signal storage/read-out CCDs (24A–24F) are arranged parallel within a width of each pixel (20). For an image sensing process, electric signals generated in the sensors of the pixels (20) are transferred parallel in one direction by the plurality of signal storage/read-out CCDs (24A–24F), by which the electric signals generated in the sensors are stored in the charge storages (25a–25f) of the signal storage/read-out CCDs (24A–24F). For a signal read process, the electric signals stored in the charge storages (25a–25f) of the signal storage/read-out CCDs (24A–24F) are transferred parallel in the same direction as in the image sensing process, by which the electric signals are read out of the photo-receptive surface (21).

8 Claims, 32 Drawing Sheets

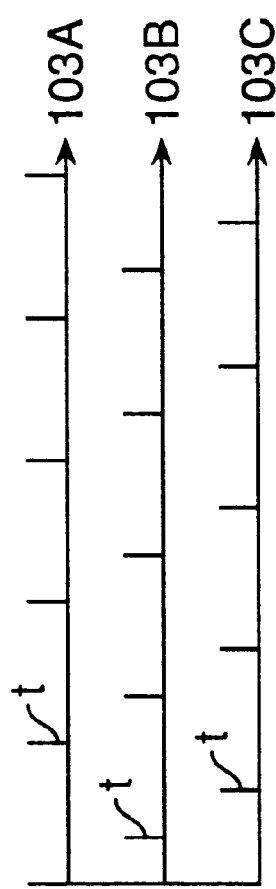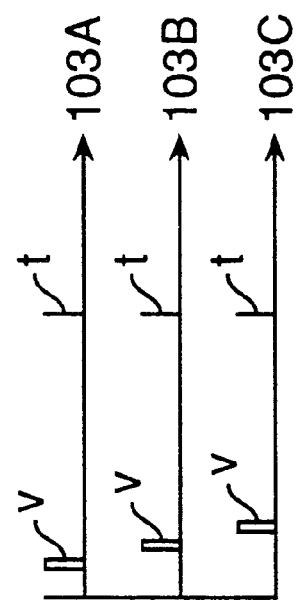

HIGH-SPEED CCD IMAGE TRANSFER APPARATUS

BACKGROUND OF THE INVENTION

1. Field of the Invention

The present invention relates to an image sensing apparatus and, in particular, to an image sensing apparatus capable of high-speed image sensing suitable for scientific measurements such as measurement of ultra-high-speed moving objects like rockets, explosions, destructions, turbulent flows, discharge phenomena, chemical reaction phenomena, and motions of microorganisms under a microscope.

2. Description of the Prior Art

As this type of image sensing apparatus, there has conventionally been known, for example, an image converter type multi-framing camera (hereinafter, referred to as an image converter type camera). The image converter type camera adopts a system that, in an image sensing process in which an image converted into electrons at a photo-receptive area is irradiated onto a fluorescent surface with an electron gun, with the fluorescent surface divided into a plurality of areas, an electron flow is irradiated successively to the plurality of areas so that continuous image frames are displayed on one screen. This image converter type camera, in most cases, has a micro-channel plate type image intensifier (hereinafter, abbreviated as MCP type II) disposed behind the photo-receptive area or before the fluorescent surface, so that incident light is intensified. The frame rate of the image converter type camera is around $3 \times 10^7$ frames/sec., and the number of image frames that can be continuously captured (number of continuous image frames) is 10 or so.

The present inventor has already provided a high-speed video camera comprising an MCP type II, wherein electric signals read in parallel from pixels are serially stored in memory provided outside the image sensor without forming an image, and the signals stored in the memory are formed into the image after the completion of image sensing, thus the video camera being enabled to implement a high-speed image sensing of 4,500 frames/sec. ("4500 frames/sec. high-speed video camera", Takeharu ETOH, the Journal of Television Society, Vol. 46, No. 5, PP. 543–545, 1992, in Japanese).

Further, the present inventor has proposed an image sensing apparatus, in Japanese Patent Laid-Open Publication No. HEI 5-336420, in which a plurality of electric signal storages are provided within each pixel, in which arrangement electric signals generated in a sensor in each pixel in response to brightnesses of incident light are accumulated in the electric signal storages within the pixels during an image sensing process, and read out after the completion of the image sensing process, thus the image sensing apparatus being enabled to implement high-speed image sensing.

Furthermore, as shown in FIGS. 32 and 33, there has been proposed an image sensing apparatus comprising an image sensor in which pixels 2 each having a signal storage CCD (charge coupled device) 1 are arranged in a matrix. The signal storage CCD 1 is folded by being bent four times and provided in a zigzag line within the pixel 2. During an image sensing process, one charge storage 3a out of the nine charge storages 3a to 3i for signal accumulation functions as a sensor that converts incident light into an electric signal, and the electric signal generated in the charge storage 3a is transferred and accumulated sequentially to the other charge storages 3b to 3i. After the completion of image sensing, the electric signals accumulated in the charge storages 3a to 3i of each pixel 2 are read out by signal read-out CCDs 4A, 4B ("THE STUDY OF A PHOTOSITE FOR SNAPSHOT VIDEO"; M. Elloum, E. Fauvet, E. Goujou, P. Gorria, G. Cathebras; 21st International congress on high speed photography and photonics (Aug. 29–Sep. 2, 1994), TECHNICAL PROGRAM & ABSTRACTS).

Further, U.S. Pat. No. 5,355,165, as shown in FIG. 34, describes an image sensing apparatus comprising an image sensor in which each pixel 6 comprises sensor 7 and signal storage CCD 9 having 5×4 charge storages 8, 8, . . . arranged in a matrix. Electric signals generated by the sensors 7 during an image sensing process are first transferred to four charge storages 8 arrayed laterally (in the right-and-left direction) in the figure as indicated by arrow X. Next, with a bend of the direction in which the electric signals are transferred, they are transferred from the four charge storages 8 longitudinally (in the up-and-down direction) in the figure as indicated by arrow Y, thus being stored in the charges storages 8, respectively. During a read-out process, the electric signals stored in the charge storages 8 of the signal storage CCD 9 of each pixel 6 are transferred toward signal read-out CCD 10, longitudinally as indicated by the arrow Y, and further transferred by the signal read-out CCD 10 in the direction as indicated by the arrow X.

Generally, the image sensing apparatus for use of scientific measurement of motions is required to meet two conditions, that is, the capabilities of firstly implementing high-speed image sensing and secondly obtaining a sufficient number of consecutive images, or allowing use as a video camera.

As to the first condition, the present inventor has confirmed, as a result of questionnaires conducted on researchers who are users of image sensing apparatus for scientific measurement, that a frame rate of $10^6$ frames/sec., if obtained, satisfies the demands of most users (over 95%) as shown in FIG. 35 ("A survey by questionnaires on use of high-speed image sensing and a proposal of a 30,000,000 frames/sec. video camera"; Takeharu ETOH, Kohsei TAKEHARA, Midori KAWAJIRI; Proceedings of the 1993 comprehensive symposium on high-speed image sensing and photonics, pp. 109–112, 1993, in Japanese).

As to the second condition, since the reproduction rate of general video cameras is 25 to 30 frames/sec. but the minimum rate that can allow man to recognize a continuous motion is 4 to 5 frames/sec., reproducing 35 to 50 continuous frames at a reproduction rate of 4 to 5 frames/sec. allows a motion image of about 10 seconds to be obtained, although the motion in the image frames lacks in smoothness more or less, in which case the camera can be used as a video camera for scientific measurement use. Like this, image sensing apparatus for scientific measurement to be used as a high-speed video camera are required to be capable of obtaining a frame rate of $10^6$ frames/sec. and of obtaining a minimum number of continuous frames of around 35 to 50.

However, the aforementioned image converter type camera is indeed capable of obtaining a sufficient frame rate, but has a number of continuous frames as small as 10 or so, insufficient for use as a video camera. The image converter type camera also has disadvantages that the system results in large size, and that there occurs relative distortions between one and another of the continuous frames.

With 4,500 frames/sec. high-speed video cameras, as described above, the demand of users for the frame rate could not be satisfied sufficiently.

Further with the image sensing apparatus of Japanese Patent Laid-Open Publication No. HEI 5-336420, since a large number of transistors need to be controlled at one time in order to transfer electric signals to the electric signal storages during image sensing, large power consumption is involved in switching operations and besides noise generated in the switching affects the electric signals.

In an image sensing apparatus comprising the pixels 2 as shown in FIGS. 32 and 33, indeed there will occur neither lacks of intensity of light nor relative distortions between continuous frames, but the number of continuous frames is so low as 9 that the image sensing apparatus cannot be used as a video camera.

Also in this image sensing apparatus, since the charge storages 3a to 3i of the signal storage CCD 1 are arrayed in a zigzag line as described above, the drive circuit for operating the charge storages 3a to 3i of the signal storage CCD 1 becomes complex in construction, as another disadvantage. In more detail, as shown in FIG. 33, since a direction as indicated by arrow X1 in which electric signals are transferred from the charge storage 3a to the charge storage 3c and in which electric signals are transferred from the charge storage 3g to the charge storage 3i is opposite to another direction as indicated by arrow X2 in which electric signals are transferred from the charge storage 3d to the charge storage 3f, it is necessary to apply drive voltages having waveforms symmetrical to each other as shown by V1 and V2. Therefore, it is necessary that an electric wire 5a for applying a drive voltage to the charge storages 3a to 3c and the charge storages 3g to 3i, and an electric wire 5b for applying a drive voltage to the charge storages 3g to 3i are given by separate electric wires, and that the voltages of waveforms as shown by V1 and V2 are applied to the electric wires 5a and 5b, respectively. Besides, since a direction as indicated by arrow Y in which electric signals are transferred from the charge storage 3c to the charge storage 3d and from charge storage 3f to the charge storage 3g is perpendicular to the directions as indicated by X1 and X2, it is necessary to separately provide an electric wire 5c for applying a drive voltage to the charge storages 3d, 3f in addition to the electric wires 5a, 5b.

Further, since the signal storage CCD 1 is in a zigzag line as described before, there are bends in the direction in which electric signals are transferred. Electric signals will remain in the charge storages 3c, 3d, 3f and 3g placed at these bends in the transfer direction, which may cause deterioration of the quality of reproduced image.

Further in this image sensing apparatus, there is a need of providing signal read-out CCDs 4A within the photo-receptive area.

In general, the dimensions of the photo-receptive area of the pixel are about 10 mm×10 mm, whereas the number of pixels cannot be reduced below a certain level for the minimum resolution to be ensured. As a result, the area of one pixel cannot be increased over a certain level. Accordingly, in order to increase the number of signal storage CCDs and charge storages to be disposed within the pixel, it is necessary to simplify the construction within the photo-receptive area as much as possible so that a space for arranging the signal storage CCDs within each pixel is ensured. Therefore, as in the image sensing apparatus shown in FIGS. 32 and 33, if the signal read-outs CCD 4B are disposed within the photo-receptive area and if the drive circuit for the signal storage CCDs is complex, it would be difficult for the number of charge storages of the signal storage CCDs to be around 35 to 50 per pixel even if the dimensions and configuration of the CCDs are modified in various ways. Thus, the number of continuous frames necessary for use as the aforementioned high-speed video camera cannot be obtained.

Adopting the arrangement as shown in FIG. 34 allows the number of charge storages of the signal storage CCD 9 of each pixel 6 to be around 35 to 50 per pixel 6. However, since the electric signal generated in the sensor 7 is transformed first in a direction indicated by arrow X, and then in another direction indicated by arrow Y perpendicular to the X direction, the drive circuit for the signal storage CCD becomes complex as in the image sensing apparatus shown in FIGS. 32 and 33.

Also, since electric signals generated in the sensor 7 are transferred first in the direction as indicated by arrow X and then transferred in the direction as indicated by arrow Y, there are some abrupt bends in the direction in which the electric signal is transferred, as in the case of the arrangement shown in FIGS. 32 and 33. This poses a problem that electric charges will remain in the charge storages 8 placed at these bends, causing deterioration of the quality of reproduced image.

Meanwhile, in another example of this type of image sensing apparatus, as described in Japanese Patent Laid-Open Publication No. HEI 4-68876 filed by the present inventor, the image sensing apparatus comprises a beam split prism for splitting incident light into three, and a filter holder interposed between the emitting portion of the beam split prism and the image sensor, wherein a required filter can be fitted to the filter holders. This image sensing apparatus is enabled to perform color image sensing when a red-light reflecting filter, a green-light reflecting filter, and a blue-light reflecting filter are fitted to the filter holder. Without fitting the filters to the filter holder, if three image sensors are synchronized for image sensing, then a threefold resolution can be obtained as compared with the case of one camera. Further, if an image is captured with phase shifts of three cameras without fitting the filters, continuous frames in sets of three can be obtained and the speed, acceleration, and the like at each time point can be determined.

However, in the apparatus as described in Japanese Patent Laid-Open Publication No. HEI 4-68876, since incident light is split into three, or each one third the quantity of the incident light, fitting RGB filters in this arrangement would cause the intensity of light to be reduced to further one third, such that only one ninth the intensity of light would be reached on each image sensor.

The dichroic prism, on the other hand, selectively reflects red light, green light, and blue light, in which case the problem of lack in the intensity of light is improved. For this image sensing apparatus, however, it is impossible to implement high-resolution image sensing with three image sensors synchronized with one another, or to determine the speed, acceleration, and the like with phase shifts of the three cameras.

SUMMARY OF THE INVENTION

The present invention has been achieved to solve the above-described disadvantages of the image sensing apparatus of the prior art. Accordingly, a first object of the present invention is to provide an image sensing apparatus which is capable of high-speed image sensing enough to meet the demand of users who use image sensing apparatus for scientific measurement and further capable of obtaining a number of continuous image frames enough to make up a motion image so that the image sensing apparatus allows use as a video camera suitable for scientific measurement.

A second object of the present invention is to provide an image sensing apparatus which is capable of performing various types of image sensing such as color image sensing, high-speed image sensing, and high-resolution monochrome image sensing with one image sensing apparatus, and which can simply change the image sensing conditions.

In order to achieve the aforementioned first object, according to the present invention, there is provided an image sensing apparatus comprising an image sensor which comprises:

a plurality of pixels forming a photo-receptive area;

a sensor provided on each pixels, the sensor generating an electric signal in response to a brightness of incident light; and signal storage/read-out CCDs connected to the sensors, respectively, the signal storage/read-out CCDs each comprising a plurality of charge storages and being elongated over two or more of the plurality of pixels in such a way that a plurality of the linear-shaped signal storage/read-out CCDs are arranged parallel within a width of each pixel, wherein during an image sensing process, electric signals generated in the sensors of the pixels are transferred parallel in one direction by the plurality of signal storage/read-out CCDs, by which the electric signals generated in the sensors are stored in the charge storages of the signal storage/read-out CCDs, and wherein during a signal read process, the electric signals stored in the charge storages of the signal storage/read-out CCDs are transferred parallel in the same direction as in the image sensing process, by which the electric signals are read out of the photo-receptive area.

In this image sensing apparatus, since electric signals generated in the sensors of the pixels are transferred parallel in one direction by the signal storage/read-out CCDs provided in parallel so as to be stored in the charge storages of the signal storage/read-out CCDS, a frame rate of around $10^6$ frames/sec. is enabled.

When the total number of charge storages of the signal storage/read-out CCDs connected to the sensors is set to a desired number, a desired number of continuous frames of images can be attained. That is, if the total number of charge storages of the signal storage/read-out CCDs connected to the sensor of one pixel during an image sensing process is "A", then electric signals corresponding to the number "A" of continuous image frames are stored in the signal storage/read-out CCDs. Therefore, for example, if the total number of charge storages of the signal storage/read-out CCDs connected to the sensor of one pixel is 36, then the number of continuous image frames is 36, allowing use as a video camera for scientific use.

During a signal read process, since the electric signals stored in the charge storages of the signal storage/read-out CCDs provided in parallel are transferred parallel in the same direction as in the image sensing process, it is unnecessary to provide signal read CCDs independently of the signal storage/read-out CCDs within the photo-receptive area.

Furthermore, since a plurality of signal storage/read-out CCDs are provided in parallel and since electric signals are transferred in the same direction during both image sensing and signal reading processes, the circuit for driving the signal storage/read-out CCDs is simplified in construction.

Preferably, the signal storage/read-out CCDs are placed on a surface other than a surface on which the sensors are placed.

Preferably, the signal storage/read-out CCDs are partly formed into meanders.

Preferably, the image sensing apparatus further comprises:

a brightness monitoring means which monitors brightness of incident light which will be reached on an entire area or partial area of the photo-receptive area, and which outputs a detection signal when detecting that an abrupt change has occurred in the brightness; and a trigger signal generating means which, upon an input of a detection signal from the brightness monitoring means, outputs to an image sensor a trigger signal for commanding a halt or start of image sensing concurrently with or a required time elapse after the input of the detection signal.

In this case, when an abrupt change in brightness has occurred to the entire area or partial area of the photo-receptive area, a trigger signal is outputted from the trigger signal generating means to the image sensing means, so that the image sensing is halted or started. Therefore, the image frames including the instant that the abrupt change in brightness has occurred can be securely obtained.

Preferably, the image sensing apparatus further comprises a means for delivering the electric signals generated in the sensors to the brightness monitoring means, the means being located within at least some part of the pixels constituting the photo-receptive area of the image sensor.

More specifically, the means for delivering electric signals, provided within pixels, may be implemented by dividing the sensor into a first portion and a second portion and by connecting the first portion to the signal storage/read-out CCDs and connecting the second portion to the brightness monitoring means.

In order to achieve the aforementioned second object, the image sensing apparatus of the present invention adopts a prism of simple construction to thereby simplify the beam split optical system and to facilitate the replacement of the beam split optical system.

More specifically, in order to achieve the second object, according to the present invention, there is provided a video image sensing apparatus of a tri-plate type that incident light is split by a beam split means and entered into a plurality of image sensors, wherein the beam split means comprises a rectangular parallelepiped prism made up by coupling together four divisional prisms of right-angled isosceles triangle shape together, and has required filters mounted on combinational surfaces of the divisional prisms, where the beam split means is replaceable.

With the image sensing apparatus of the present invention, various types of image sensing can be implemented by replacing the beam split means. Also, since the configuration of the prism of the beam split means is simplified, it is unnecessary to provide any complex replacement mechanism.

For example, two types of filters out of red-light reflecting filter, green-light reflecting filter, and blue-light reflecting filter may be mounted on the combinational surfaces of the divisional prisms of the beam split means.

In this case, color image sensing can be implemented without any loss of intensity of light.

Also, ½ reflective films that transmit ½ of incident light and reflect ½ of the light may be mounted on the combinational surfaces of the divisional prisms of the beam split means, respectively.

In this case, if image sensing is carried out by synchronizing the image sensors, monochrome image sensing of high resolution can be implemented. Also, if the image sensing time of the image sensors is delayed, continuous frames of images in sets of three can be obtained.

Otherwise, filters that selectively reflect beams of light of required frequency bands out of the incident light may b mounted on the combinational surfaces of the divisional prisms of the beam split means, respectively.

In this case, if image sensing is carried out by synchronizing the image sensors, beams of light of different frequencies can be measured at the same time.

Preferably, the image sensing apparatus further comprises a first synchronization means for adjusting image sensing delay time of the image sensors.

In this case, the image sensing delay time can be controlled according to the type or the like of the beam split means.

Preferably, the image sensing apparatus further comprises light intensifying means provided in front of the photo-receptive areas of the image sensors, respectively, and a second synchronization means for adjusting gating time and/or delay time of the light intensifying means.

In this case, the image sensing time can be delayed by the gating of the light intensifying means.

BRIEF DESCRIPTION OF THE DRAWINGS

Further objects and advantages of the present invention will become clear from the following description taken in conjunction with the preferred embodiments thereof with reference to the accompanying drawings, in which

FIGS. 30A and 30B are diagrams showing the gating;

DETAILED DESCRIPTION OF THE PREFERRED EMBODIMENT

First Embodiment

Figure 1:
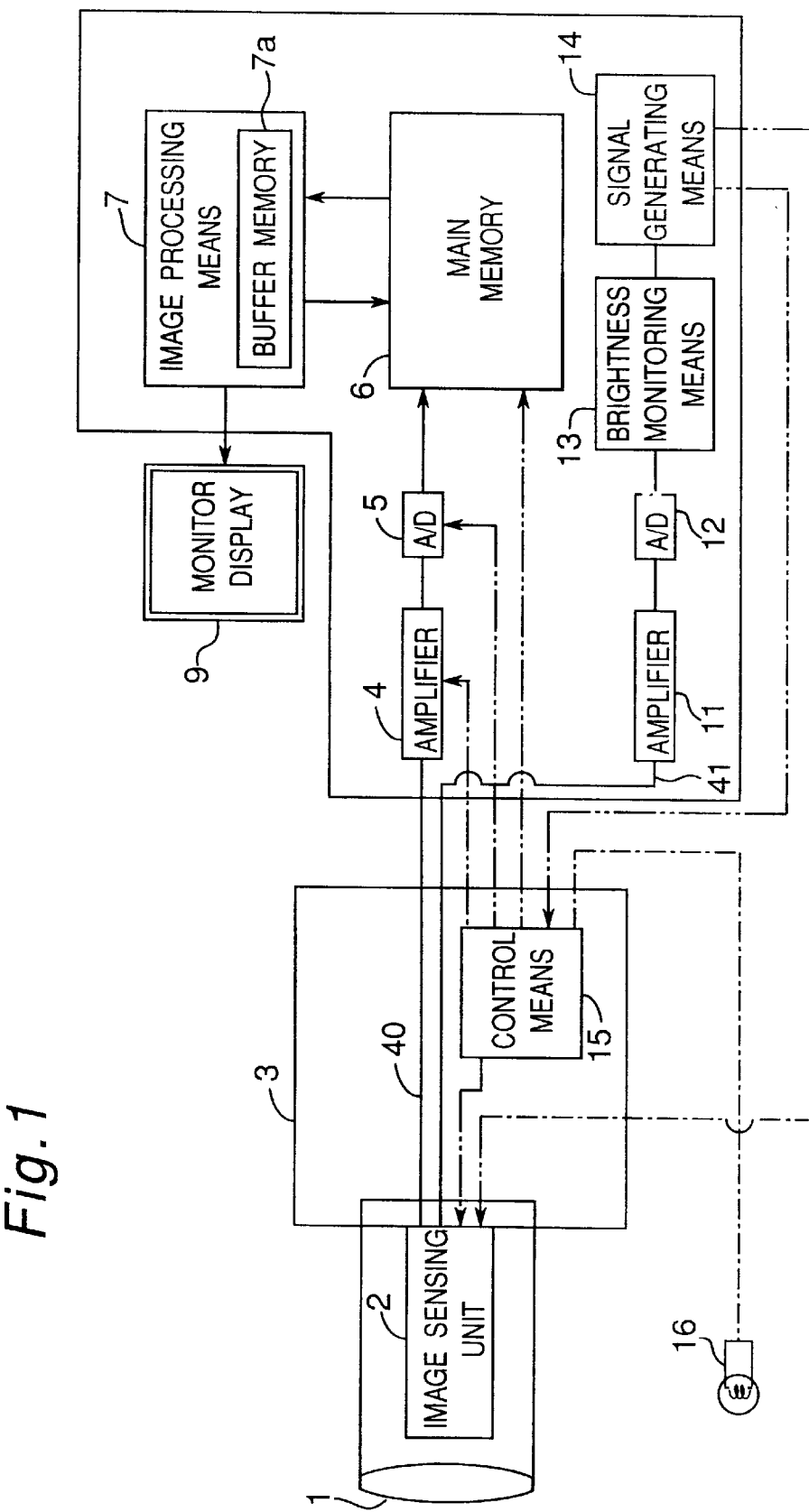
FIG. 1 is a schematic circuit diagram showing an image sensing apparatus according to a first embodiment of the present invention.

FIGS. 1 through 10 show an image sensing apparatus according to a first embodiment of the present invention.

In this image sensing apparatus, a main body 3 is equipped with an image sensing unit 2 by which a beam of incident light converged into an image by a lens 1 is converted into an electric signal, wherein an analog signal outputted by the image sensing unit 2 is amplified by an amplifier 4 and thereafter converted into a digital signal by an A/D converter 5, thus being transmitted to a main memory 6. An image processing means 7 connected to the main memory 6 comprises a buffer memory 7a and processes the digital signal stored in the main memory 6 so as to reproduce the image. Designated by reference numeral 9 in the figures is a monitor display for displaying the image reproduced by the image processing means 7. The image sensing unit 2 is connected to a brightness monitoring means 13 via an amplifier 11 and an A/D converter 12, and the brightness monitoring means 13 is connected to a trigger signal generating means 14. The image sensing apparatus is further equipped with a control means 15 connected to the amplifier 4, the A/D converter 5, the main memory 6, and the like, so that the control means 15 controls the whole image sensing apparatus. Connected to the control means 15 is an illuminating means 16 for illuminating a subject with illumination light, so that illumination light will be applied to the subject from the illuminating means 16 in synchronization with the operation of the image sensing unit 2 for an image sensing operation.

Figure 2:
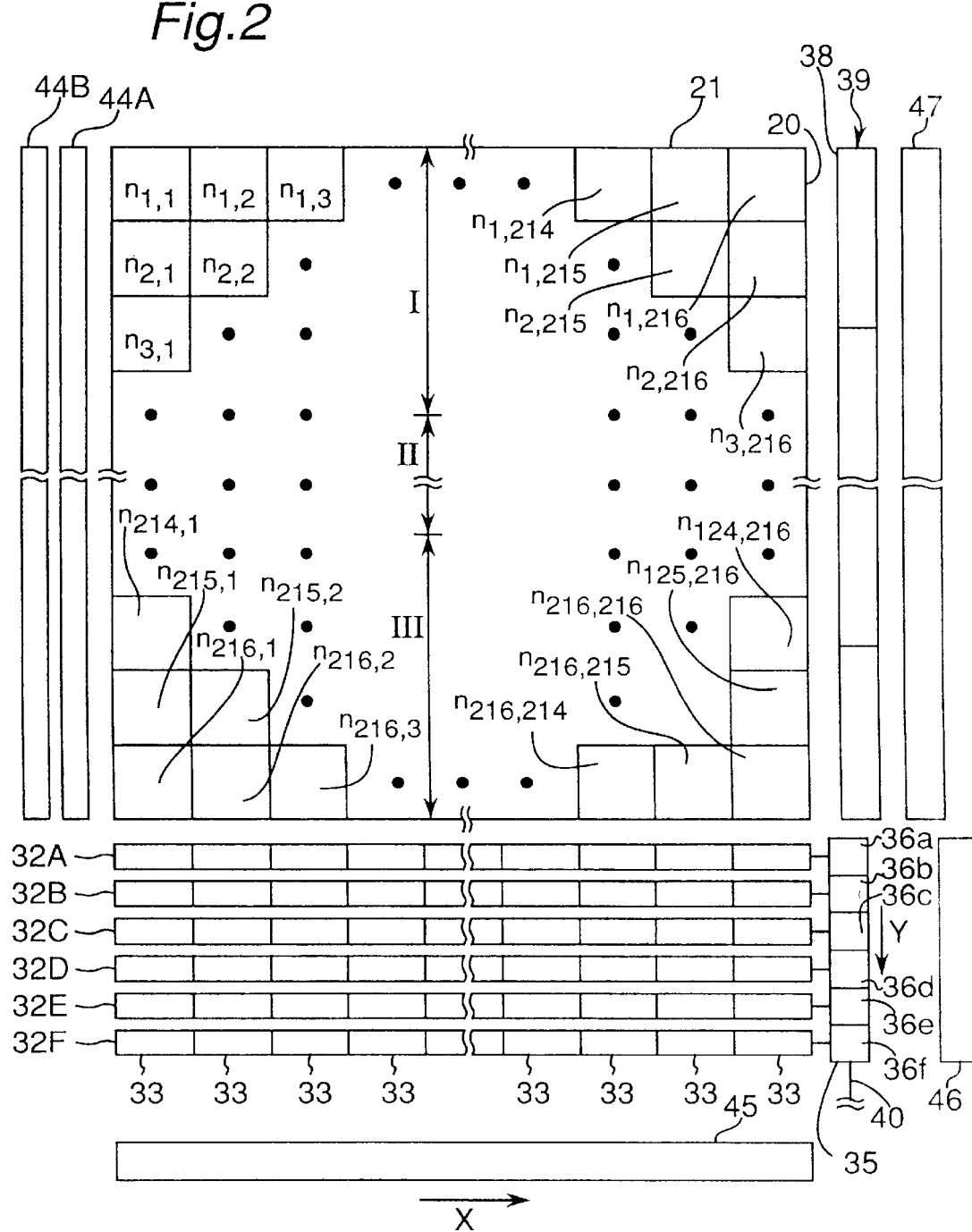
FIG. 2 is a schematic diagram showing the image sensor.
Figure 3:
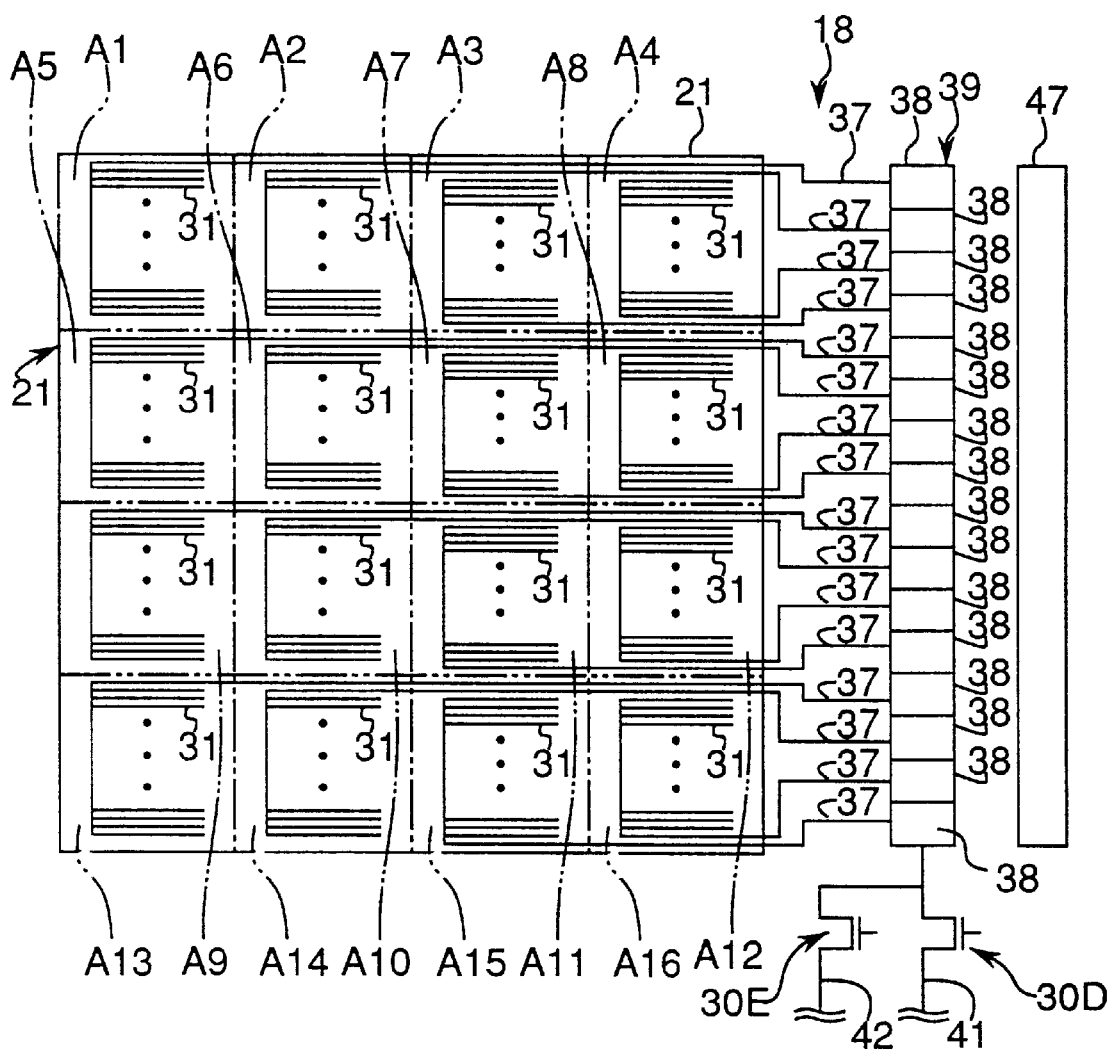
FIG. 3 is a schematic diagram showing the connection between monitor CCDs and signal discharge lines.

The image sensing unit 2 comprises an image sensor 18 as shown in FIGS. 2 and 3.

This image sensor 18 has a photo-receptive area 21 on which 46,656 square-shaped pixels 20 are arrayed in a matrix of 216 rows×216 columns. In FIG. 2, each pixel 20 is numbered by $n_{i,j}$ (i=1 to 216, j=1 to 216), where the suffix i indicates what ordinal number (row) from the top in the figure the pixel 20 falls upon, and the suffix j indicates what ordinal number (column) from the leftmost in FIG. 2 the pixel 20 falls upon. For example, a pixel 20 numbered by $n_{2,215}$ is located on the 2nd row from the top and on the 215th column from the leftmost.

Figure 4:
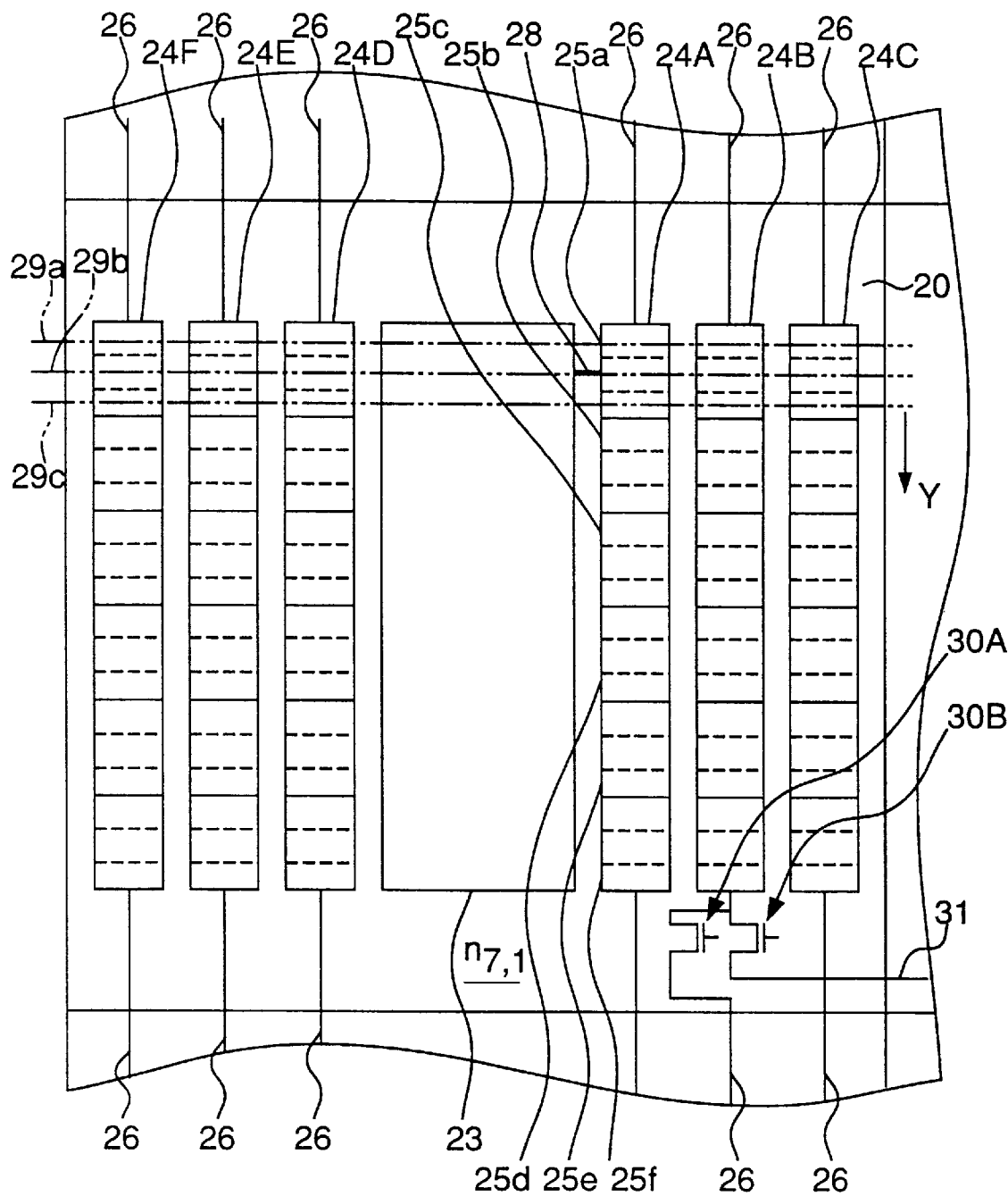
FIG. 4 is a partly enlarged view of FIG. 2.

As shown in FIG. 4, the pixel 20 comprises a sensor 23 by which a beam of light converged into an image by the lens 1 is converted into an analog electric signal corresponding to the brightness of the beam. Also, in each pixel 20, six signal storage/read-out CCDs 24A to 24F are provided so as to be accommodated in the widthwise size of the pixel 20 (the lateral size in the figure). That is, three CCDs of a first signal storage/read-out CCD 24A, a second signal storage/read-out CCD 24B, and a third signal storage/read-out CCD 24C are provided on the figure right side of the sensor 23 of the pixel 20, while three CCDs of a fourth signal storage/read-out CCD 24D, a fifth signal storage/read-out CCD 24E, and a sixth signal storage/read-out CCD 24F are also provided on the figure left side of the sensor 23, thus a total of six CCDs are arranged in each pixel 20. These first to sixth signal storage/read-out CCDs 24A to 24F each have functions of accumulating and storing electric signals generated in the sensor 23 and of transferring these electric signals, as will be described later. Furthermore, first and second switching means 30A and 30B, each comprising a MOS transistor, are provided in each pixel 20.

The first to sixth signal storage/read-out CCDs 24A to 24F are all of the same construction, each being a linear-shaped CCD in which six charge storages of the first to sixth charge storages 25a to 25f are arrayed in series in the descending order from top in the figure. The first to third signal storage/read-out CCDs 24A to 24C provided on the right side of the sensor 23, and the fourth to sixth signal storage/read-out CCDs 24D to 24F provided on the left side are placed parallel to and equally spaced from each other.

Figure 5:
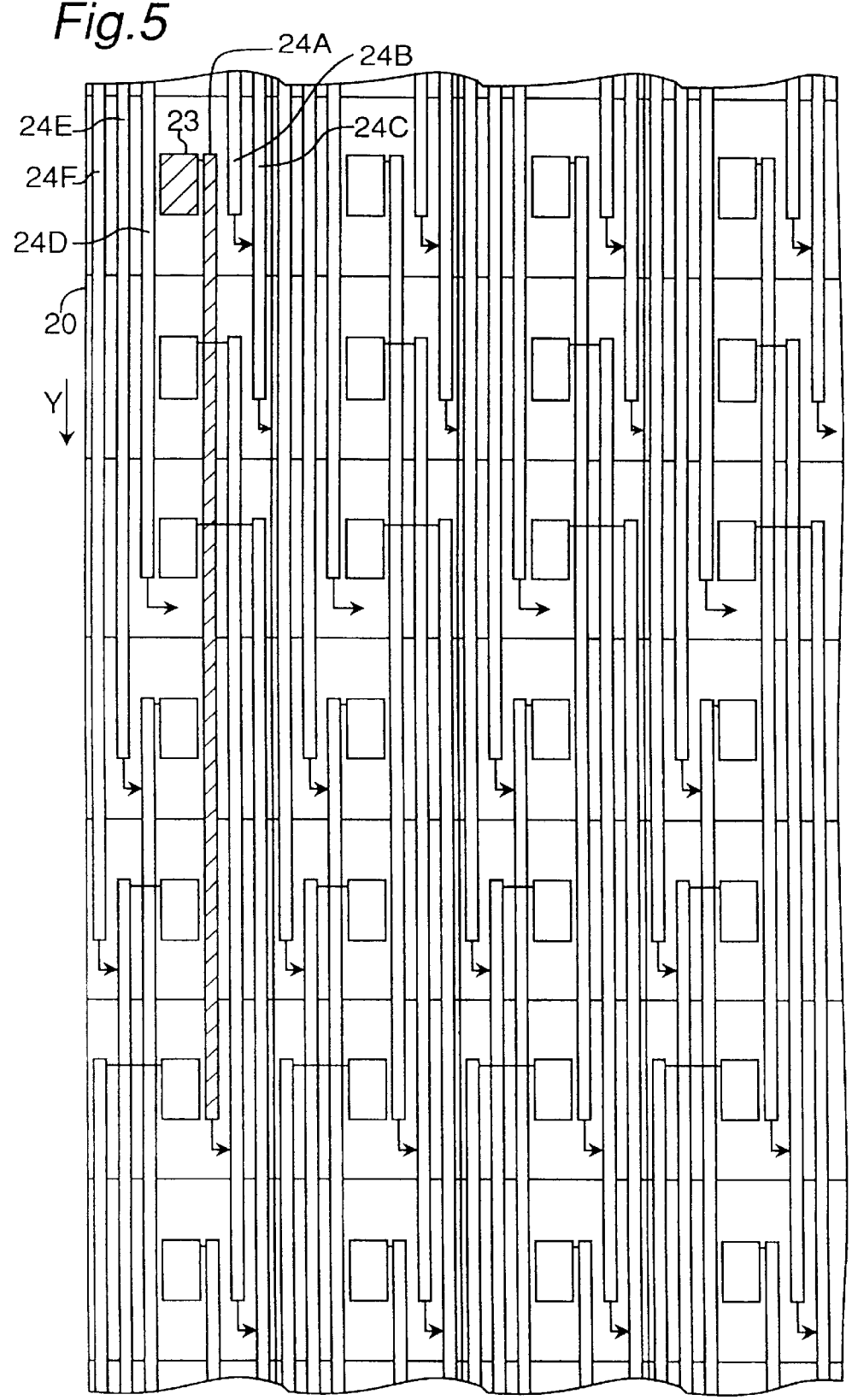
FIG. 5 is a partial plan view showing the photo-receptive area during an image sensing process.
Figure 6:
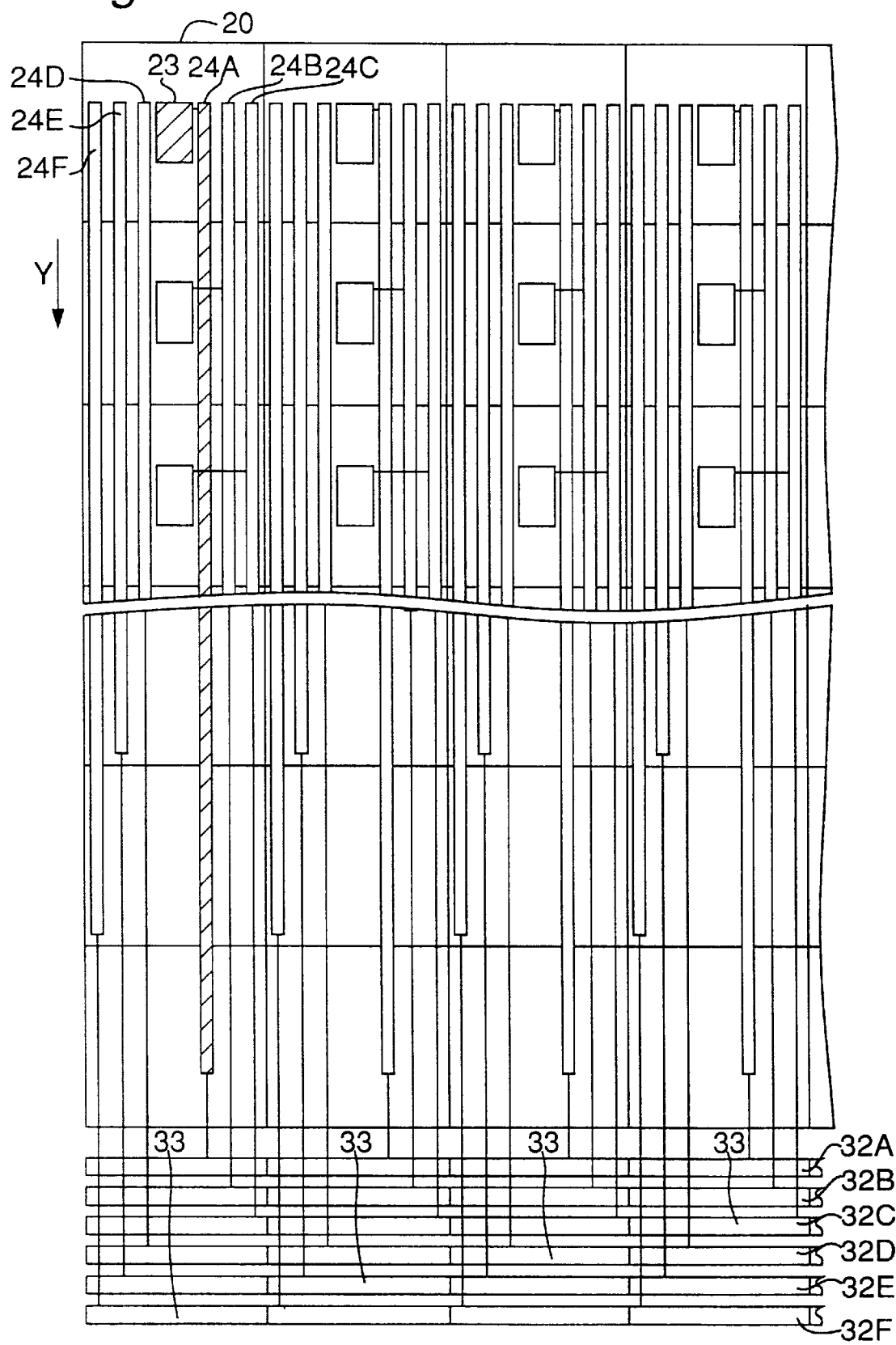
FIG. 6 is a partial plan view showing the photo-receptive area during a signal read.

The first and sixth signal storage/read-out CCDs 24A to 26F are connected in series by a lead wire 26 between pixels 20 neighboring in the vertical direction in the figure (longitudinal direction of the first to sixth first signal storage/read-out CCDs 24A to 24F). Moreover, first and second switching means 30A and 30B are provided interveniently on specified lead wire 26. Thereby, during an image sensing operation which will be described later, as shown in FIG. 5, six signal storage/read-out CCDs of serial six pixels 20 are connected in series to the sensor 23 of the upper pixel 20. During a signal read operation which will be described later, on the other hand, as shown in FIG. 6, signal storage/read-out CCDs of serial all pixels 20 are connected in series to each other.

It is noted that the pixel 20, although its construction is expressed in planar fashion in the drawings, may also be constructed so that the elements and electric wires within the pixels 20 are stacked one on another. Further, the positions of the first and second switching means 30A and 30B are not limited to those illustrated in the drawings, but may be located downward of the sensor 23 in the drawings. Also in the drawings, the dimensions such as the distances from the sensor 23 and the first and second signal storage/read-out CCDs 24A to 24F to the boundaries of the pixel 20 are exaggerated, whereas in fact these components are disposed in a dense state.

Now, with regard to the pixels 20, 20, . . . with j=1, i.e., pixels 20 constituting the leftmost column of the photo-receptive area 21 in FIG. 2, the connection arrangement of the first to sixth signal storage/read-out CCDs 24A to 24F are explained. It is noted that the pixels 20, 20, . . . constituting the column with j=2 through the pixels 20, 20, . . . constituting the column with j=216 are of the same construction as the above, where the first to sixth signal storage/read-out CCDs 24A to 24F of the pixels 20 neighboring in the vertical direction are connected in series. The following description is made by dividing the pixels with j=1 into the groups of pixels 20, 20, . . . with i=1 to i=6 (pixels 20 constituting an upper area I of the photo-receptive area 21 in FIG. 2), pixels 20 with i=7 to i=210 (pixels 20 constituting a central area II of the photo-receptive area 21 in FIG. 2), and pixels 20 with i=211 to i=216 (pixels 20 constituting a lower area III of the photo-receptive area 21 in FIG. 2).

Figure 7:
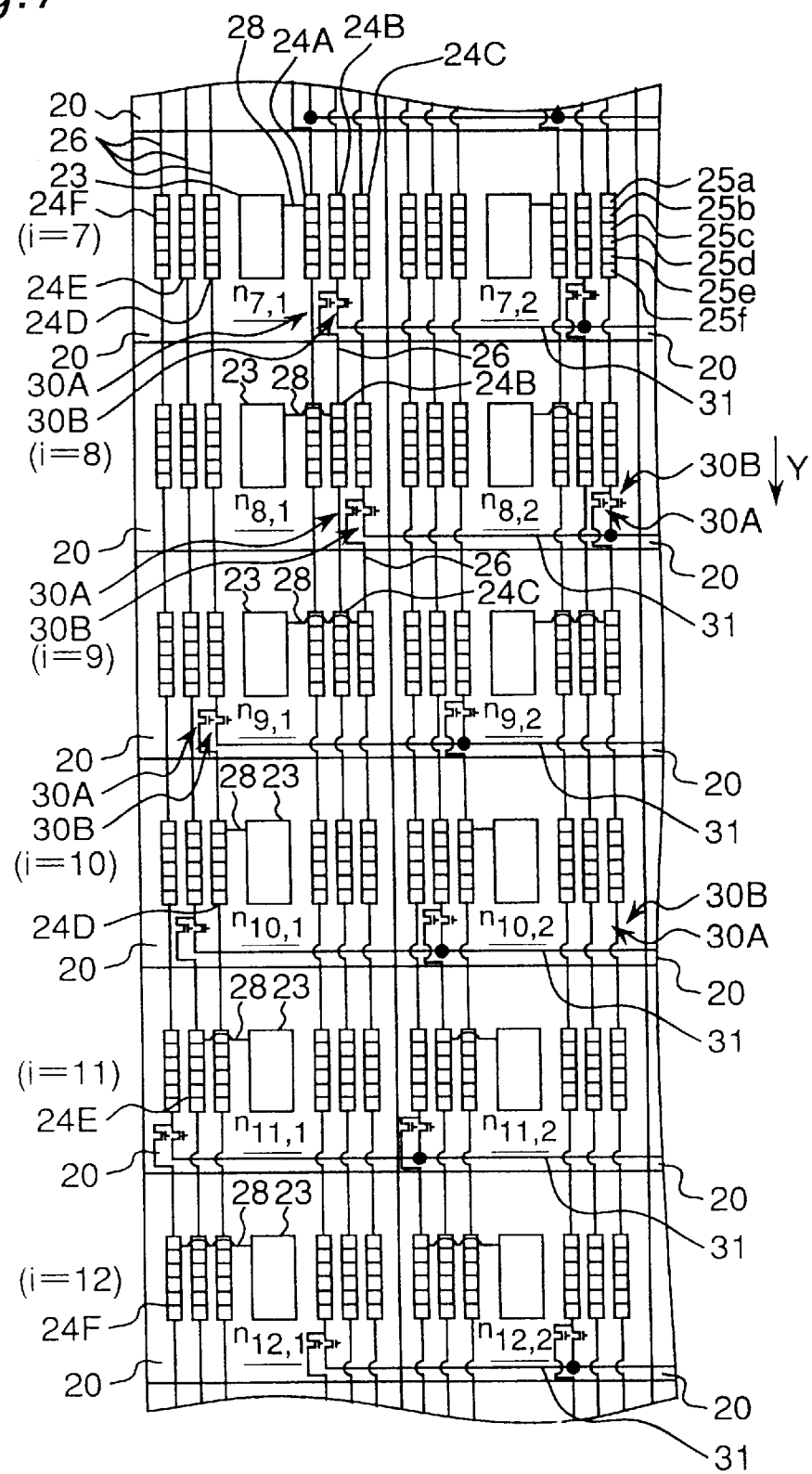
FIG. 7 is a partly enlarged view of FIG. 2, showing a central area of the photo-receptive area.

First in the central area II (pixels 20 with i=7 to i=210), the first to sixth signal storage/read-out CCDs 24A to 24F of the pixels 20 are connected in such an arrangement as shown in FIG. 7.

In a pixel 20 located uppermost of the central area II (pixel 20 with $n_{7,1}$) and every sixth pixels 20 from this pixel 20 (pixels 20 with i=7, 13, . . ., 199, 205), the sensor 23 and the first charge storage 25a of the first signal storage/read-out CCD 24A are connected to each other with a lead wire 28. A first switching means 30A comprising a transistor is interveniently provided on the lead wire 26 that connects the sixth charge storages 25f of the second signal storage/read-out CCDs 24B of the pixels 20 with i=7, 13, . . . , 199, 205 to the first charge storages 25a of the second signal storage/read-out CCDs 24B of the pixels 20 vertically neighboring in the figure (pixels 20 with i=8, 14, 200, 206). Signal discharge lines 31 on which a second switching means 30B comprising a MOS transistor is interveniently provided are connected to the sixth charge storages 25f of the second signal storage/read-out CCDs 24B of the pixels 20 with i=7, 13, . . . 199, 205, respectively.

Next, in a pixel 20 located in the second place from the uppermost side of the central area II (pixel with $n_{8,1}$) and every sixth pixels 20 from this pixel 20 (pixels 20 with i=8, 14, . . . , 200, 206), the sensor 23 and the first charge storage 25a of the second signal storage/read-out CCD 24B are connected to each other with a lead wire 28. A first switching means 30A is interveniently provided on the lead wire 26 that connects the sixth charge storages 25f of the third signal storage/read-out CCDs 24C of the pixels 20 with i=8, 14, . . . , 200, 206 to the first charge storages 25a of the third signal storage/read-out CCDs 24C of the pixels 20 vertically neighboring in the figure (pixels 20 with i=9, 15, 201, 207). Signal discharge lines 31 each having a second switching means 30B interveniently provided are connected to the sixth charge storages 25f of the third signal storage/read-out CCDs 24C of the pixels 20 with i=8, 14, . . . , 200, 206, respectively.

In a pixel 20 located in the third place from the uppermost side of the central area II in the figure (pixel 20 with $n_{9,1}$) and every sixth pixels 20 from this pixel 20 (pixels 20 with i=9, 15, . . . , 201, 207), the sensor 23 and the first charge storage 25a of the third signal storage/read-out CCD 24C are connected to each other with a lead wire 28. A first switching means 30A is interveniently provided on the lead wire 26 that connects the sixth charge storages 25f of the fourth signal storage/read-out CCDs 24D of the pixels 20 with i=9, 15, ..., 201, 207 to the first charge storages 25a of the fourth signal storage/read-out CCDs 24D of the pixels 20 vertically neighboring in the figure (pixels 20 with i=4, 10, 16, ..., 202, 208). Signal discharge lines 31 each having a second switching means 30B interveniently provided are connected to the sixth charge storages 25f of the fourth signal storage/read-out CCDs 24D within the pixels 20 with i=9, 15, ..., 201, 207, respectively.

In a pixel 20 located in the fourth place from the uppermost side of the central area II in the figure (pixel with $n_{10,1}$) and every sixth pixels 20 from this pixel 20 (pixels 20 with i=10, 16, ..., 202, 208), the sensor 23 and the first charge storage 25a of the fourth signal storage/read-out CCD 24D are connected to each other with a lead wire 28. A first switching means 30A is interveniently provided on the lead wire 26 that connects the sixth charge storages 25f of the fifth signal storage/read-out CCDs 24E within the pixels 20 with i=10, 16, ..., 202, 208 to the first charge storages 25a of the fifth signal storage/read-out CCDs 24E of the pixels 20 vertically neighboring in the figure (pixels 20 with i=11, 17, ..., 203, 209). Signal discharge lines 31 each having a second switching means 30B interveniently provided are connected to the sixth charge storages 25f of the fifth signal storage/read-out CCDs 24E within the pixels 20 with i=10, 16, ..., 202, 208, respectively.

In a pixel 20 located in the fifth place from the uppermost side of the central area II in the figure (pixel with $n_{11,1}$) and every sixth pixels 20 from this pixel 20 (pixels 20 with i=11, 17, ..., 203, 209), the sensor 23 and the first charge storage 25a of the fifth signal storage/read-out CCD 24E are connected to each other with a lead wire 28. A first switching means 30A is interveniently provided on the lead wire 26 that connects the sixth charge storages 25f of the sixth signal storage/read-out CCDs 24F of the pixels 20 with i=11, 17, ..., 203, 209 to the first charge storages 25a of the sixth signal storage/read-out CCDs 24F of the pixels 20 vertically neighboring in the figure (pixels 20 with i=12, 18, ..., 204, 210). Signal discharge lines 31 each having a second switching means 30B interveniently provided are connected to the sixth charge storages 25f of the sixth signal storage/read-out CCDs 24F within the pixels 20 with i=11, 17, ..., 203, 209, respectively.

In a pixel 20 located in the sixth place from the uppermost side of the central area II in the figure (pixel with $n_{12,1}$) and every sixth pixels 20 from this pixel 20 (pixels 20 with i=12, 18, ..., 204, 210), the sensor 23 and the first charge storage 25a of the sixth signal storage/read-out CCD 24F are connected to each other with a lead wire 28. A first switching means 30A is interveniently provided on the lead wire 26 that connects the sixth charge storages 25f of the first signal storage/read-out CCDs 24A of the pixels 20 with i=12, 18, ..., 204, 210 to the first charge storages 25a of the first signal storage/read-out CCDs 24A of the pixels 20 vertically neighboring in the figure (pixels 20 with i=13, 19, ..., 205, 211). Signal discharge lines 31 each having a second switching means 30B interveniently provided are connected to the sixth charge storages 25f of the first signal storage/read-out CCDs 24A of the pixels 20 with i=12, 18, ..., 204, 210, respectively.

As will be described later, since the first switching means 30A of each pixel 20 is opened during image sensing operation, the first signal storage/read-outs CCDs 24A of the six pixels 20 vertically neighboring from the pixel 20 in the figure are connected in series to the sensor 23 of the pixels 20 with i=1, 7, 13, ..., 199, 205, 211, as shown in FIG. 5. For example, connected in series to the pixel 20 with $n_{7,1}$ are the first signal storage/read-out CCDs 24A of the six pixels 20 with i=7 to 12. Like this, in the present invention, during image sensing operation, six signal storage/read-out CCDs on any one of the first to sixth signal storage/read-out CCDs 24A to 24F are connected in series to the sensor 23 of each pixel 20. Thus, since the first to sixth signal storage/read-out CCDs 24A to 24F have the first to sixth charge storages 25a to 25f, respectively, thirty-six charge storages 25a to 25f are connected to each sensor 23.

Figure 8:
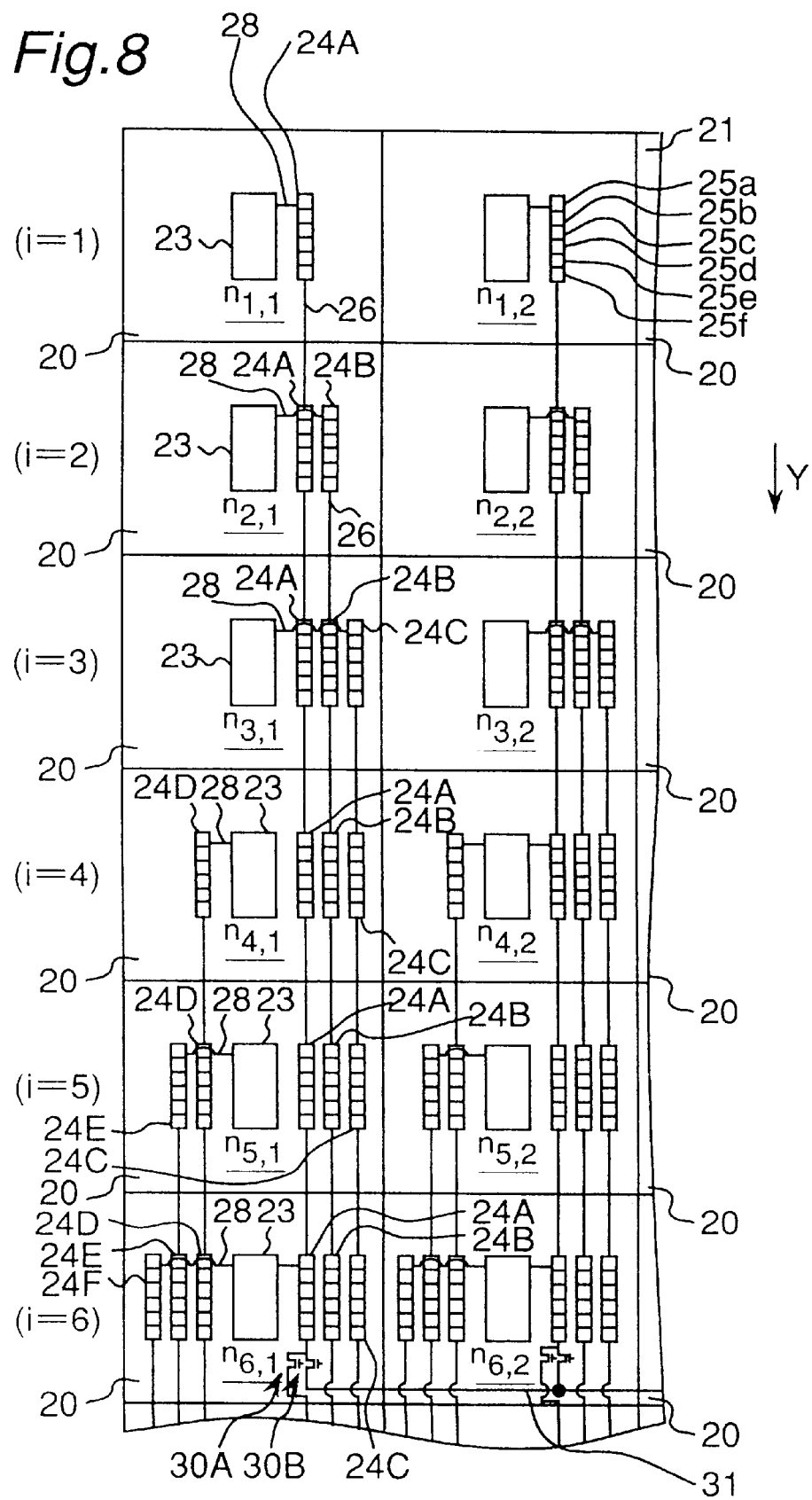
FIG. 8 is a partly enlarged view of FIG. 2, showing an upper area of the photo-receptive area.

Next, in the upper area I of the photo-receptive area 21, as shown in FIG. 8, the pixel 20 located at the uppermost side of this area (pixel with $n_{1,1}$) is provided with only the first signal storage/read-out CCD 24A, and no second to sixth signal storage/read-out CCDs 24B to 24F. The pixel 20 located in the signal place from the uppermost side (pixel 20 with $n_{2,1}$) is provided with the first signal storage/read-out CCD 24A and the second signal storage/read-out CCD 24B, and no third to sixth signal storage/read-out CCDs 24C to 24F. Likewise, the signal storage/read-out CCD is increased in number one by one in the order of pixels 20 with $n_{3,1}$, $n_{4,1}$, $n_{5,1}$, $n_{6,1}$. The reason why the pixels 20 in the upper area I are constructed in this way is that, since there are no pixels 20 upward of, for example, the pixel 20 with $n_{1,1}$ located in the uppermost place of the photo-receptive area 21, the pixel 20 with $n_{1,1}$ does not need to have the second signal storage/read-out CCD 24B to the sixth signal storage/read-out CCD 24F but needs only to have the first signal storage/read-out CCD 24A connected to the sensor 23. The pixels 20 in the upper area I and their connection arrangement are the same as those of the central area II except for this point.

Figure 9:
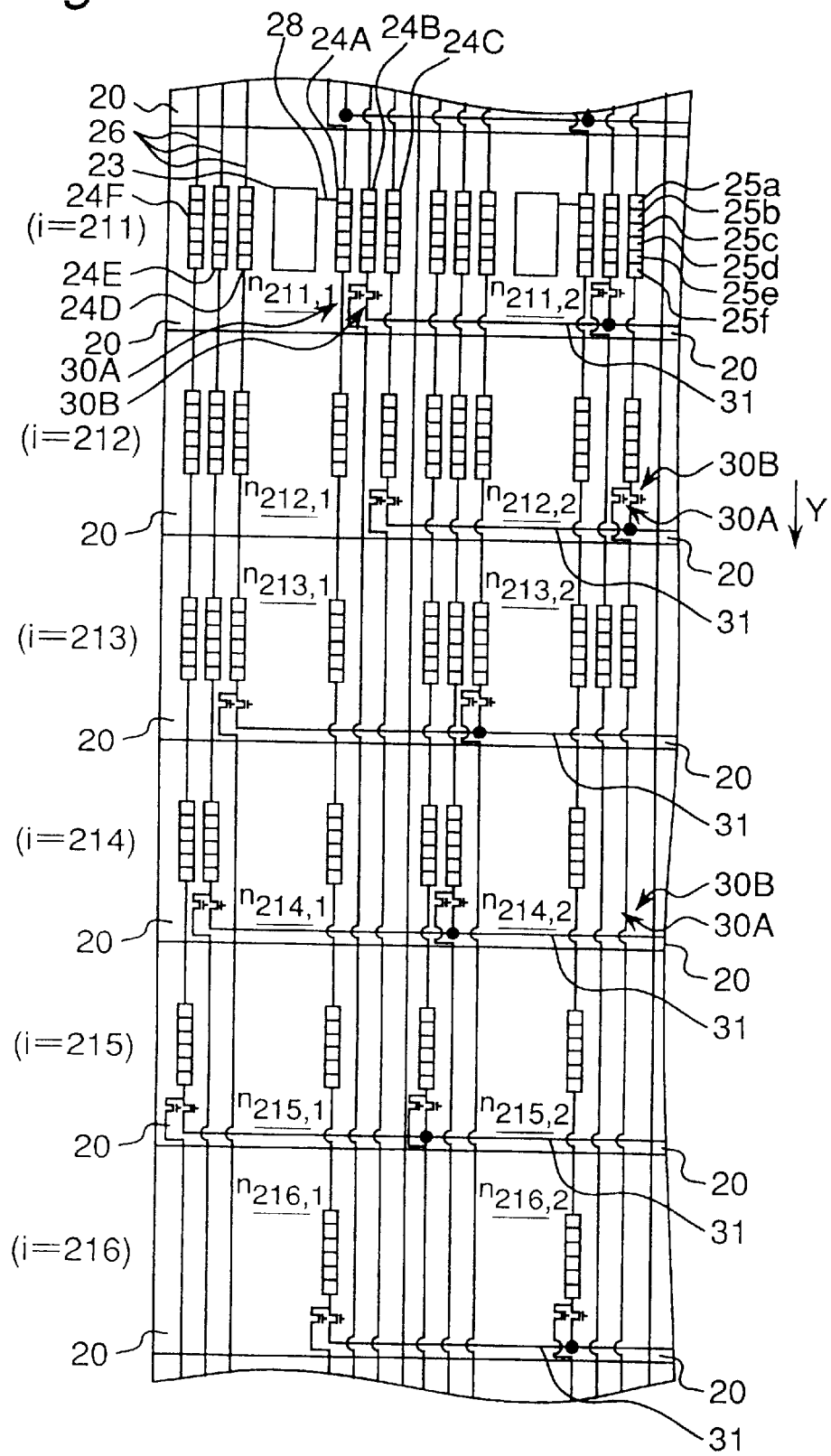
FIG. 9 is a partly enlarged view of FIG. 2, showing a lower area of the photo-receptive area.

In the lower area III of the photo-receptive area 21 as shown in FIG. 9, the pixel 20 in the uppermost place (sixth place from the lowermost place of the photo-receptive area 21) of the lower area III (pixel 20 with $n_{211,1}$) has the sensor 23, but the pixels 20 with $n_{212,1}$, $n_{213,1}$, $n_{214,1}$, $n_{215,1}$, and $n_{216,1}$ have no sensor 23. In this lower area III, the number of signal storage/read-out CCDs 24 is decreased one by one in the order from the pixel 20 with $n_{213,1}$ to the pixel 20 with $n_{216,1}$, where, for example, the pixel 20 with $n_{216,1}$ has only the first signal storage/read-out CCD 24A. The reason why the pixels 20 in the lower area III are constructed in this way is that, since the pixels 20 with $n_{216,1}$ to the pixels 20 with $n_{211,1}$ located in the lowermost place of the photo-receptive area 21 have only five or less pixels 20 downward of those pixels 20, six signal storage/read-out CCDs 24 cannot be connected in series even if the sensor 23 is provided.

Figure 10:
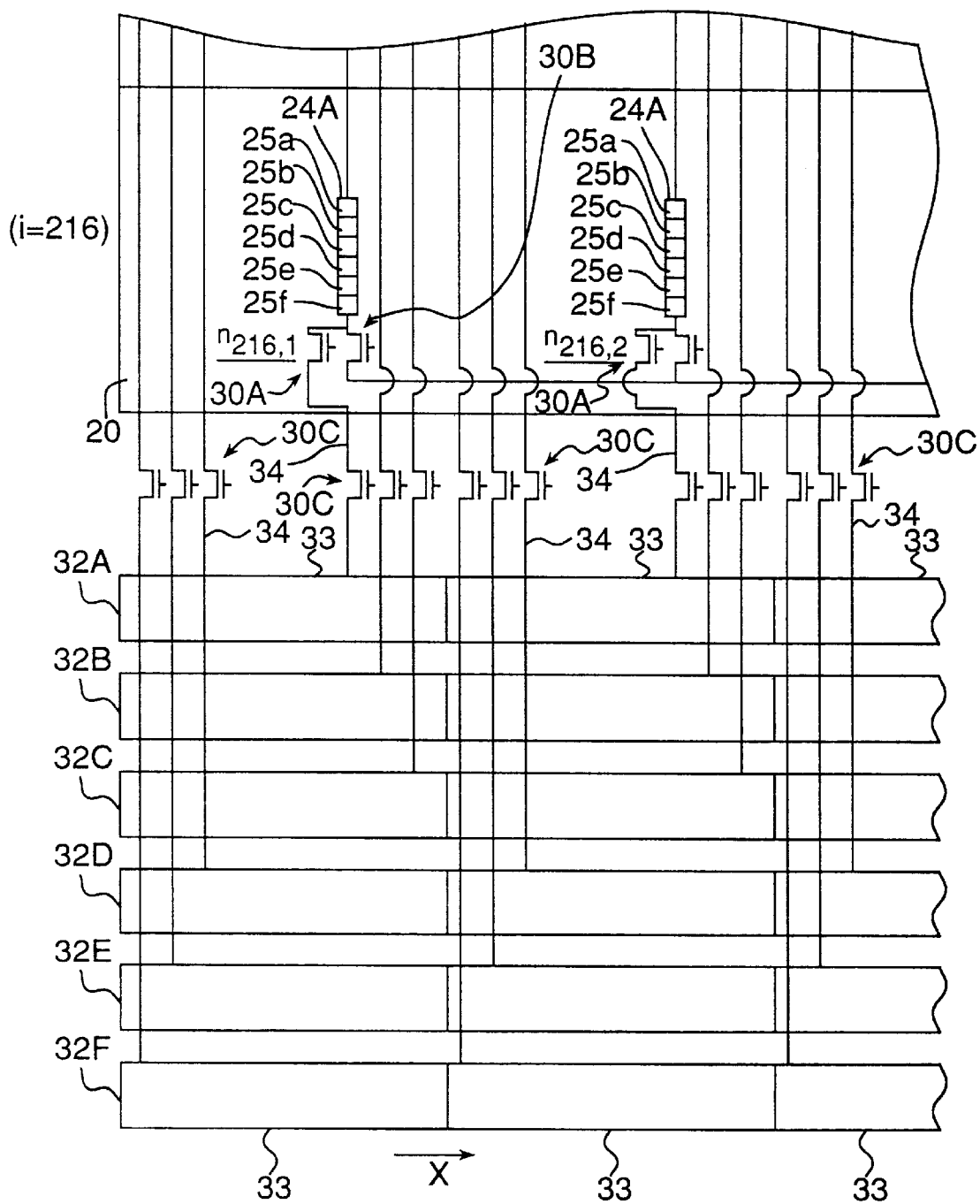
FIG. 10 is a partly enlarged view of FIG. 2, showing a lower area of the photo-receptive area.

As shown in FIG. 10, in lower positions outside the photo-receptive area 21, first to sixth scanning CCDs 32A to 32F are provided in parallel to one another. These first to sixth scanning CCDs 32A to 32F are each linear shaped, and each comprises 216 charge storages 33 corresponding to the number of columns (j=1 to 216) of the pixel 20 constituting the photo-receptive area 21. The charge storages 33 of the first to sixth scanning CCDs 32A to 32F are positioned along a direction perpendicular to the direction in which the charge storages 25a to 25f of the first to sixth signal storage/read-out CCDs 24A to 24F within each pixel 20 are arrayed, i.e., in the lateral direction in the figure.

Connected to the charge storages 33 of these first to sixth scanning CCDs 32A to 32F are the sixth charge storages 25f of the first to sixth signal storage/read-out CCDs 24A to 24F of the pixels 20 constituting the row with i=216.

For example, the sixth charge storage 25f of the first signal storage/read-out CCD 24A of the pixel 20 with $n_{216,1}$ is connected to the first charge storage 33, counting from the left in the figure, of the first scanning CCD 32A by a lead wire 34 on which a third switching means 30C comprising a MOS transistor is interveniently provided. Also, whereas the pixel 20 with $n_{216, 1}$ has no second to sixth signal storage/read-outs CCD 24B to 24F as described above, the sixth charge storage 25f of the lowermost-located one of the second signal storage/read-out CCDs 24B provided to the pixels 20 constituting the same column as the pixel with $n_{216, 1}$, i.e., the second signal storage/read-out CCD 24B of the pixel with $n_{211, 1}$, is connected to the first charge storage 33, counting from the left in the figure, of the second scanning CCD 32B via the lead wire 34 on which the third switching means 30C is interveniently provided. For the rest, likewise, the sixth charge storages 25f of the lowermost-located ones of the third to sixth signal storage/read-out CCDs 24C to 24F provided to the pixels 20 constituting the column with j=1 are connected to the first charge storages 33, counting from the left in the figure, of the third to sixth scanning CCDs 32C to 32F, respectively, via the lead wire 34 on which the third switching means 30C is interveniently provided. For the row with i=216, likewise, the sixth charge storages 25f of the first to sixth signal storage/read-out CCDs 24A to 24F in the pixels 20 with j=2 to 216 are connected to the second to 216th charge storages 33, counting from the left, of the first to sixth scanning CCDs 32A to 32F, respectively, via the lead wire 34 on which the third switching means 30C is interveniently provided.

Further, as shown in FIG. 2, the 216th charge storages 33, counting from the left, of the first to sixth scanning CCDs 32A to 32F (rightmost charge storages in the figure) are connected to first to sixth charge storages 36a to 36f of a CCD 35 provided outside the photo-receptive area 21, respectively. The sixth charge storage 36f of the read CCD 35 is connected to the main memory 6 by a read line 40 via the amplifier 4 and the A/D converter 5 as shown in FIG. 1.

As described above, the signal discharge lines 31 are connected, respectively, to the first signal storage/read-out CCDs 24A of the pixels 20 with i=6, 12, 18, . . . , the second signal storage/read-out CCDs 24B of the pixels 20 with i=7, 13, 19, . . . , the third signal storage/read-out CCDs 24C of the pixels 20 with i=8, 14, 20, . . . , the fourth signal storage/read-out CCDs 24D of the pixels 20 with i=9, 15, 21, . . . , the fifth signal storage/read-out CCDs 24E of the pixel 20 with i=10, 16, 22, . . . , and the sixth charge storages 25f of the sixth signal storage/read-out CCDs 24 of the pixels 20 with i=11, 17, 23 . . . . As shown in FIG. 3, the photo-receptive area 21 is divided into four in the longitudinal direction (in rows) and four in the lateral direction (in columns), that is, into sixteen square areas A1 to A16 including the same number of pixels 20, where the signal discharge lines 31 of the pixels 20 included in each of the areas A1 to A16 are connected to one monitor line 37. For example, in the uppermost and leftmost area A1 of the photo-receptive area 21, there are included longitudinally 54 (i=1 to 54) and horizontally 54 (j=1 to 54), totally 2,916 pixels 20, the signal discharge lines 31 of which pixels 20 are connected to one monitor line 37.

A monitor CCD 39 implemented by a linear CCD comprising sixteen charge storages 38 is provided on the right side in the figure outside the photo-receptive area 21. The monitor lines 37 of the areas A1, A2, A3, . . . , A14, A15, A16 are connected to the first charge storage 38 to the sixteenth charge storage 38, counting from the top in the figure, of the monitor CCD 39, respectively.

The sixteenth charge storage 38 of the monitor CCD 39 is connected to the brightness monitoring means 13 via the A/D converter 12 as shown in FIG. 1 by a read line 41 on which a fourth switching means 30D comprising a MOS transistor is interveniently provided. Connected to the sixteenth charge storage 38 of the monitor CCD 39 is a drain line 42 on which a fifth switching means 30E comprising a MOS transistor is interveniently provided.

The brightness monitoring means 13 monitors the total sum of outputs of the sensors 23 of the pixels 20 in the areas A1 to A16 during a monitoring operation which will be described later. When a rapid change has occurred in the brightness of any of the areas A1 to A16, the brightness monitoring means 13 outputs a detection signal to a trigger signal generating means 14. The trigger signal generating means 14, upon receiving a detection signal, outputs to the image sensor 18 and the control means 15 a trigger signal for commanding a halt of monitoring.

The image sensor 18, as shown in FIG. 2, comprises a first drive circuit 44A for actuating the first to sixth signal storage/read-out CCDs 24A to 24F provided to the pixels 20 during an image sensing, and a second drive circuit 44B for actuating the first to sixth signal storage/read-out CCDs 24A to 24F during a setting operation which will be described later. In this embodiment, the first drive circuit 44A actuates the first to sixth signal storage/read-out CCDs 24A to 24F of the pixels 20 so that electric signals are transferred at $10^{-6}$ sec. intervals, while the second drive circuit 44B actuates the first to sixth signal storage/read-out CCDs 24A to 24F of the pixels 20 so that electric signals are transferred at intervals longer than $10^{-6}$ sec. The image sensor 18 comprises a third drive circuit 45 for actuating the first to sixth scanning CCDs 32A to 32F, a fourth drive circuit 46 for actuating the read CCD 35, and a fifth drive circuit 47 for actuating the monitor CCD 39 as shown in FIG. 3.

The first to sixth signal storage/read-out CCDs 24A to 24F provided in each pixel 20 are linear shaped and disposed parallel to one another as described before. Besides, electric signals generated at the sensor 23 of each pixel will be transferred in the lengthwise direction of the signal storage/read-out CCDs 24A to 24F, i.e. in the vertical direction (indicated by arrow Y), during both the image sensing and signal reading operations, as will be described later. Therefore, the circuit structure of the first, second drive circuits 44A, 44B can be simplified.

More specifically, as shown in FIG. 4, in order to apply a drive voltage to the first charge storages 25a of the first to sixth signal storage/read-out CCDs 24A to 24F of one pixel 20 (e.g., the pixel 20 with $n_{7, 1}$), it is appropriate to connect these first charge storages 25a to one another by three electric wires 29a, 29b, 29c, and to apply drive voltages of required waveforms to the electric wires 29a, 29b, 29c, respectively. Also, although not shown in FIG. 4, the first to sixth charge storages 25a to 25f of the first to sixth signal storage/read-out CCDs 24A to 24F of the pixels 20 constituting the same column may appropriately be connected to the same three electric wires so as to have a drive voltage of identical waveform applied thereto.

Next, the operation of the image sensing apparatus according to the first embodiment is explained.

In this image sensing apparatus, a monitoring operation is performed during the image sensing, and when the subject has undergone a change, a trigger signal is outputted so that the image sensing is started.

First, during the monitoring, the first switching means 30A of each pixel 20 is kept open, while the second switching means 30B is kept closed. Also, the fourth switching means 30D is kept closed, while the fifth switching means 30E is kept open.

In this state, as shown in FIG. 5, connected in series to the sensors 23 of the pixels 20 constituting the photo-receptive area 21 are six signal storage/read-out CCDs on any one of the first to sixth signal storage/read-out CCDs 24A to 24F, respectively. Besides, the sixth charge storage 25f located in the lowermost place, as viewed in the drawings, of these six signal storage/read-out CCDs 24A to 24F is connected to the monitor CCD 39 via the signal discharge line 31 and the monitor line 37.

For example, as shown in FIG. 7, connected in series to the sensor 23 of the pixel 20 with $n_{7,1}$ are six first signal storage/read-out CCDs 24A that the pixel 20 with $n_{7,1}$ to pixel 20 with $n_{12,1}$ have, and the sixth charge storage 25f of the first signal storage/read-out CCD 24A of the pixel 20 with $n_{12,1}$ is connected to the monitor CCD 39 via the signal discharge line 31 and the monitor line 37.

In this state, the first drive circuit 44A actuates the first to sixth signal storage/read-out CCDs 24A to 24F of the pixels 20, while the fifth drive circuit 47 actuates the monitor CCD 39. In synchronization with the actuation of the first to sixth signal storage/read-out CCDs 24A to 24F, the subject is irradiated with a beam of light intermittently from the illuminating means 16.

With the beam of light reached on the photo-receptive area 21 via the lens 1, an analog signal generated in the sensor 23 in response to the brightness of the beam is transferred sequentially through the first to sixth charge storages 25a to 25f of the six signal storage/read-out CCDs 24A to 24F connected in series to the sensor 23. For this operation, the first drive circuit 44A actuates the first to sixth signal storage/read-out CCDs 24A to 24F in such a manner that electric signals are transferred at $10^{-6}$ sec. intervals.

An electric signal generated in the sensor 23 of the pixel 20 with $n_{7,1}$ is transferred, as indicated by arrow Y, in an order of the first to sixth charge storages 25a to 25f of the first signal storage/read-out CCD 24A of the pixel 20 with $n_{7,1}$, the first to sixth charge storages 25a to 25f of the first signal storage/read-out CCD 24A of the pixel 20 with $n_{8,1}$, the first to sixth charge storages 25a to 25f of the first signal storage/read-out CCD 24A of the pixel 20 with $n_{9,1}$, the first to sixth charge storages 25a to 25f of the first signal storage/read-out CCD 24A of the pixel 20 with $n_{10,1}$, the first to sixth charge storages 25a to 25f of the first signal storage/read-out CCD 24A of the pixel 20 with $n_{11,1}$, and the first to sixth charge storages 25a to 25f of the first signal storage/read-out CCD 24A of the pixel 20 with $n_{12,1}$, and then further transferred from the sixth charge storage 25f of the first signal storage/read-out CCD 24A of the pixel 20 with $n_{12,1}$ to the signal discharge line 31. Since the signal discharge lines 31 of the pixels 20 included in the individual areas A1 to A16 are connected to one monitor line 37, respectively, as described before, the electric signal transferred from the sensor 23 of the pixel 20 with $n_{7,1}$ to the signal discharge line 31 is transferred to the first charge storage 38 located in the uppermost place of the monitor CCD 39 via the monitor line 37, together with the electric signals transferred to the other signal discharge lines 31 present in the area A1. The electric signal transferred to the monitor CCD 39 is transferred to the amplifier 11 and the A/D converter 12 via the monitor line 37, where it is amplified and converted from analog to digital form, and then entered into the brightness monitoring means 13.

When an electric signal generated in the sensor 23 of the pixel 20 with $n_{7,1}$ is transferred to the first charge storage 25a of the first signal storage/read-out CCD 24A of this pixel 20 with $_{7,1}$, then the electric signals that have been stored in the first to sixth charge storages 25a to 25f of the pixels 20 with $n_{7,1}$ to with $n_{11,1}$ are transferred to their one-lower charge storages 25a to 25f, as viewed in the drawings, while the electric signal that has been stored in the sixth charge storage 25f of the first signal storage/read-out CCD 24A of the pixel 20 with $n_{12,1}$ is transferred to the monitor CCD 39 via the signal discharge line 31 and the monitor line 37.

The brightness monitoring means 13, upon deciding that a rapid change in brightness has occurred to any one of the sixteen areas A1 to A16, transmits a detection signal to the trigger signal generating means 14, and in turn, the trigger signal generating means 14 transmits a trigger signal to the image sensing unit 2 and the control means 15. When the image sensing unit 2 has received the trigger signal, the fourth switching means 30D goes off and the fifth switching means 30E goes on, by which the image sensing is started.

In this state, as in the monitoring state, connected in series to the sensors 23 of the pixels 20 constituting the photo-receptive area 21 are six signal/read CCDs on any one of the first to sixth signal storage/read-out CCDs 24A to 25F, while the sixth charge storage 25f located in the lowermost place of these six signal storage/read-out CCDs 24A to 24F, as viewed in the figure, is connected to the monitor CCD 39 via the signal discharge line 31 and the monitor line 37, and besides, the sixteenth charge storage 38 as counted from the uppermost place of the monitor CCD 39 is connected to the drain line 42 side. Also, the first drive circuit 44A actuates the first to sixth signal storage/read-out CCDs 24A to 24F of the pixels 20 at $10^{-6}$ sec. intervals.

Analog electric signals generated in the sensors 23 of the pixels 20 in correspondence to the brightness of the beam reached on the photo-receptive area 21 via the lens 1 are transferred in parallel fashion to the first to sixth charge storages 25a to 25f of the six signal storage/read-out CCDs 24A to 24F connected in series to the individual sensors 23, and then discharged from the drain line 42 via the signal discharge lines 31, the monitor line 37, and the monitor CCD 39.

During this image sensing process, since the first to sixth signal storage/read-out CCDs 24A to 24F of each pixel 20 are actuated by the first drive circuit 44A at $10^{-6}$ sec. intervals as described before, electric signals generated in the sensors 23 at $10^{-6}$ sec. intervals are transferred to the first charge storages 25a of the first to sixth signal storage/read-out CCDs 24A to 24F, resulting in a frame rate of $10^6$ frames/sec. Also, since the first and second switching means 30A and 30B are not actuated during the image sensing, it can be prevented that noise as would be generated by actuation of those switching means may affect the output of the sensors 23.

For a halt of the image sensing, the first to sixth signal storage/read-out CCDs 24A to 24F are stopped from operating, while the second switching means 30B is switched to the open state. In this state, electric signals corresponding to 36 frames of images prior to the halt of image sensing have been stored in the first to sixth charge storages 25a to 25f of the first to sixth signal storage/read-out CCDs 24A to 24F connected to the sensors 23 of the pixels 20. For example, in the six signal storage/read-out CCDs 24A to 24F connected to the sensor 23 of the aforementioned pixel 20 with $n_{7,1}$, there have been stored electric signals corresponding to the top earlier images in the orders from the sixth charge storage 25f to the first charge storage 25a of the first signal storage/read-out CCD 24A of the pixel 20 with $n_{12,1}$, from the sixth charge storage 25f to the first charge storage 25a of the first signal storage/read-out CCD 24A of the pixel 20 with $n_{11,1}$, from the sixth charge storage 25f to the first charge storage 25a of the first signal storage/read-out CCD 24A of the pixel 20 with $n_{10,1}$, from the sixth charge storage 25f to the first charge storage 25a of the first signal storage/read-out CCD 24A of the pixel 20 with $n_{9,1}$, from the sixth charge storage 25f to the first charge storage 25a of the first signal storage/read-out CCD 24A of the pixel 20 with $n_{8,1}$, and from the sixth charge storage 25f to the first charge storage 25a of the first signal storage/read-out CCD 24A of the pixel 20 with $n_{7,1}$. Thus, the electric signals corresponding to totally 36 frames of continuous images have been accumulated and stored.

Next, when the electric signals stored in the first to sixth signal storage/read-out CCDs 24A to 24F of each pixel 20 are read out, the first switching means 30A of each pixel 20 is closed and the second switching means 30B is opened, while the third switching means 30C interveniently provided on the lead wire 34 is closed. In this state, as shown in FIG. 6, the first to sixth signal storage/read-out CCDs 24A to 24F of the pixels 20 arrayed the vertical direction are connected all in series. For example, for the column with j=1, the first to sixth signal storage/read-out CCDs 24A to 24F of the pixel 20 with $n_{1,1}$ to pixel 20 with $n_{216,1}$ are connected in series, respectively.

When the third drive circuit 45 actuates the first to sixth scanning CCDs 32A to 32F and besides the fourth drive circuit 46 actuates the read CCD 35, then electric signals are transferred to the charge storages 33, 33, . . . of the first to sixth scanning CCDs 32A to 32F. These transferred electric signals are transferred through within the first to sixth scanning CCDs 32A to 32F toward the 216th charge storages 33 as indicated by arrow X in FIG. 2, and further transferred to first to sixth charge storages 36a to 36f of the read CCD 35. The electric signals transferred to the read CCD 35 are further transferred toward the sixth charge storage 36f as indicated by arrow Y in FIG. 2, and through the amplifier 4 and the A/D converter 5, amplified and converted from analog to digital form, and thereafter stored in the main memory 6 as digital image signals. These image signals stored in the main memory 6 are sorted by the image processing means 7 so as to form the 1st to 36th frames of images, and then formed into an image by the monitor display 9.

In the image sensing apparatus of the first embodiment, as shown above, since either one of the first to sixth signal storage/read-out CCDs 24A to 24F each comprising six charge storages 25a to 25f is connected in series to one sensor 23 during the image sensing, totally 36 frames of continuous images can be obtained. Besides, since the first to sixth signal storage/read-out CCDs 24A to 24F are driven by the first drive circuit 44A, images can be captured at a frame rate of $10^6$ frames/sec. Accordingly, this image sensing apparatus is capable of implementing a frame rate that allows enough use for scientific measurement, as well as a number of continuous image frames that allows use as a video camera. For instance, if the image processing means 7 reproduces the image frames at a rate of 4 frames/sec, then a 9 sec motion image can be obtained.

Also, in this image sensing apparatus, electric signals generated in the sensors 23 of the pixels 20 are transferred parallel in the same direction, and accumulated and stored in the first to sixth signal storage/read-out CCDs 24A to 24F during the image sensing as described above. During the reading, the first to sixth signal storage/read-out CCDs 24A to 24F arrayed vertically as shown in FIG. 6 are connected in series, in which electric signals stored in the first to sixth signal storage/read-out CCDs 24A to 24F are transferred parallel in the same direction and read out to the first to sixth scanning CCDs 32A to 32F provided outside the photo-receptive area 21. Therefore, in this image sensing apparatus, electric signals generated in the sensors 23 are transferred parallel during both image sensing and signal reading operations, and besides electric signals are transferred in the same direction in both image sensing and signal reading operations. As a result, the first and second drive circuits 44A, 44B for actuating the first to sixth signal storage/read-out CCDs 24A to 24F are simplified in construction, and moreover it is unnecessary to provide any signal read-only CCDs to the photo-receptive area 21. This allows the area within the photo-receptive area 21 to be effectively exploited, so that the first to sixth signal storage/read-out CCDs 24A to 24F can be provided while an enough area is ensured for the sensors 23.

Further, since there are no bends in the direction in which electric signals are transferred for image sensing or signal reading, the pixels 20 can be prevented from deteriorating due to the remaining of electric signals.

For use of the image sensing apparatus of the first embodiment, a set-up procedure for positioning the image sensing scope needs to be taken so that the subject (not shown) will be securely contained in the image sensing scope. During this set-up procedure, the first switching means 30A is kept closed, the second switching means 30B is kept open, and the third switching means 30C is kept closed. In this state, the first to sixth signal storage/read-out CCDs 24A to 24F are actuated by the second drive circuit 44B, while the first to sixth scanning CCDs 32A to 32F and the read CCD 35 are actuated by the third and fourth drive circuits 45, 46, so that electric signals generated in the sensors 23 are outputted to the amplifier 4 and the A/D converter 5 via the first to sixth signal storage/read-out CCDs 24A to 24F, the scanning CCDs 32A to 32F, and the read CCD 35, and that the electric signals stored in the main memory 6 are formed into an image by the image processing means 7 and displayed onto the monitor display 9 as such. If the captured image is displayed immediately onto the monitor display 9 like this, the aforementioned set-up procedure can be easily accomplished.

Further, in this embodiment, electric signals generated in the sensors 23 are stored and transferred as charges by CCDs. Otherwise, the charges stored in the CCDs can be read out as other forms of electric signals, such as voltages.

Second Embodiment

Figure 11:
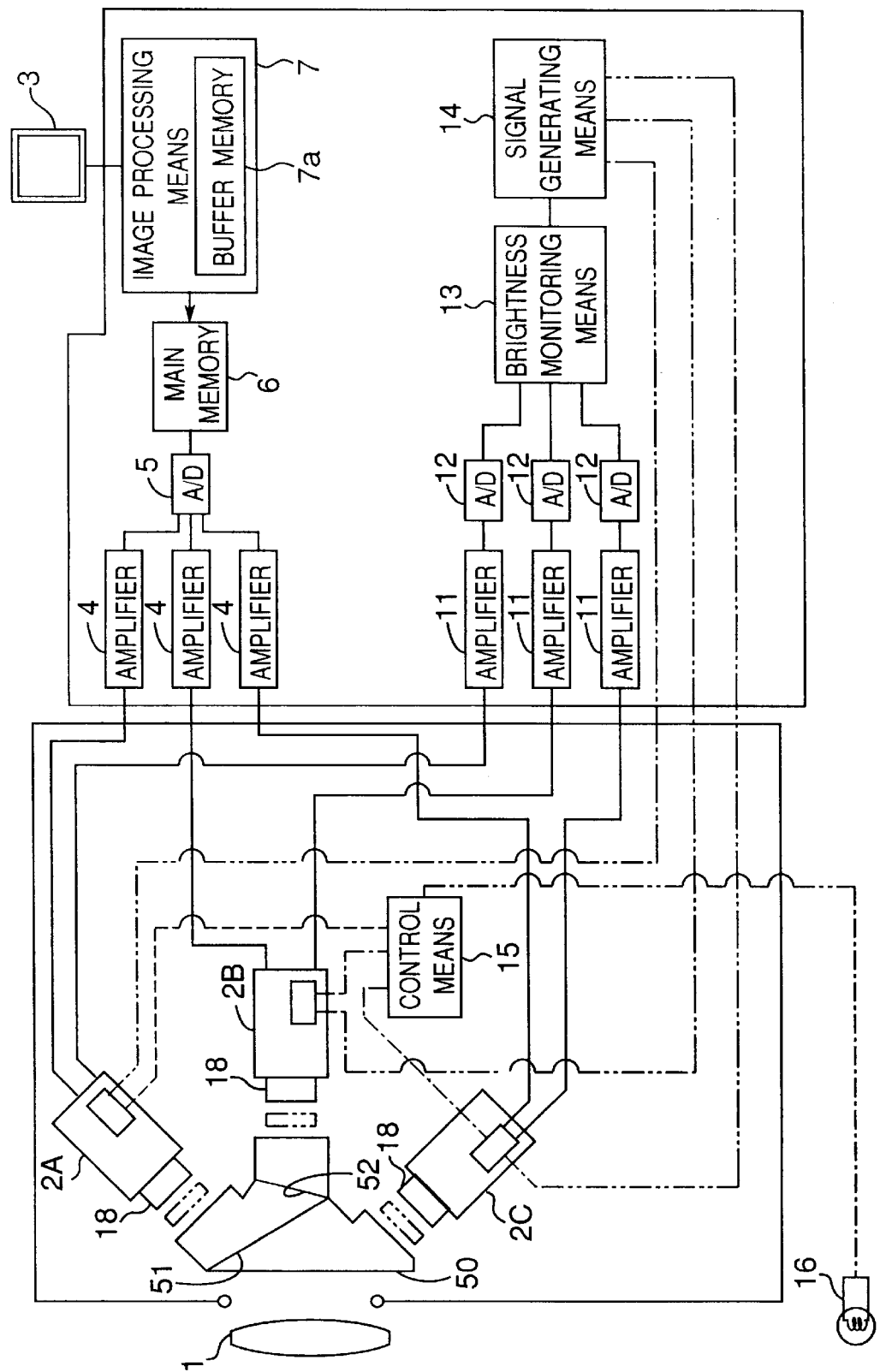
FIG. 11 is a schematic diagram showing an image sensing apparatus according to a second embodiment of the present invention.

Next described is a high-speed image sensing apparatus according to a second embodiment of the present invention as shown in FIG. 11.

In the image sensing apparatus according to this second embodiment, a beam split means 50 comprising a beam split prism is disposed behind the lens 1, so that a beam of light reached via the lens 1 from the subject is equally divided into three by a ⅓ reflective film 51 and a ½ reflective film 52 provided within the beam split means 50.

On the outgoing surface side of the beam split means 50, there are provided first, second, third image sensing means 2A, 2B, 2C, so that beams of the incident light after the split by the beam split means 50 are entered into the image sensing means 2A, 2B, 2C, respectively.

The first, second, third image sensing means 2A, 2B, 2C are similar in construction to the image sensing apparatus of the first embodiment as shown in FIGS. 1 through 10, where each image sensing means comprises a photo-receptive area 21 on which pixels 20 of 216 rows×216 columns are arrayed in a matrix form, the sensor 23 of each pixel 20 having linear-shaped first to sixth signal storage/read-out CCDs 24A to 24F on both sides thereof, each of the signal storage/read-out CCDs 24A to 24F comprising six charge storages 25a to 25f. Electric signals stored in the first to sixth signal storage/read-out CCDs 24A to 24F are read out by first to sixth scanning CCDs 32A to 32F and a read CCD 35, and the read electric signals are stored in a main memory 6 via an amplifying means 4 and an A/D converter 5.

Also in this image sensing apparatus, as in the first embodiment, the photo-receptive area 21 of the pixels 20 of each image sensing means 2A to 2C is divided into sixteen areas A1 to A16, where monitor lines 37 of the areas A1 to A16 are connected to a brightness monitoring means 13 and a trigger signal generating means 14 via a monitor CCD 39, an amplifier 11, and an A/D converter 12. Further, synchronization signals are inputted to the image sensing means 2A, 2B, 2C from the control means 15, so that the image sensing means 2A, 2B, 2C are actuated with specified time delays, as will be described later, by these synchronization signals. It is noted that the rest of the constitution of the second embodiment is the same as that of the first embodiment, where the same components as those of the first embodiment are designated by like reference numerals in FIG. 11.

Next, the operation of the second embodiment is explained.

Figure 12:
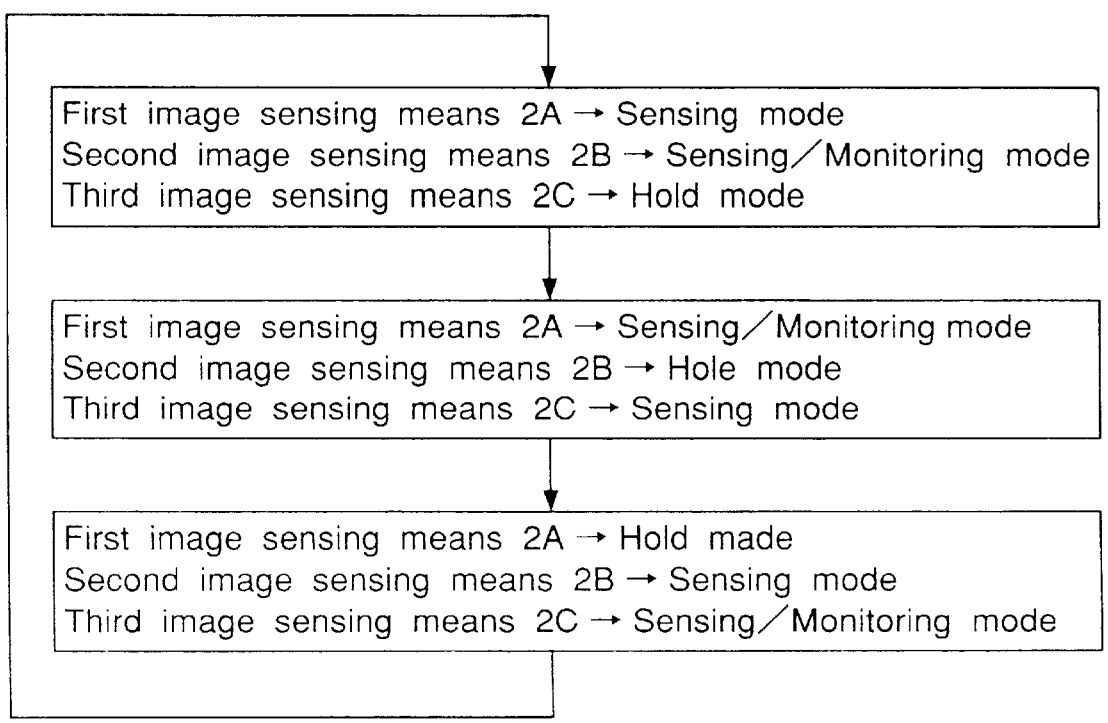
FIG. 12 is a flow chart showing the mode cycle of image sensing means in the second embodiment.

In the second embodiment, for the image sensing, either one image sensing means 2A to 2C out of the first to third, three image sensing means 2A to 2C is thrown into a state in which electric signals generated in the sensors 23 are stored into the first to sixth signal storage/read-out CCDs 24A to 24F (image mode). Meanwhile, another image sensing means 2A to 2C is thrown into a state in which electric signals generated in the sensors 23 are stored into the first to sixth signal storage/read-out CCDs 24A to 24F while the electric signals are inputted from the monitor CCD 39 to the brightness monitoring means 13 so that the brightness of the incident beam of light is monitored (image sensing/monitoring mode). Further meanwhile, the other one image sensing means 2A to 2C is thrown into a state in which electric signals stored in the first to sixth charge storages 25a to 25f of the first to sixth signal storage/read-out CCDs 24A to 24F within the individual pixels 20 are held (hold mode). Thus, as shown in FIG. 12, the three image sensing means 2A, 2B, 2C are operated alternately in the image sensing mode, the image sensing/monitoring mode, and the hold mode, by which the image sensing is carried out. With regard to one image sensing means 2A to 2C, the modes are iterated in the order of the image mode, the image sensing/monitoring mode, and the hold mode.

The first to sixth signal storage/read-out CCDs 24A to 24F each comprising six charge storages 25a to 25f are provided in each pixel 20, and the six signal storage/read-out CCDs on any one of signal storage/read-out CCDs 24A to 24F are connected in series to the sensor 23 of one pixel 20 as described before, where totally 36 charge storages 25a to 25f are connected to one sensor 23. Therefore, the first drive circuit 44A switches 36 times the first to sixth signal storage/read-out CCDs 24A to 24F in the image sensing mode or the image sensing/monitoring mode.

First in the image sensing mode, the first switching means 30A is opened, the second switching means 30B is closed, the third switching means 30C is opened, the fourth switching means 30D is opened, and the fifth switching means 30E is closed, in which state the first to sixth signal storage/read-out CCDs 24A to 24F of each pixel 20 are actuated by the first drive circuit 44A while the monitor CCD 39 is actuated by the fifth drive circuit 47. Electric signals generated in the sensors 23 of the pixels 20 responsive to the brightness of the incident beams of light are transferred successively to the first to sixth, six charge storages 25a to 25f of the first to sixth signal storage/read-out CCDs 24A to 24F connected in series to the sensor 23. Also, the electric signals that have been stored in the first to sixth charge storages 25a to 25f of the first to sixth signal storage/read-out CCDs 24A to 24F previously when the image sensing mode is entered are discharged successively to the drain line 42 via the signal discharge line 31, the monitor line 37, and the monitor CCD 39.

In the image sensing/monitoring mode, the first switching means 30A is opened, the second switching means 30B is closed, the third switching means 30C is opened, the fourth switching means 30D is closed, and the fifth switching means 30E is opened. In this image sensing/monitoring mode, the first to sixth signal storage/read-out CCDs 24A to 24F of each pixel 20 are actuated, while the monitor CCD 39 is actuated. Electric signals generated in the sensors 23 of the pixels 20 are transferred successively to the first to sixth charge storages 25a to 25f of the six signal storage/read-out CCDs 24A to 24F connected to the sensor 23 in series. Also, the electric signals that have been stored in the first to sixth charge storages 25a to 25f of the first to sixth signal storage/read-out CCDs 24A to 24F previously when the image sensing/monitoring mode is entered are inputted to the brightness monitoring means 13 via the signal discharge line 31, the monitor line 37, the monitor CCD 39, the amplifier 11, and the A/D converter 12.

In the hold mode, both the first switching means 30A and the second switching means 30B are opened, while the first to sixth signal storage/read-out CCDs 24A to 24F of the pixels 20 are stopped from being actuated. Thus, the electric signals stored in the first to sixth charge storages 25a to 25f within the first to sixth signal storage/read-out CCDs 24A to 24F are held as they are.

Figure 13:
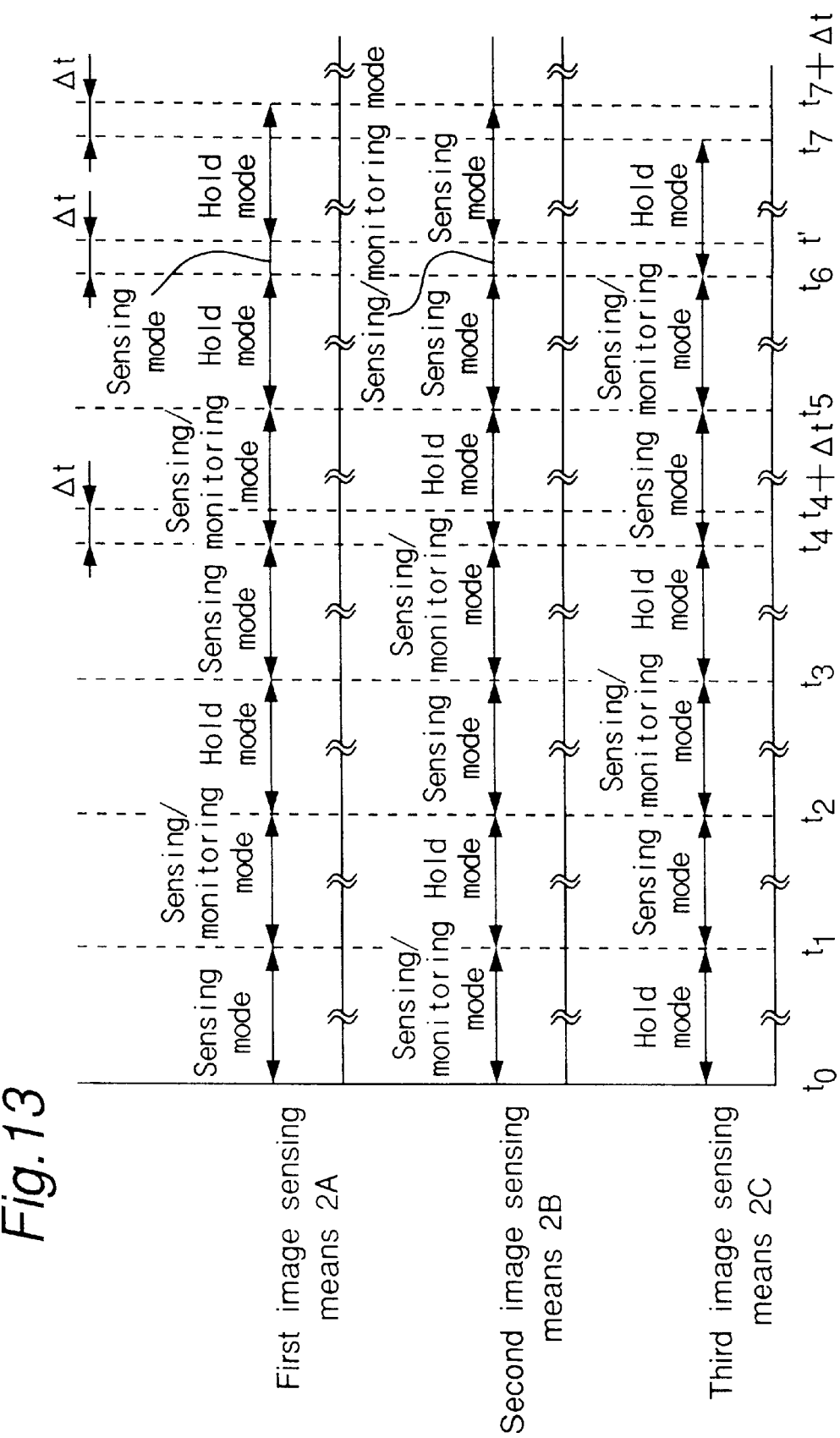
FIG. 13 is a diagram for explaining the operation of the second embodiment.

FIG. 13 shows an example of the operation of the second embodiment. In this example, the operation is started with the first image sensing means 2A in the "image sensing mode", the second image sensing means 2B in the "image sensing/monitoring mode", the third image sensing means 2C in the "hold mode" (hereinafter, this state will be referred to as a "first state").

The image sensing apparatus starts up at time $t_0$, the period from this time $t_0$ to time $t_1$ being in the first state.

In this first state, electric signals generated in the sensors 23 of the pixels 20 of the first image sensing means 2A are transferred successively to the first to sixth charge storages 25a to 25f of the first to sixth signal storage/read-out CCDs 24A to 24F. Also, in the meantime, electric signals are discharged successively from the sixth charge storage 25f of the first to sixth signal storage/read-out CCDs 24A to 24F to the drain line 42 via the signal discharge line 31, the monitor line 37, and the monitor CCD 39.

In the second image sensing means 2B kept in the image sensing/monitoring mode in the first state, electric signals are transferred successively from the sensors 23 of the pixels 20 to the first to sixth charge storages 25a to 25f of the first to sixth signal storage/read-out CCDs 24A to 24F. Also, electric signals are inputted from the sixth charge storages 25f of the first to sixth signal storage/read-out CCDs 24A to 24F to the brightness monitoring means 13 via the signal discharge line 31, the monitor line 37, the monitor CCD 39, the amplifier 11, and the A/D converter 12.

In the first state, in the third image sensing means 2C that is in the hold mode, since the first to sixth signal storage/read-out CCDs 24A to 24F of each pixel 20 are out of operation, electric signals of the first to sixth charge storages 25a to 25f of the first to sixth signal storage/read-out CCDs 24A to 24F are held as they are, without being transferred.

Next, from time $t_1$ to $t_2$, the first image sensing means 2A is kept in the monitoring mode, the second image sensing means 2B is kept in the hold mode, and the third image sensing means 2C is kept in the image sensing mode (second state).

In this second state, since the first image sensing means 2A that has been in the image sensing mode in the first state is thrown into the image sensing/monitoring mode, electric signals corresponding to 36 frames of images captured during the period from time $t_0$ to $t_1$ and held in the first to sixth signal storage/read-out CCDs 24A to 24F of the pixels 20 of the first image sensing means 2A are inputted successively to the brightness monitoring means 13 via the monitor CCD 39, together as electric signals generated in the sensors 23 are transferred to the first to sixth charge storages 25a to 25f of the first to sixth signal storage/read-out CCDs 24A to 24F. The images in this second state are also stored in the first to sixth electric signal storages 25a to 25f of the first to sixth signal storage/read-out CCDs 24A to 24F of the pixels 20 of the third image sensing means 2C that is kept in the image sensing mode.

Next, from time $t_2$ to $t_3$, the first image sensing means 2A is kept in the hold mode, the second image sensing means 2B is kept in the image sensing mode, and the third image sensing means 2C is kept in the image sensing/monitoring mode (third state).

In this third state, since the third image sensing means 2C that has been in the image sensing mode in the second state is thrown into the image sensing/monitoring mode, electric signals corresponding to images captured during the period from time $t_0$ to $t_1$ are inputted successively to the brightness monitoring means 13 together as electric signals generated in the sensors 23 of the pixels 20 of the third image sensing means 2C are transferred to the first to sixth charge storages 25a to 25f.

From this time on, the image sensing is continued while the first to third states are iterated. For example, if the brightness monitoring means 13 has decided that, at time t' when a time interval $\Delta t$ has elapsed from time $t_6$ that is the start time of the third state, a rapid change has occurred to any one of the sixteen areas A1 to A16 of the photo-receptive area 21 of the pixels 20 of the image sensing means 2B that is in the image sensing/monitoring mode, then the brightness monitoring means 13 outputs a detection signal to the trigger signal generating means 14. The trigger signal generating means 14 in turn outputs a trigger signal to the first to third image sensing means 2A.

The first image sensing means 2A, upon receiving the trigger signal, switches over from the image sensing mode to the hold mode. The third image sensing means 2C, even upon receiving the trigger signal, maintains in the hold mode. The second image sensing means 2B, upon receiving the trigger signal, switches over from the image sensing/monitoring mode to the image sensing mode, being kept in the image sensing mode until time $t_7+\Delta t$ when the aforementioned $\Delta t$ has elapsed from time $t_7$ that is the end time of the third state. At this time $t_7+\Delta t$, the image sensing terminates, and the first to third image sensing means 2A to 2C are all thrown into the hold mode.

At this time point of time $t_7+\Delta t$ that is the end time of image sensing, the first image sensing means 2A has stored electric signals corresponding to 36 frames of images obtained during the period from time $t_4+\Delta t$ to time $t_5$ and the period from time $t_6$ to time t'. Also the second image sensing means 2B has stored electric signals corresponding to 36 frames of images obtained during the period from time t' to $t_7+\Delta t$. Further, the third image sensing means 2C has stored electric signals corresponding to 36 frames of images obtained during the period from time $t_5$ to time $t_6$. As shown above, at the time point of time $t_7+\Delta t$, electric signals corresponding to images obtained during the period from time $t_4+\Delta t$ to time $t_7+\Delta t$. It is time t' during the period from time $t_6$ to time $t_7$, when the trigger signal is outputted. However, electric signals corresponding to the images obtained during the period from time $t_5$ to time $t_6$ have been inputted to the brightness monitoring means 13 during the time period from time $t_6$ to time $t_7$. Therefore, it is during this period from time $t_5$ to time $t_6$ that the subject actually undergoes a change. Accordingly, if electric signals corresponding to the images of the time period from time $t_4+\Delta t$ to time $t_7+\Delta t$ as described above, then 108 frames of continuous images including the instance at which a rapid change in brightness has occurred can be obtained.

For signal read process, in the first to third image sensing means 2A, the first switching means 30A of the pixels 20 are closed, the second switching means 30B are closed, and the third switching means 30C are closed, in which state the scanning CCDs 32A to 32F and the read CCD 35 are operated. Electric signals stored in the first to sixth signal storage/read-out CCDs 24A to 24F of the pixels 20 of the first to third image sensing means 2A to 2C are outputted to the amplifier 4 and the A/D converter 5 via the sixth charge storages 25f of the first to sixth signal storage/read-out CCDs 24A to 24F of the pixels 20 with i=216, the scanning line 34, the scanning CCDs 32A to 32F, and the read CCD 35, where the electric signals are amplified and converted from analog to digital form and then stored in the main memory 6. For reproduction of the images, the images within the main memory 6 are signal-processed by the image processing means 7 as described before, and displayed onto the monitor display 9 at an appropriate reproduction rate.

In the image sensing mode and the image sensing/monitoring mode, the first to sixth signal storage/read-out CCDs 24A to 24F of the first to third image sensing means 2A to 2C are operated at $10^{-6}$ sec. intervals. Accordingly, the frame rate is $10^6$ frames/sec, a speed enough high for scientific measurement. Also, since the first to third image sensing means 2A to 2C are used to conduct the image sensing, a total of 108 frames of continuous images can be obtained. If the reproduction rate is set to 4 frames/sec., then the reproduction time is 27 sec., sufficient for use as a video camera.

For the set-up procedure in the image sensing apparatus of the second embodiment, in either one of the first to third image sensing means 2A to 2C, the first switching means 30A is closed, the second switching means 30B is opened, and the third switching means 30C is closed. In this state, the first to sixth signal storage/read-out CCDs 24A to 24F are actuated by the second drive circuit 44B, while the scanning CCDs 32A to 32F and the read CCD 35 by the drive circuits 45, 46. Thus, electric signals generated in the sensors 23 are outputted to the amplifier 4 and the A/D converter 5 via the first to sixth signal storage/read-out CCDs 24A to 24F, the scanning CCDs 32A to 32F, and the read CCD 35. Then, image signals stored in the main memory 6 are formed into images by the sensor 7 and displayed onto the monitor display 9.

In addition, in the image sensing apparatus of this embodiment, if color filters are fitted to the individual image sensing means 2A, 2B, 2C, in which the image sensing process is performed while the image sensing means 2A, 2B, 2C are fully synchronized with one another, color image sensing is enabled. Further, with a trigger signal generating means provided independently of the image sensing means 2A, 2B, 2C, the image sensing process may be carried out in such a way that the three image sensing means 2A, 2B, 2C are operated for image sensing one by one, while the rest of the image sensing means is kept at rest.

Third Embodiment

Figure 14:
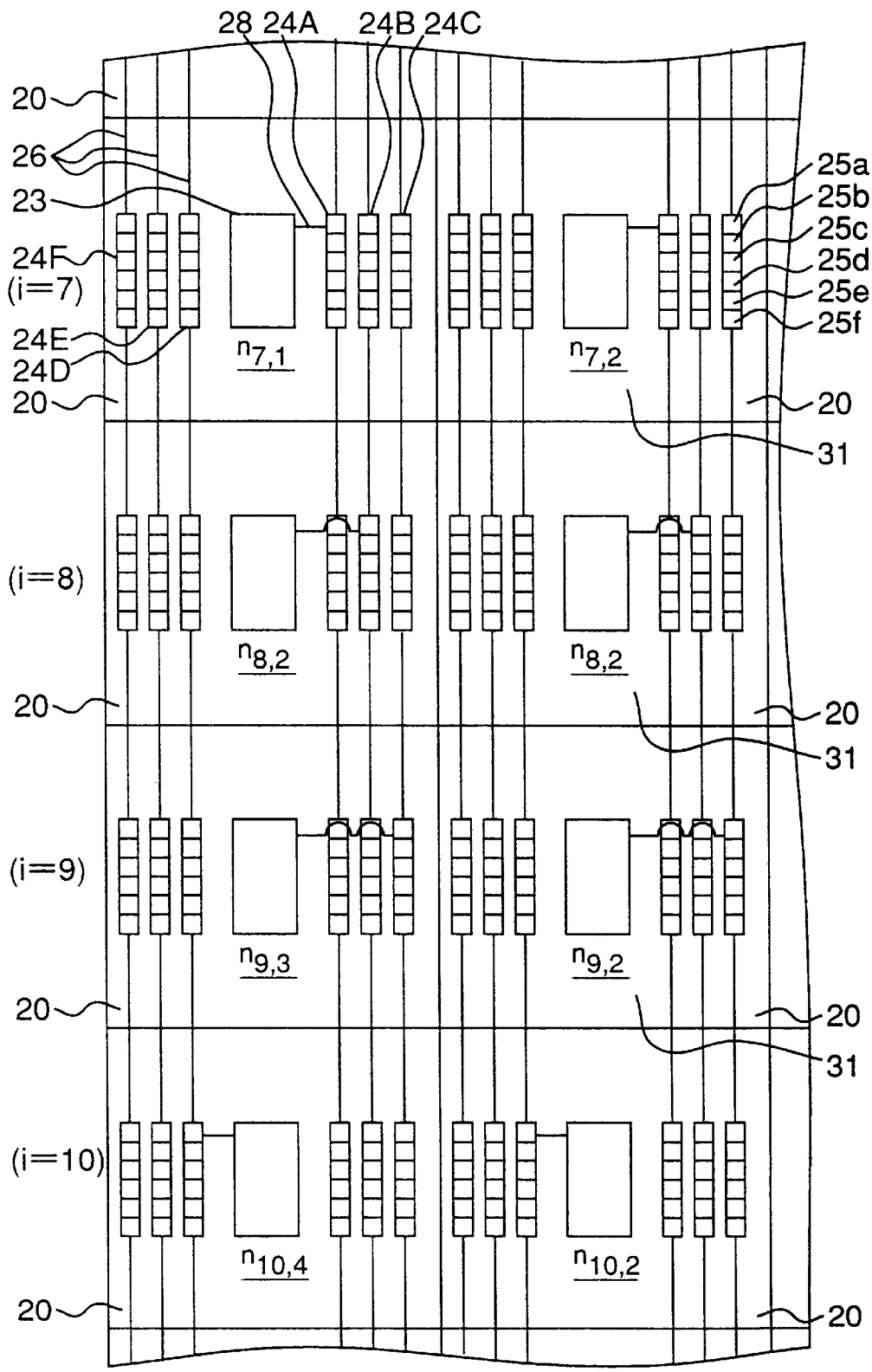
FIG. 14 is a partly enlarged view showing a third embodiment of the present invention.

FIG. 14 shows a third embodiment of the present invention. In this third embodiment, the first switching means 30A and the second switching means 30B are eliminated, and the first to sixth signal storage/read-out CCDs 24A to 24F of pixels 20 constituting the same column are arranged all in series, wherein the state of arrangement is as shown in FIG. 5 for both the image sensing process and the reading process. In this third embodiment, for image sensing, the image sensing process is started upon input of a trigger signal derived from the trigger signal generating means provided outside the image sensing apparatus, and the image sensing is ended at a time point when 36 frames of images are finished being sensed (the time point when charges are just stored to all of the first to sixth charge storages 25a to 25f of each pixel 20). For signal reading, as in the first embodiment, charges can be read out in the unit of column in parallel by the first to sixth scanning CCDs 32A to 32F and the read CCD 35.

In this third embodiment, since the first to sixth signal storage/read-out CCDs 24A to 24F of the pixels 20 constituting the same column are connected all in series as described above, signals overwrite as could be done in the first embodiment is disabled. This gives rise to the need of inputting trigger signals from external. However, there is no need of providing any switching means in each pixel 20, so that the pixel 20 can be even further simplified in construction.

Fourth Embodiment

Figure 15:
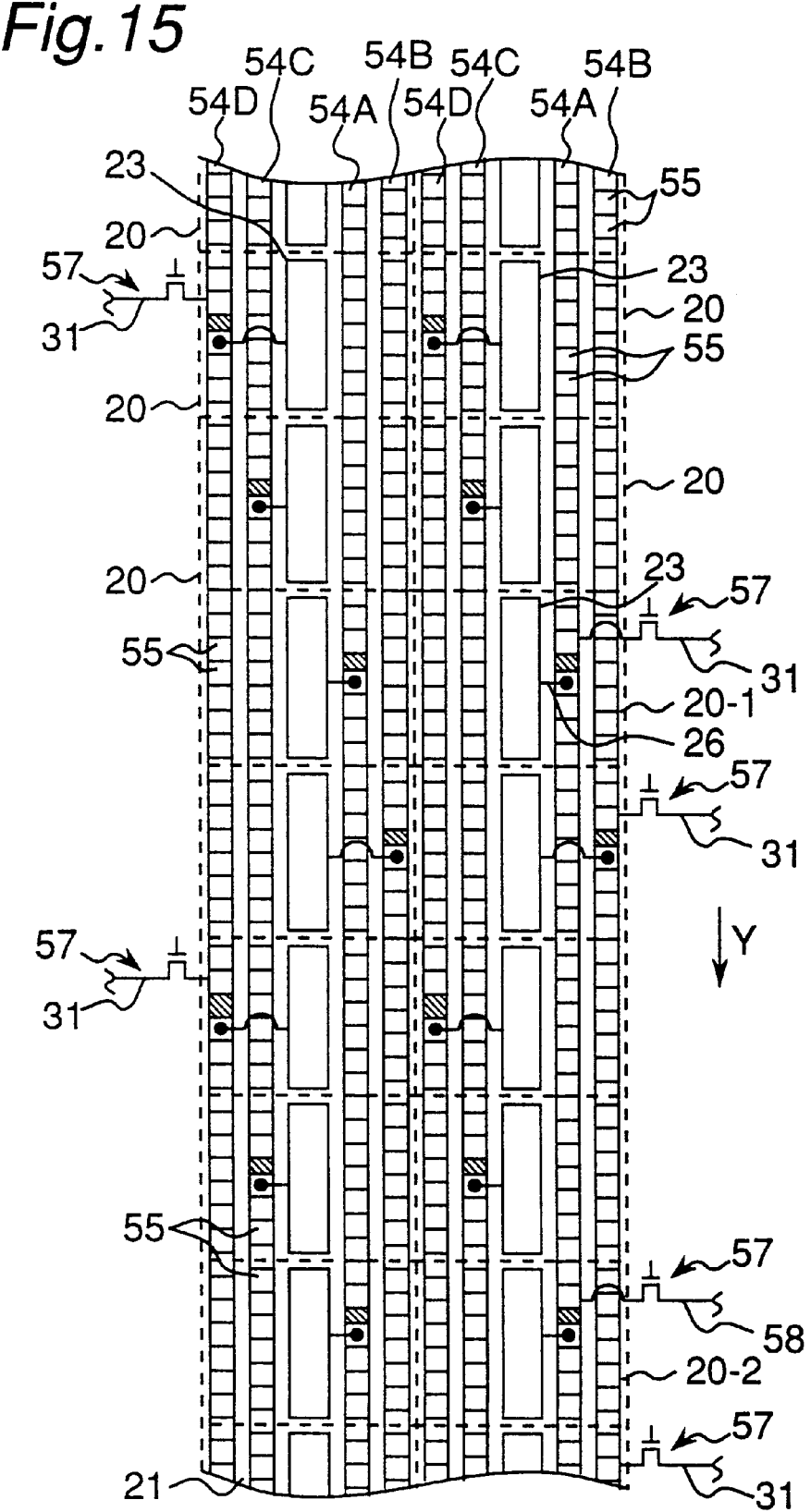
FIG. 15 is a partly enlarged view showing a fourth embodiment.
Figure 16:
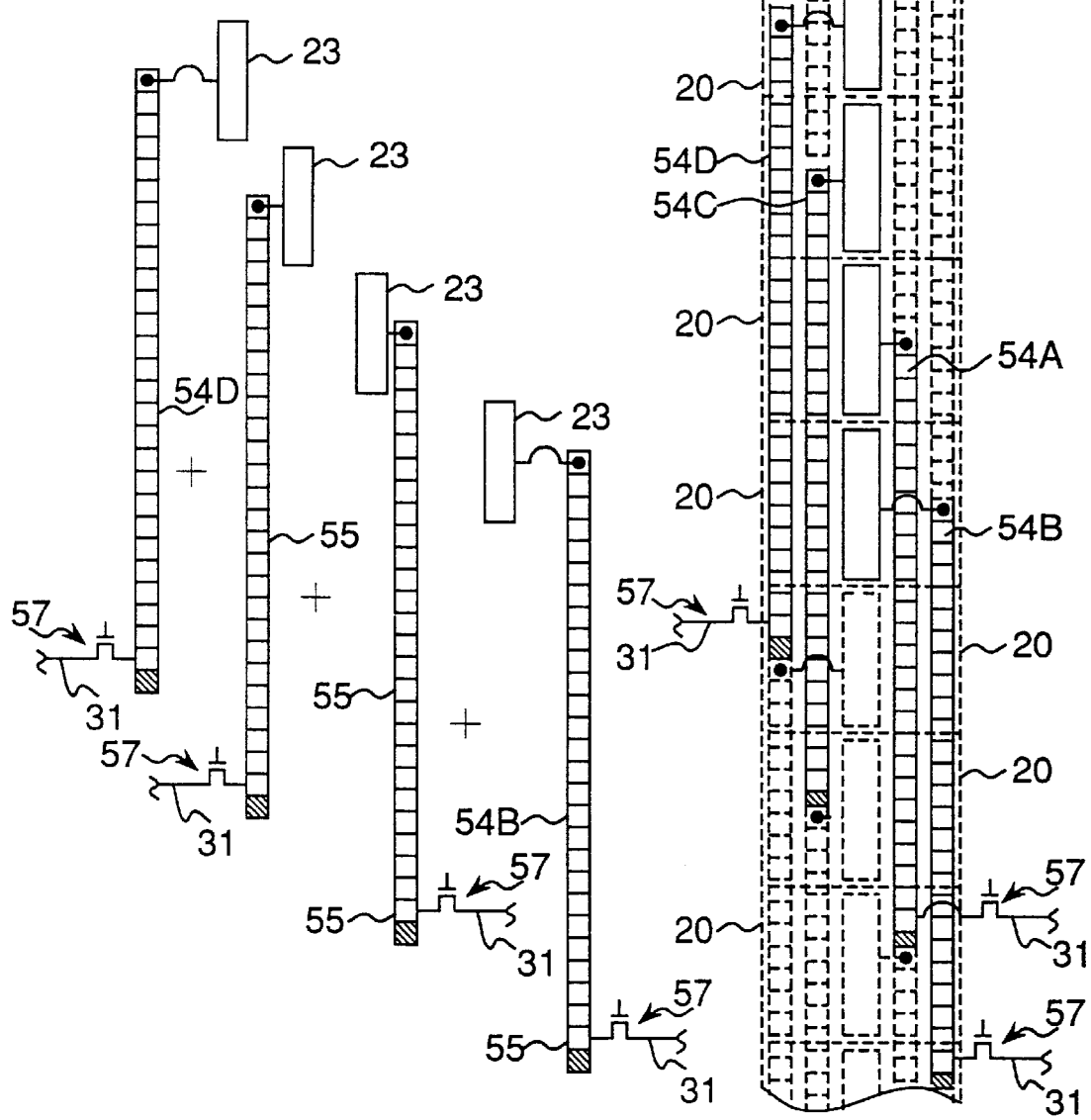
FIG. 16 is a schematic diagram for explaining the construction of the photo-receptive area in the fourth embodiment.

FIGS. 15 and 16 show a fourth embodiment of the present invention.

In the first to third embodiments, it has been arranged that the first to sixth signal storage/read-out CCDs 24A to 24F provided in each of the pixels 20 constituting the same column are connected in series by lead wires 26. However, in this fourth embodiment, longer, linear-shaped signal storage/read-out CCDs 54A to 54D each comprising a large number of charge storages 55 are provided so as to be elongated and placed on more than two pixels 20.

In more detail, as shown in FIG. 15, on the right side in the figure of the sensors 23 constituting the same column are provided a first signal storage/read-out CCD 54A and a second signal storage/read-out CCD 54B. On the left side in the figure of the sensors 23 are provided a third signal storage/read-out CCD 54C and a fourth signal storage/read-out CCD 54D.

The first to fourth signal storage/read-out CCDs 54A to 54D, which are linear-shaped CCDs each comprising a large number of charge storages 55, are elongated over the pixels 20 constituting the same column from top end to bottom end of the photo-receptive area 21. The first to fourth signal storage/read-out CCDs 54A to 54D are provided in parallel to one another.

The sensors 23 of every vertically fourth pixels 20 are connected to the first signal storage/read-out CCD 54A with the lead wires 26. In the first signal storage/read-out CCD 54A, there are 27 charge storages 55 in each range from a charge storage 55 to which a sensor 23 is connected to another charge storage 55 to which the upward or downward neighboring sensor 23 is connected. Likewise, the sensors 23 of every vertically fourth pixels 20 are connected to the second to fourth signal storage/read-out CCDs 54B to 54D, where 27 charge storages 55 are present in each range from a charge storage 55 to which a sensor 23 is connected to another charge storage 55 to which the upward or downward neighboring sensor 23 is connected.

Further, in the first to fourth signal storage/read-out CCDs 54A to 54D, a signal discharge line 31 on which a switching means 57 comprising a MOS switch is interveniently provided is connected to a charge storage 55 that is two upper than the charge storage 55 to which a sensor 23 is connected.

Figure 27:
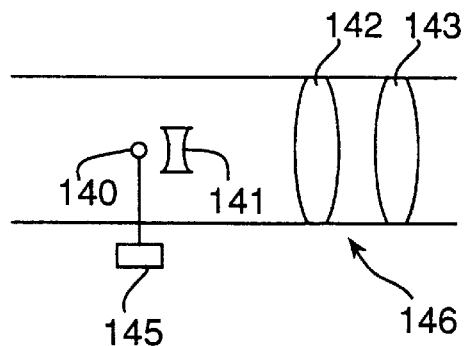
FIG. 27 is a schematic diagram showing an adjustment device.

During an image sensing process, out of the charge storages 55 of the first to fourth signal storage/read-out CCDs 54A to 54D, one charge storage 55 that is the upward first one to which the lead wire 26 is connected (a pixel hatched in FIG. 15) is set higher in potential than the other charge storages 55, so that electric signals will not be transferred through the hatched charge storage 55. Therefore, during an image sensing process, as schematically shown in FIGS. 16, 27 charge storages 55 of the first to fourth signal storage/read-out CCDs 54A to 54D are connected to the sensor 23 of each pixel 20. Also during the image sensing process, the switching means 57 interveniently provided on the signal discharge line 31 is closed.

As indicated by arrow Y in FIG. 15, electric signals generated in the sensors 23 during the image sensing process are successively transferred in parallel downward in the figure through the charge storages 55 of the first to fourth signal storage/read-out CCDs 54A to 54D connected to the sensors 23. Since the hatched charge storage 55 is set to a higher potential as described above, the electric signals will not be transferred to the hatched charge storage 55 but be discharged through the signal discharge line 31. The signal discharge line 31 is connected to a brightness monitoring means (not shown) via an amplifier and an A/D converter and the like as in the first embodiment. When the trigger signal generating means outputs a trigger signal, the image sensing process is halted.

At the time of this image sensing halt, electric signals generated in the sensors 23 of the pixels corresponding to 27 frames of images have been stored in the first to fourth signal storage/read-out CCDs 54A to 54D.

During a signal read process, the switching means 57 interveniently provided on the signal discharge line 31 is opened, while the hatched charge storage 55 set to a high potential in the image sensing process is returned to the same potential as that of the other charge storages 55. In this state, the first to fourth signal storage/read-out CCDs 54A to 54D are long, linear shaped, extending from upper to lower side of the photo-receptive area 21. As the first to fourth signal storage/read-out CCDs 54A to 54D are actuated, the electric signals stored in their charge storages 55 are transferred successively from upper to lower side as indicated by arrow Y in the figure, and then outputted from unshown scanning CCDs and read CCDs provided outside the photo-receptive area 21, to the main memory via the amplifier and the A/D converter.

In this fourth embodiment, whether in the image sensing process or in the signal reading process, electric signals are transferred parallel from upper to lower side through the first to fourth signal storage/read-out CCDs 54A to 54D, which are linear shaped parallel to one another as described before. Thus, the direction in which electric signals are transferred is identical between the image sensing and the signal reading processes. Accordingly, the image sensing apparatus of this fourth embodiment is also simple in the construction of the drive circuits that actuate the first to fourth signal storage/read-out CCDs 54A to 54D.

Since both the storage of electric signals for image sensing and the transfer of electric signals for signal reading can be accomplished by the first to fourth signal storage/read-out CCDs 54A to 54D, it is unnecessary to provide signal read CCDs within the photo-receptive area 21 independently of the first to fourth signal storage/read-out CCDs 54A to 54D. Therefore, while the area of the sensor 23 is ensured so as to provide enough intensity of light, the number of charge storages 55 in each of the signal storage/read-out CCDs 54A to 54D can be increased.

Further, since there are no bends in the direction in which electric signals are transferred, the pixels 20 can be prevented from deteriorating due to the remaining of electric signals.

In the fourth embodiment, it is arranged that 27 charge storages 55 are connected to the sensor 23 of each pixel 20 in the image sensing process. However, this number of charge storages 55 connected may be around 35 to 50, in which case the number of continuous frames of images required to make up motion images as described before can be implemented.

Other arrangements and functions of the fourth embodiment are the same as in the first embodiment.

Fifth Embodiment

Figure 17A:
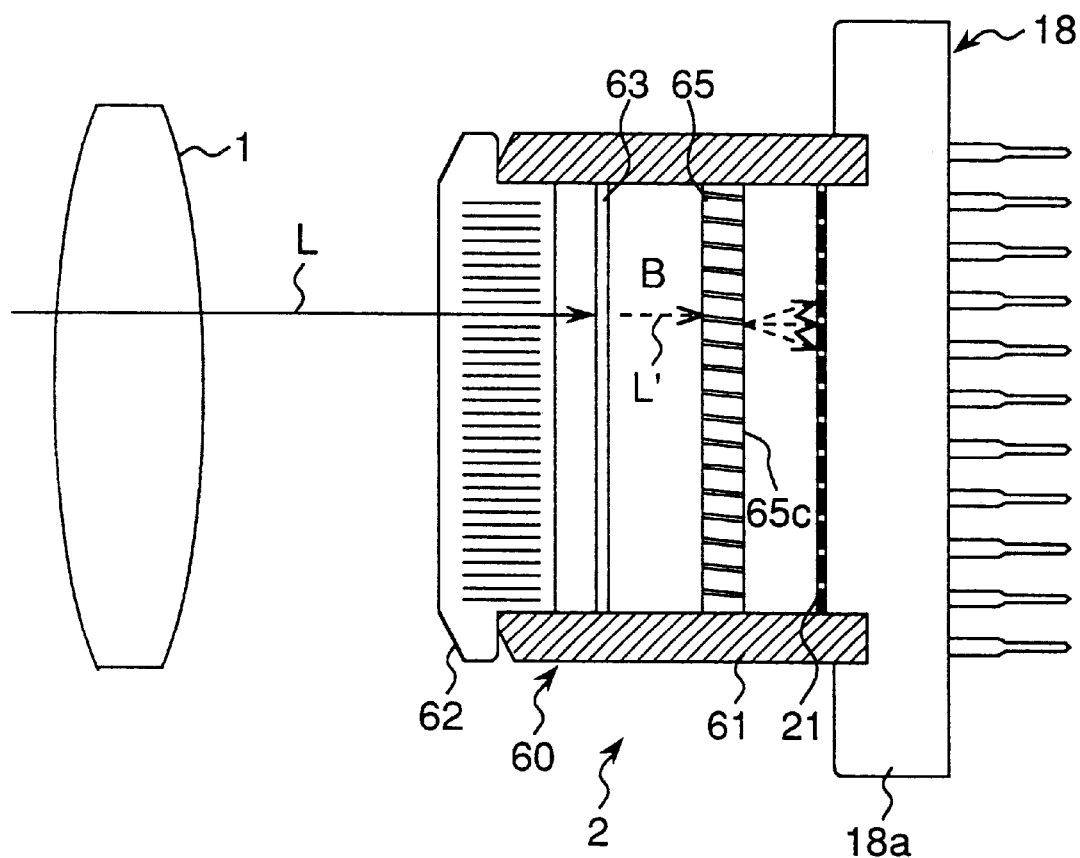
FIG. 17A is a schematic sectional view showing the MCP type II in the fifth embodiment and FIG. 17B is a schematic view for explaining the avalanche effect.
Figure 17B:
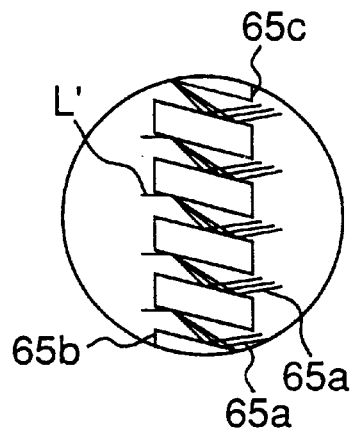
Figure 18:
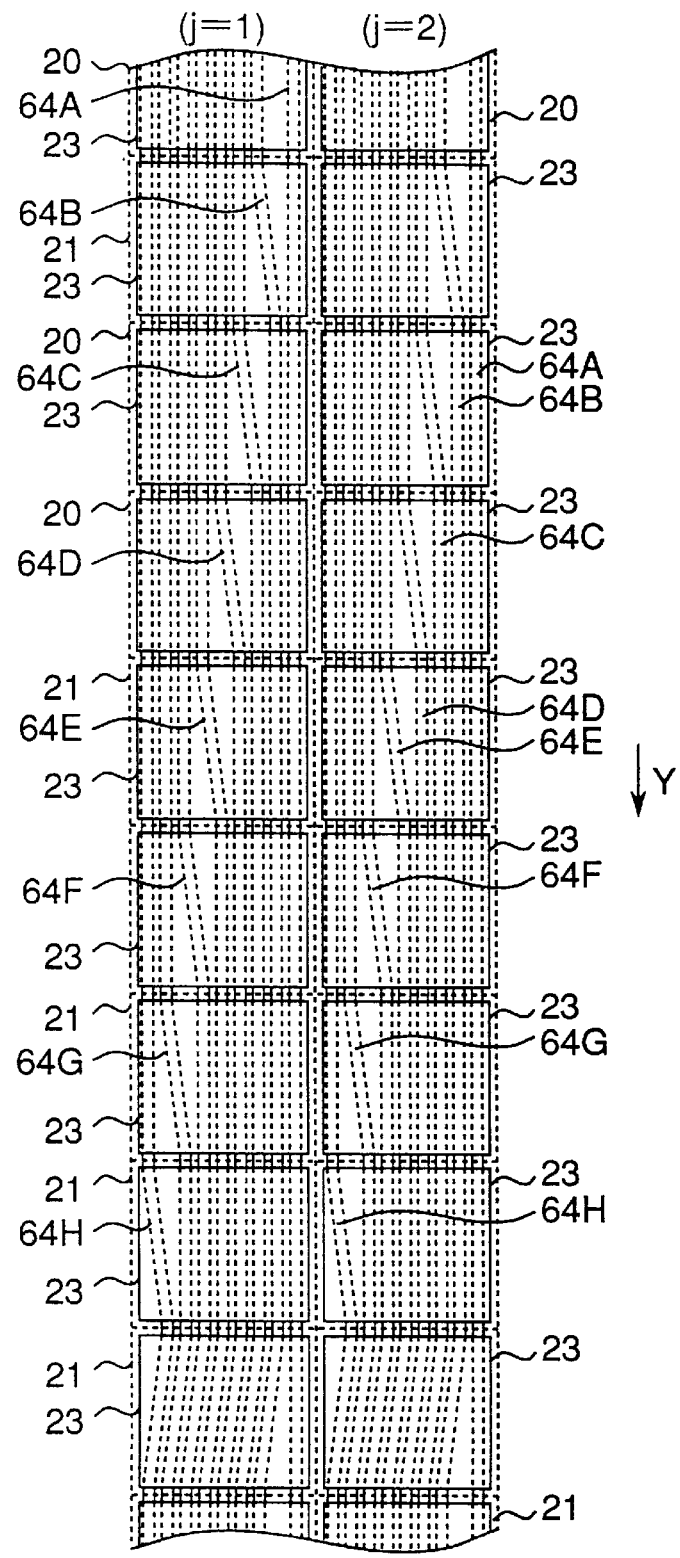
FIG. 18 is a partly enlarged view showing the top surface of the photo-receptive area of the image sensing apparatus according to the fifth embodiment.
Figure 19:
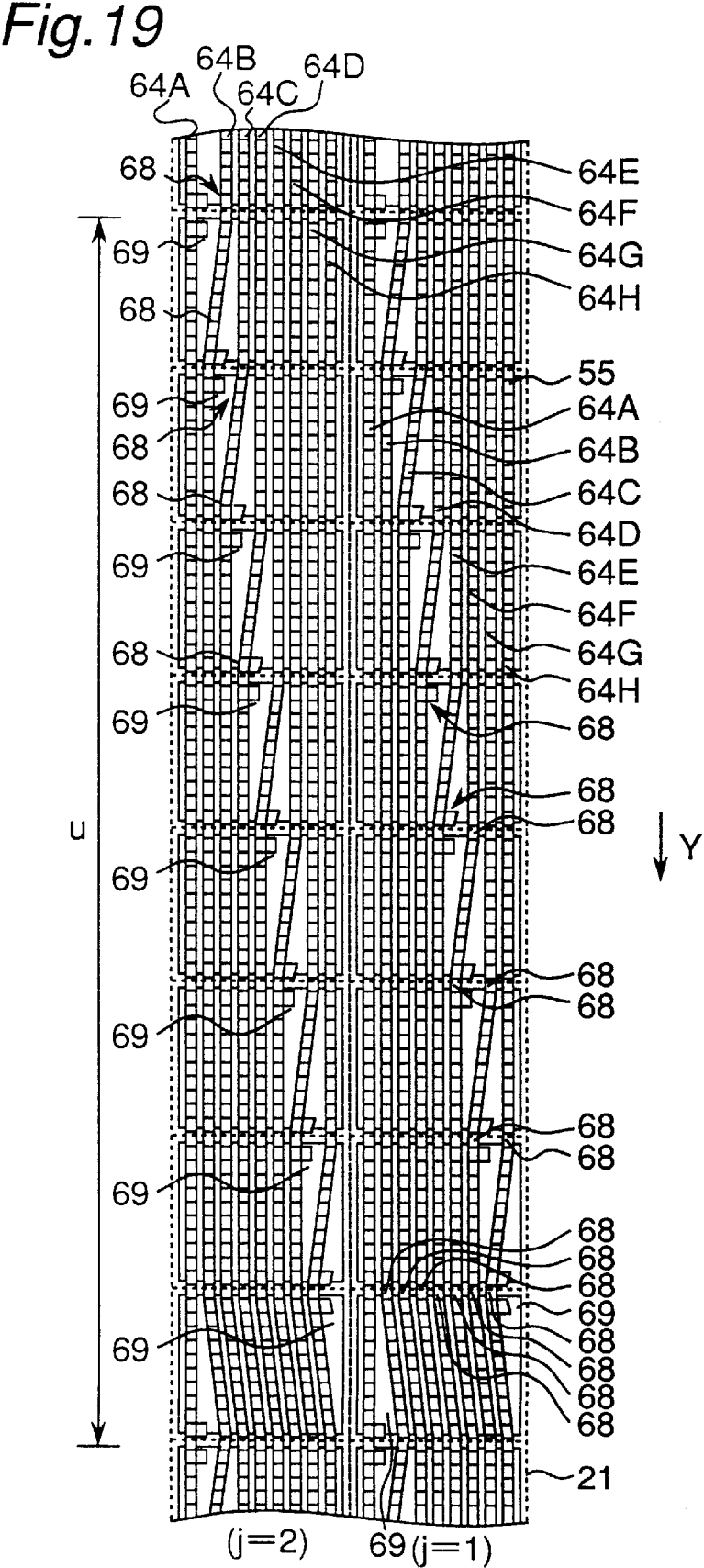
FIG. 19 is a partly enlarged view showing the rear surface of the photo-receptive area of the image sensing apparatus according to the fifth embodiment.

FIGS. 17 to 19 show a fifth embodiment of the present invention.

In the first to fourth embodiments, it is arranged that a beam of light converged by the lens system 1 will be reached on the sensors 23 of the pixels 20. However, in this fifth embodiment, incident light is transformed into an electron flow, where it is intensified, and is entered into the sensors 23 of the pixels 20.

The image sensing unit 2 in the fifth embodiment is constructed as shown in FIG. 17A, where an image sensor 18 is fitted to an MCP type II 60.

The MCP type II 60 has an incident window member 62 made of fiber glass and provided at an opening on one end side of a tubular member 61 whose interior is a vacuum, as well as a photo-receptive area 63 and a micro-channel plate (MCP) 65 provided in succession to the incident window member 62. Also, a casing 18a of the image sensor 18 is fitted at the opening on the other end side of the tubular member 61, where the photo-receptive area 21 of the image sensor 18 is opposed to the MCP 65 at a required spacing therefrom.

A beam of light L reached on the image sensing unit 2 from the lens system 1 comes incident on the front surface of the incident window member 62 to impinge on the photo-receptive area 63, where it is transformed into an electron flow L' of an intensity corresponding to the intensity of light, thus entering the MCP 65. The MCP 65 is of a known construction, where a large number of holes 65a, 65a, . . . are provided as shown in FIG. 17B and a potential difference is given between a front surface 65b and a rear surface 65c. Photoelectrons constituting the electron flow emitted from the photo-receptive area 63 pass the holes 65a, during which the photoelectrons collide with the walls of the holes 65a, giving rise to an avalanche phenomenon that numerous secondary electrons are emitted. As a result, the number of electrons is increased. The photoelectrons are also accelerated by the electric field formed in the MCP 65. In this way, an intensified electron flow is reached on the photo-receptive area 21 of the image sensor 18.

As shown in FIGS. 18 and 19, on the photo-receptive area 21 of the image sensor 18, a large number of square pixels 20 are arrayed in a matrix. With a stacked structure in which the sensors 23 and the signal storage/read-out CCDs 64A to 64H are provided on different surfaces, respectively, the area of the sensors 23 is set to a large one.

More specifically, as shown in FIG. 18, on a side (front surface) of the photo-receptive area 21 on which the electron flow L' is reached, the sensor 23 is provided in each pixel 20. This sensor 23 is made of a metal electrode and shaped into a square having nearly the same area as each pixel 20.

Meanwhile, as shown in FIG. 19, on the side (rear surface) of the photo-receptive area 21 opposite to the above front surface, the first to eighth signal storage/read-out CCDs 64A to 64H are provided.

The first to eighth signal storage/read-out CCDs 64A to 64H are linear shaped, each comprising a large number of charge storages 55, and elongated and placed on more than two pixels 20 vertically in the figure of the photo-receptive area 21. In other words, on the rear surface side of the sensors 23 of a plurality of pixels 20, 20, . . . arrayed vertically and constituting the same column, provided are the first to eighth signal storage/read-out CCDs 64A to 64H in the order from left to right.

As shown in FIG. 19, the first to eighth signal storage/read-out CCDs 64A to 64H cover nearly the whole rear surfaces of the pixels 20 constituting the same column. However, in order to provide clearances 69 for placing first and second switching charge storages 72A, 72B which will be described later, meanders 68 are provided partly in the second to eighth signal storage/read-out CCDs 64B to 64H.

Now, the meander structure of the first to eighth signal storage/read-out CCDs 64A to 64H is explained with respect to one column with j=1. The structure is the same also with the column with j=2 and its followings, where meanders 68 are provided in the first to eighth signal storage/read-out CCDs 64A to 64H.

Referring first to the structure of the first to eighth signal storage/read-out CCDs 64A to 64H, eighth pixels 20, 20, . . . arrayed vertically are taken as one unit (unit u), the unit u being repeated by every pixels 20 constituting the same column.

Figure 20:
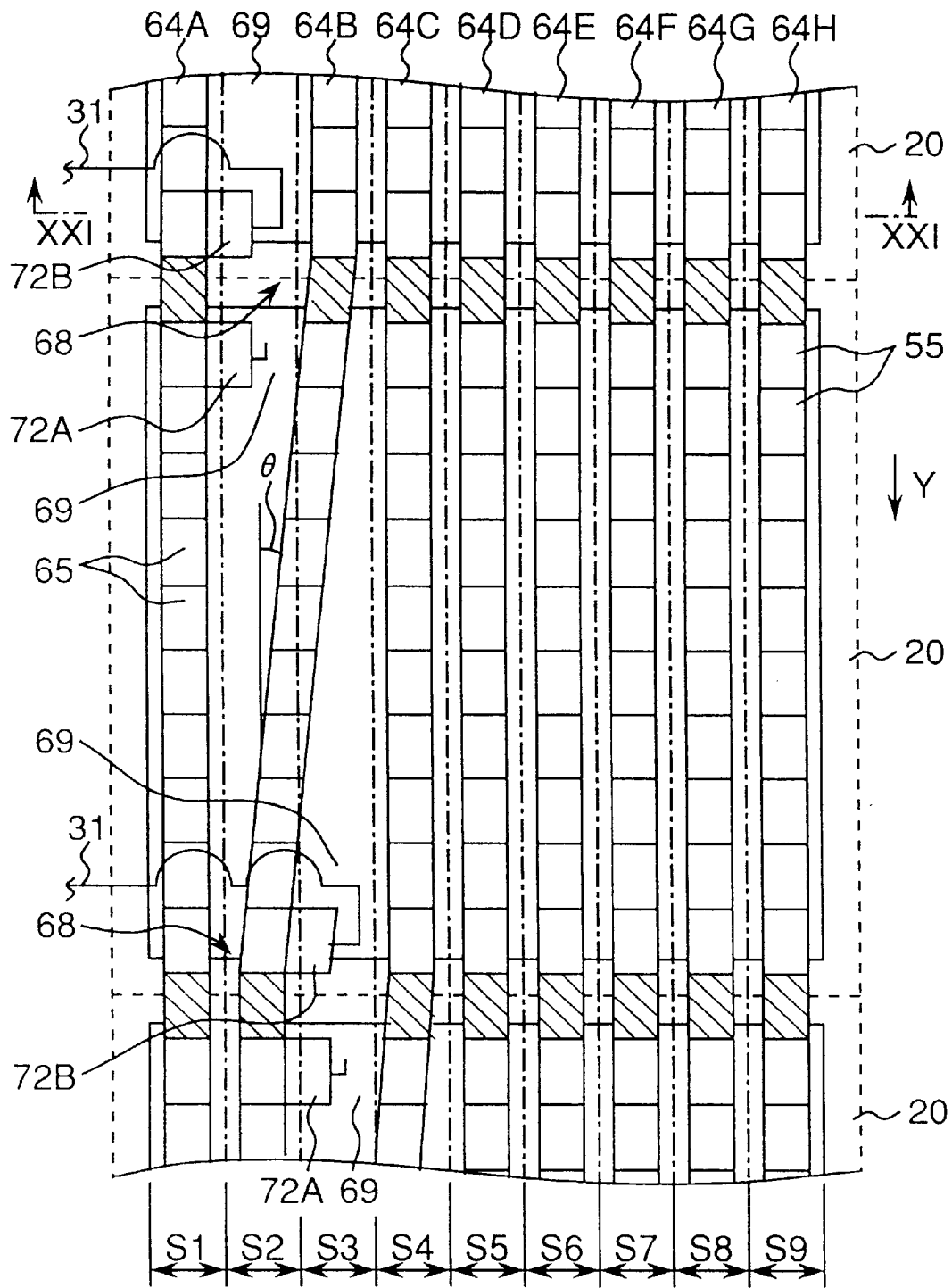
FIG. 20 is a partly enlarged view of FIG. 19.

As shown in FIG. 20, nine intervals s1 to s9 with a laterally equal width of the pixels 20 are dividedly defined, and the signal storage/read-out CCDs 64A to 64H are placed to the intervals s1 to s9, respectively. Since eight signal storage/read-out CCDs 64A to 64H are placed to nine intervals s1 to s9, there is one of the intervals s1 to s9 left. By making use of the remaining one interval s1 to s9, the second to eighth signal storage/read-out CCDs 64A to 64H are obliquely slashed and placed.

For example, in one pixel 20 that is located at the uppermost place in FIG. 19 out of the unit u of eight pixels 20 arrayed vertically, as shown in FIGS. 19 and 20, the first signal storage/read-out CCD 64A, which is linear, passes the first interval s1. Also, the third to eighth signal storage/read-out CCDs 64C to 64H, which are also linear, pass the fourth to ninth intervals s4 to s9, respectively. Meanwhile, meanders 68, 68 are provided in the second signal storage/read-out CCD 64B at upper end and lower end sides of the pixel 20, so that it passes the third interval s3 at the upper end side of the pixel 20 and passes the second interval s2 at its lower end side.

In a pixel 20 that is located at the second uppermost in FIG. 19 out of the unit u of eight pixels 20 arrayed vertically, the first and second signal storage/read-out CCDs 64A, 64B and the fourth to eighth signal storage/read-out CCDs 64E to 64H are placed linearly, while meanders 68, 68 are provided to the third signal storage/read-out CCD 64C so that it passes the fourth interval s4 at the upper end side of the pixel 20 and passes the second interval s5 at its lower end side. Likewise, for the remaining, out of the unit u of eight pixels 20 arrayed vertically, in the third to seventh uppermost pixels 20, 20, . . . in FIG. 19, meanders 68 are provided in the fourth to eighth signal storage/read-out CCDs 64D to 64H, respectively in this order, so that clearances 69 are provided within the pixel 20. Further, in the eighth uppermost pixel 20 in FIG. 19 out of the eight pixels 20 arrayed vertically, meanders 68, 68 are provided in the second to eighth signal storage/read-out CCDs 64B to 64H, respectively, so that clearances 69 are provided within the pixel 20.

It is noted that the meander angle θ of the meanders 68 of the second to eighth signal storage/read-out CCDs 64B to 64H is preferably not more than 10°.

In the first to seventh uppermost pixels 20, 20, . . . out of the unit u of eight pixels 20 arrayed vertically, clearances 69 are defined on both sides of the signal storage/read-out CCDs 64B to 64H in which the meanders 68 are provided. For example, in the case of the uppermost pixel 20 out of the unit u of pixels 20, clearances 69, 69 are defined on both right and left sides, in the figure, of the second signal storage/read-out CCD 64B having the meanders 68, 68 and being elongated from the second interval s2 to the third interval s3. In the eighth uppermost pixel 20 out of the unit u of eight pixels 20 arrayed vertically, clearances 69, 69 are defined on the left side of the second signal storage/read-out CCD 64B and on the right side of the eighth signal storage/read-out CCDs 64H, as viewed in the figure.

Figure 21:
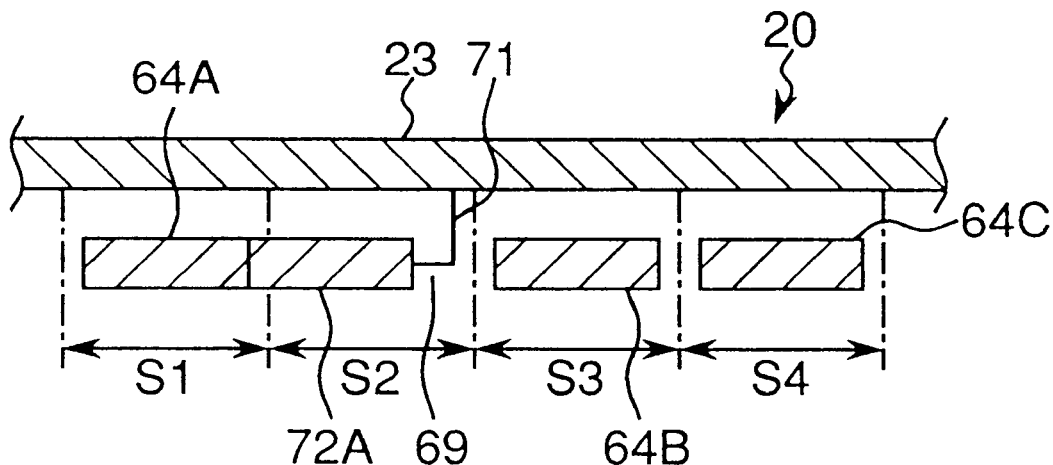
FIG. 21 is a partly enlarged sectional view taken along the line XXI—XXI of FIG. 20.

In the first pixel 20 out of one unit u of pixel 20, an electrically conductive portion 71 protruding from the sensor 23 to the rear surface side is provided in the upper side clearance 69 as shown in FIG. 21. Also, in this clearance 69, a first switching charge storage 72A protruding laterally from one of the charge storages 55 of the first signal storage/read-out CCD 64A is provided, and the electrically conductive portion 71 is connected to this first switching charge storage 72A.

In a clearance 69 on the lower side of the uppermost pixel 20 out of this unit u of pixels 20, a second switching charge storage 72B protruding laterally from one of the charge storages 55 of the second signal storage/read-out CCD 64B is provided. To this second switching charge storage 72B, a signal discharge line 31 (shown only in FIG. 20) is connected as in the first embodiment, and the signal discharge line 31 is connected to a brightness monitoring means via a monitor line, a monitor CCD, an amplifier, and an A/D converter.

Similarly, in the second to eighth signal storage/read-out CCDs 64B to 64H of the unit u of pixels 20, a first switching charge storage 72A is provided at the upper side clearance 69 of each pixel 20, while a second switching charge storage 72B is provided at its lower side clearance 69, as viewed in FIG. 20.

Accordingly, with regard to the first to eighth signal storage/read-out CCDs 64A to 64H, first switching charge storages 72A provided to every eighth pixels 20 are connected to the sensors 23, while second switching charge storages 72B are provided to a pixel 20 that is one upper than the pixel 20 to which a first switching charge storage 72A is provided, as viewed in the figure.

During a monitoring operation, the first switching charge storage 72A is closed so that electric charges are transferred from the sensors 23 to the first to eighth signal storage/read-out CCDs 64A to 64H, while one charge storage 55 present between a charge storage 55 to which the first switching charge storage 72A is connected and another charge storage 55 to which the second switching charge storage 72B is connected (the charge storage 55 hatched in FIG. 20) is set to a higher voltage so that electric signals will not be transferred. Also, the second switching charge storage 72B is closed, by which an electric signal is outputted to the brightness detection means. In this state, charge storages 55 corresponding to the set of eight pixels 20 of any one of the first to eighth signal storage/read-out CCDs 64A to 64H are connected to the sensors 23 of the pixels 20. The first to eighth signal storage/read-out CCDs 64A to 64H have 11 charge storages per pixel 20, in which a total of 88 charge storages 55 are connected to the sensor 23 of each pixel 20 during an image sensing process. Out of these charge storages, such charge storages 55 hatched in FIG. 20 are set to higher voltage so that electric signals are not transferred, as described above. Therefore, electric signals generated in the sensor 23 of each pixel 20 corresponding to 87 frames of images are accumulated in the first to eighth signal storage/read-out CCDs 64A to 64H. In addition, during the monitoring, as the first to eighth signal storage/read-out CCDs 64A to 64H are actuated, the voltage to be applied to the MCP 65 of the MCP type II 60 is switched on and off synchronously with the actuation, by which the gating is effected. Also during the monitoring, the MCP 65 is gated so as to allow the electron flow to be reached on the photo-receptive area 21 for a period of $10^{-6}$ sec. every 1/30 second.

During the monitoring, when the brightness detection means has detected a change in brightness, the image sensing is started. In this image sensing process, the MCP 65 of the MCP type II 60 is gated in synchronization with the actuation of the first to eighth signal storage/read-out CCDs 64A to 64H. Also in the image sensing process, both the driving of the first to eighth signal storage/read-out CCDs 64A to 64H and the gating of the MCP 65 of the MCP type II 60 is performed at $10^{-6}$ second intervals.

For a signal read process after the image sensing is ended, the first switching means 72A is opened so that electric signals will not be transferred from the sensors 23 of the pixels 20 to the first to eighth signal storage/read-out CCDs 64A to 64H. Also, the gating of the MCP 65 is stopped. Further, the second switching means 72B is opened, while the charge storages 55 hatched in FIG. 20, which has been set to a high potential during the image sensing process, is set to the same potential as the other charge storages 55. In this process, in the first to eighth signal storage/read-out CCDs 64A to 64H, the charge storages 55 are connected in series from upper end to lower end side of the photo-receptive area 21, respectively.

In this state, the first to eighth signal storage/read-out CCDs 64A to 64H are actuated, so that electric signals stored in the charge storages 55 of the first to eighth signal storage/read-out CCDs 64A to 64H are transferred parallel and successively from upper to lower side, as indicated by arrow Y in the figure. Below the photo-receptive area 21 is provided a scanning CCD as in the first embodiment, and the electric signals are transferred from the charge storages 55 of the first to eighth signal storage/read-out CCDs 64A to 64H that are located at the lowermost place of the photo-receptive area 21 to the main memory via the scanning CCD, read CCD, amplifier, and A/D converter.

In the set-up procedure, the MCP 65 is gated so as to allow the electron flow to be reached on the photo-receptive area 21 for a period of $10^{-6}$ sec. every 1/30 second, while the set-up operation is carried out by confirming the image by the monitor display as in the first embodiment.

With the arrangement that an electron flow is irradiated without being transformed into light, like this fifth embodiment, since the sensors 23 involving collisions of electrons are subject to heavy deterioration, the time duration during which the sensors 23 are exposed to electron flow should be as short as possible. Since the time required for the image sensing is relatively short, the image sensor is not affected so much in terms of deterioration. Meanwhile, the monitoring and set-up operations would take a relatively long time, as compared with the time for image sensing. However, in the fifth embodiment, because the gating time intervals in the monitoring and set-up operations are set longer as described above, the image sensor 18 can be prolonged in life.

In addition, in this fifth embodiment, the first to eighth signal storage/read-out CCDs 64A to 64H may also be linear shaped.

Sixth Embodiment

Figure 22:
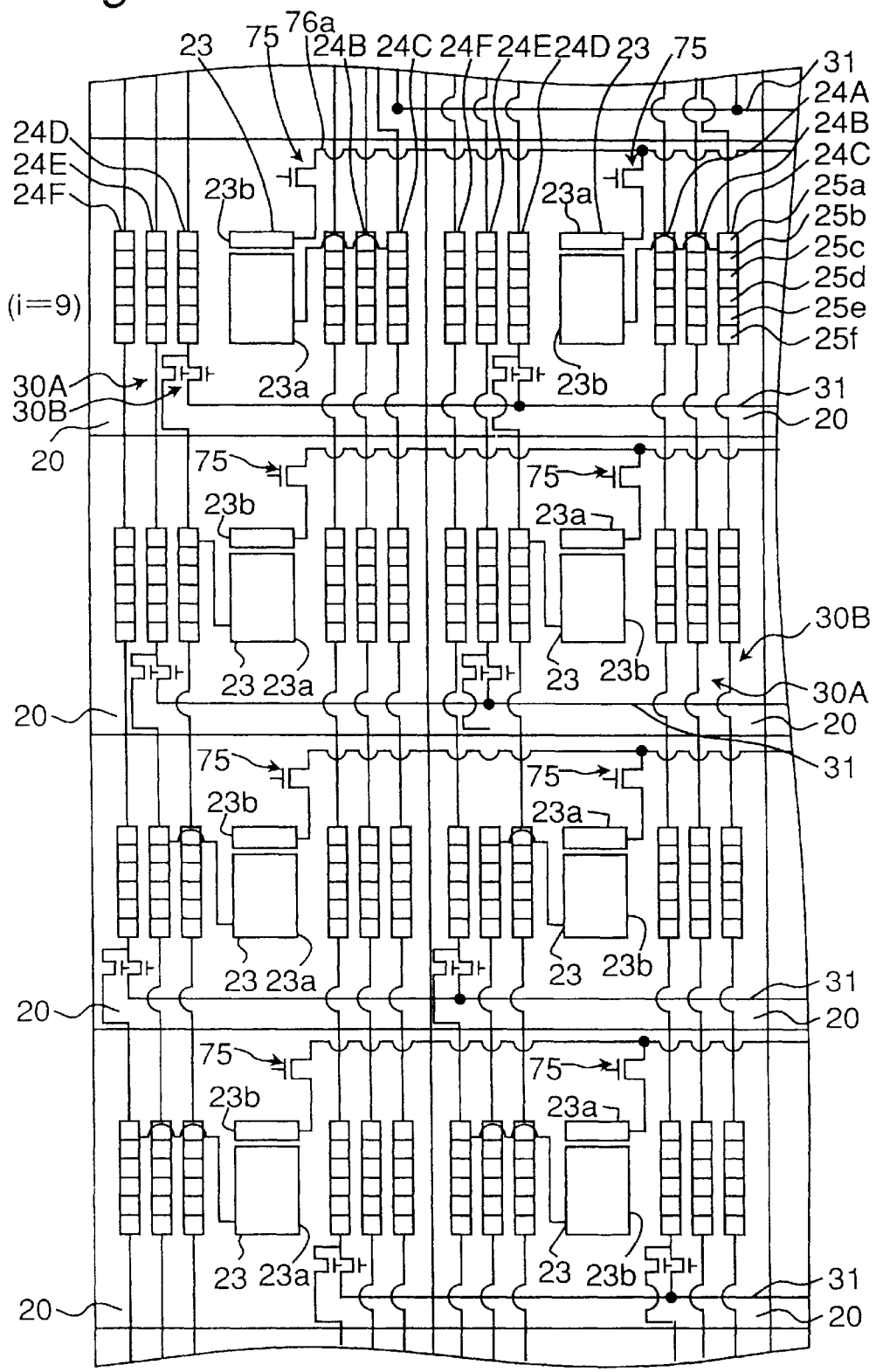
FIG. 22 is a partly enlarged view showing the photo-receptive area of an image sensing apparatus according to a sixth embodiment.

FIG. 22 shows a sixth embodiment of the present invention.

This sixth embodiment is similar in construction to the first embodiment, but differs in the arrangement of the sensors 23 of the pixels 20. That is, in the sixth embodiment, the sensor 23 of each pixel 20 is divided into a first portion 23a for use of image sensing and a second portion 23b for use of monitoring, where the second portion 23b is connected to a signal discharge line 76a on which a switching means 75 is interveniently provided. This signal discharge line 76a is connected to monitor lines in the units of a plurality of divisional areas of the photo-receptive area 21, as in the first embodiment, where the monitor lines are connected to the brightness monitor means via a monitor CCD, a read line, an amplifier, and an A/D converter. Meanwhile, a signal discharge line 76b connected to the first portion 23a is connected to any one of the first to sixth signal storage/read-out CCDs 24A to 24F.

In this sixth embodiment, since the brightness can be monitored by the output of the second portion 23b of the sensors 23, it is unnecessary to drive the first to sixth signal storage/read-out CCDs 24A to 24F during the monitoring operation.

It is not necessary for all the pixels 20 constituting the photo-receptive area 21 that the sensor 23 be provided in the divisional structure as described above. The sensor may be divided for only a required number of pixels placed at required intervals out of all the pixels arrayed in a matrix.

Figure 23:
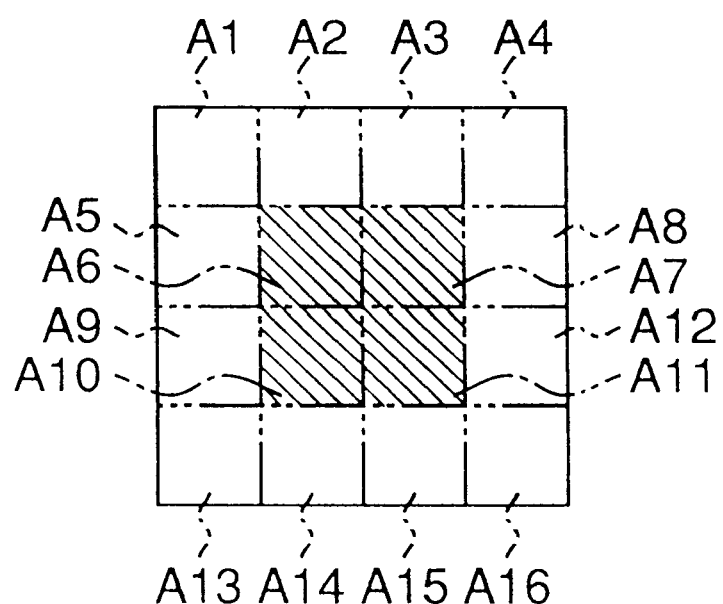
FIG. 23 is a schematic diagram showing an area at which brightness monitoring for trigger signal output is done.

Further, without monitoring the brightness of all the areas of the photo-receptive area 21, it is also possible, for example, that brightness is monitored by inputting the outputs of the signal discharge lines 76a of the pixels 20 belonging to the hatched center areas (areas A6, A7, A10, A11) of the photo-receptive area 21 out of the sixteen areas A1 to A16, as shown in FIG. 23, while brightness is not monitored for the peripheral areas (A1 to A5, A8, A9, A12 to A16).

Seventh Embodiment

FIGS. 24 to 31 show a seventh embodiment of the present invention.

Figure 24:
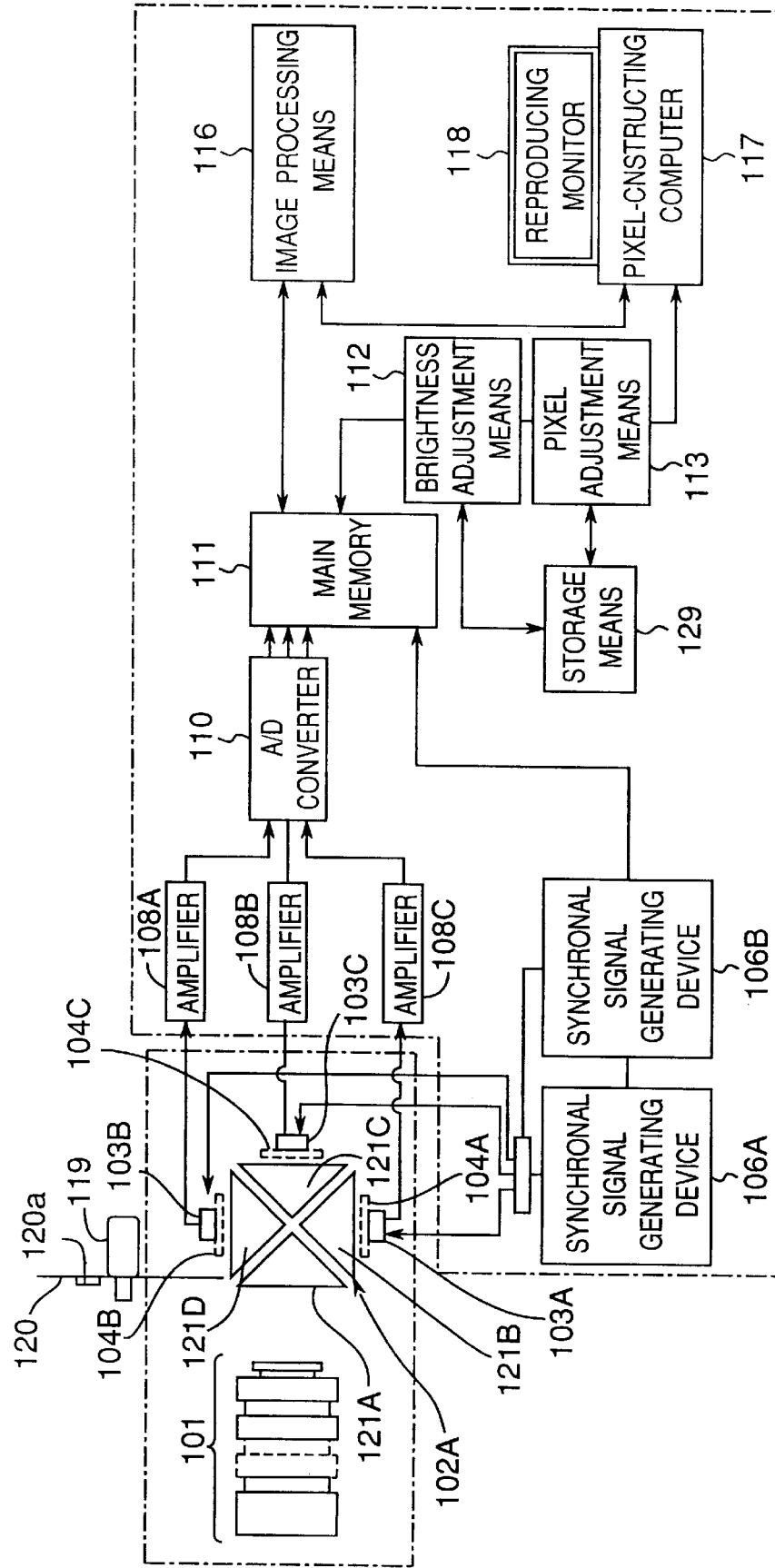
FIG. 24 is a schematic circuit diagram showing an image sensing apparatus according to the present invention.

In FIG. 24, reference numeral 101 denotes an image sensing lens system; 102A denotes beam split means; 103A, 103B, 103C denote image sensors; 104A, 104B, 104C denote MCP type II; 106A, 106B denote sync signal generating devices; 108A, 108B, 108C denote amplifiers; 110 denotes an A/D converter; 111 denotes a main memory; 112 denotes a brightness adjustment means; 113 denotes a pixel adjustment means; 116 denotes an image processing means; 117 denotes a pixel-constructing computer; 118 denotes a reproducing monitor; 119 denotes a semiconductor laser emitting device; 120 denotes a photo-receptive plate; and 129 denotes a second memory. It is noted that the image sensors 103A to 103C may alternatively be provided by the image sensors of the first to sixth embodiments, or by image sensors of other constructions.

Figure 25:
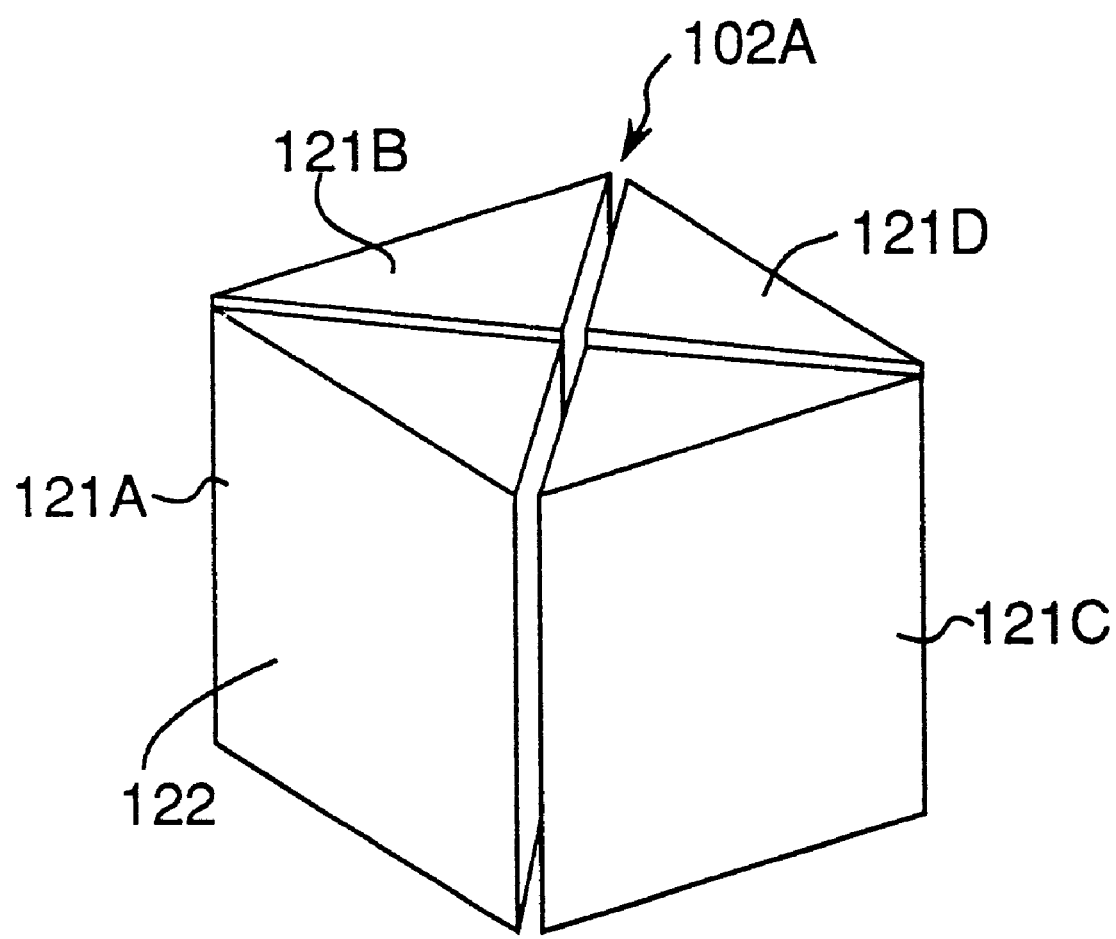
FIG. 25 is a perspective view showing a beam split means.

The beam split means 102A to 102C are replaceable with another beam split means 102B, 102C. These beam split means 102A to 102C are each implemented by a rectangular parallelepiped prism 122 made by coupling together four divisional prisms 121A, 121B, 121C, 121D of right-angled isosceles triangle shape as shown in FIG. 25.

Figure 26A:
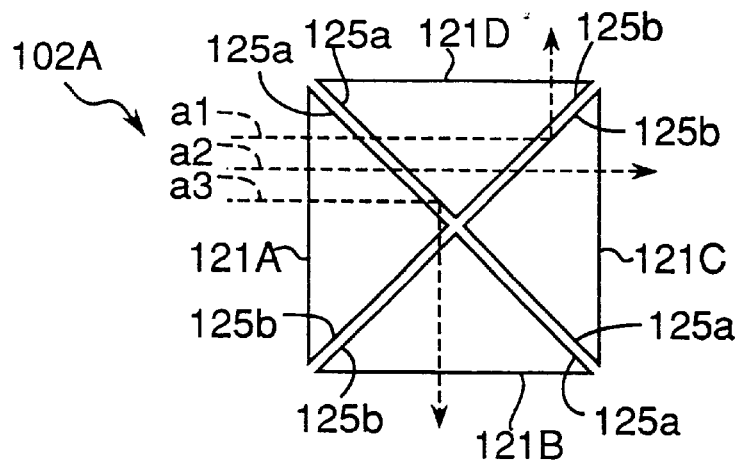
FIGS. 26A, 26B, and 26C are plan views showing beam split means.

FIG. 26A shows the beam split means 102A for color image sensing, which has red-light reflecting filters 125a and green-light reflecting filters 125b mounted on the combinational surfaces of the divisional prisms 121A to 121D, respectively. For this beam split means for color image sensing, it is necessary only to mount any two types of filters out of red-light reflecting filter, green-light reflecting filter, and blue-light reflecting filter.

Figure 26B:
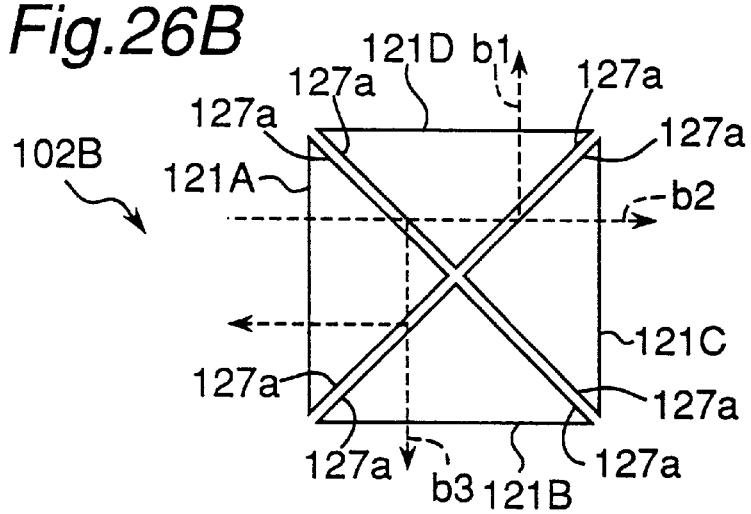

FIG. 26B shows the beam split means 102B (i.e., a high-resolution division beam splitter prism), in which a ½ reflecting film 127a that transmits ½ light of the incident beam and reflects ½ light of it is mounted on the combinational surfaces of the divisional prisms 121A to 121D of the beam split means 2B.

Figure 26C:
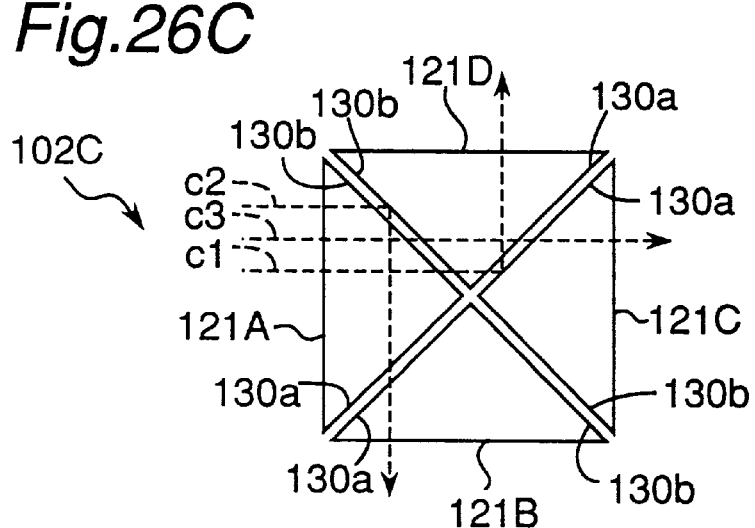

FIG. 26C shows the beam split means 102C (i.e., a non-color frequency component beam splitter prism), in which a first reflecting film 130a that reflects the light of 500 μm or lower frequencies and a second reflecting film 130b that reflects the light of 520 μm or higher frequencies are mounted on the combinational surfaces of the divisional prisms 121A to 121D of the beam split means 102C.

The image sensors 103A to 103C transform beams of light incident from the beam split means 102A to 102C into brightness signals of analog electric signals.

The MCP type II 104A to 104C are disposed on the front of the photo-receptive areas of the image sensors 103A to 103C, to intensify the light reached on the image sensors 103A to 103C by the avalanche effect.

The first sync signal generating device 106A adjusts the delay time of image sensing time of the image sensors 103A to 103C, as will be described later. The second sync signal generating device 106B adjusts the gating time and/or delay time of the MCP type II 104A to 104C.

The amplifiers 108A to 108C amplify analog electric signals outputted by the image sensors 103A to 103C, and the A/D converter 110 converts them into digital electric signals.

The main memory 111 stores signals outputted by the A/D converter 110.

The brightness adjustment means 112 corrects any differences in pixel brightness sensitivity among the three image sensors 103A to 103C, when the beam split means 102A to 102C are replaced, as will be described later.

The pixel adjustment means 113 corrects any positional mismatches relative to a plurality of pixels when the beam split means 102A to 102C are replaced.

Generally, when incident light is divided so as to be reached on a plurality of image sensors, it is necessary to perform an adjustment of positions that the beams of light derived from the same subject occupy on the image sensing surfaces of the image sensors (pixel adjustment). For this pixel adjustment, an image projected on a pixel of the nth row and the nth column of one image sensor needs to be adjusted so as to be projected on the pixel of the nth row and the nth column also in another image sensor. As the method of implementing this adjustment, available are one method in which the positions of the image sensors are fine adjusted (pixel adjustment by hardware) and another method in which the image projected on the nth row and the nth column of one image sensor is checked for being projected on the image of the n'th row and the n' column of another image sensor, by capturing an image of a subject for calibration, and pixel adjustment is carried out from the resulting relationship on the computer screen in the image-constructing process (pixel adjustment by software). The present invention is so arranged that pixel adjustment by software is carried out by using the pixel adjustment means 113 each time the beam split means 102A to 102C are replaced.

In this image sensing apparatus, replacing the beam split means 102A to 102C allows the image sensing process to be conducted under various conditions, where upon a replacement of them, it is necessary to make a calibration needed to determine correction constants and correction coefficients for brightness differences between the pixels of a plurality of image sensors, as well as a calibration needed to correct any mismatches of pixels. This calibration is also needed upon a replacement of the image sensors.

First explained is the calibration to determine brightness correction coefficients for correcting any differences in brightness sensitivity of the pixels of the image sensors. In this case, an image sensing process is conducted in the absence of light incidence, by putting a cap on the lens system 101 or other measures. The output of each pixel in this image sensing process is the correction constant R of brightness sensitivity.

Next, an image of the subject is captured, where the mean value of the results of subtracting the correction constant R from the outputs of the pixels is determined. This mean value may be derived from either the whole photo-receptive area of the image sensors or an area around the center of the photo-receptive area. Then, as shown in FIG. 27, an image sensing process is conducted with the brightness varied by fitting to the lens system 101 a device 146 which comprises a light source 140, a lens 141, scattering surfaces 142, 143, an adjustor means 145 for adjusting the brightness of the light source 140. In this process, each time the brightness is changed, the mean value of the results of subtracting the correction constant R from the outputs of the pixels is calculated. Then, an output of each pixel which results when the mean value has become equal to the mean brightness of the subject is determined. The correction coefficient S can be obtained from the following equation:

correction coefficient S=(mean brightness of subject)/{(output of each pixel resulting when the mean brightness of subject and mean brightness of measurement by the adjustor means 145 are coincident with each other)−correction constant R}

The brightness adjustment means 112 corrects any differences in brightness sensitivity between the pixels according to the correction constant R and the correction coefficient S.

Next explained is the calibration for correcting any mismatches of pixels.

Figure 28:
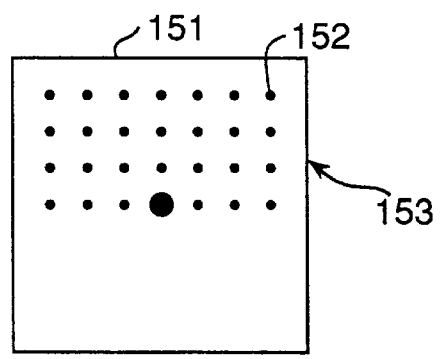
FIG. 28 is a front view showing a target plate.

As shown in FIG. 28, a target plate 153 having 256×256 black dots 152 provided on a white plate 151 is disposed in front of the lens system 101, in which state a laser beam is irradiated from the semiconductor laser emitting device 119 and an image sensing is effected when the reflected light is reflected on a small-area mirror portion 120a of the photo-receptive plate 120 provided around the semiconductor laser emitting device 19.

Figure 29A:
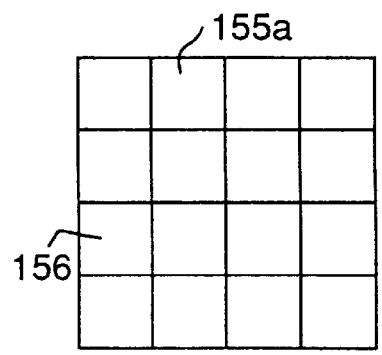
FIGS. 29A and 29B are schematic views for explaining pixel adjustment.
Figure 29B:
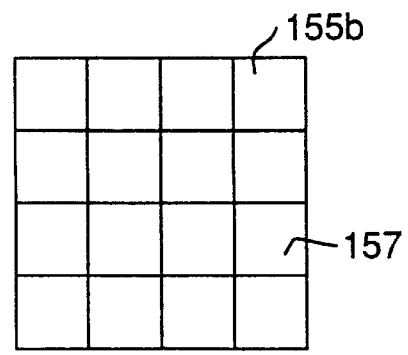

In this case, as shown in FIGS. 29A and 29B, with image sensing surfaces 155a, 155b of each image sensor divided respectively into sixteen areas 156, with respect to the coordinates (x, y) of a given black dot 152 on the target plate 153 in one area 156 of one image sensing surface 155a of one image sensor, coordinate differences ($\Delta x$, $\Delta y$) of a given dot in one area 157 of a image sensing surface 155b are approximated by a quadratic equation as shown below:

$$\Delta x = a_x \cdot x^2 + b_x \cdot y^2 + c_x \cdot xy + d_x \cdot x + e_x \cdot x + f_x$$

$$\Delta y = a_y \cdot x^2 + b_y \cdot y^2 + c_y \cdot xy + d_y \cdot y + e_y \cdot y + f_y$$

The values of $a_x$, $b_x$, $c_x$, $d_x$, $e_x$, $a_y$, $b_y$, $c_y$, $d_y$, $e_y$, $f_x$, $f_y$ in the above approximation are determined by the known least square method. The pixel adjustment means 113 performs a pixel adjustment process by using the values of $\Delta x$, $\Delta y$ determined by this least square method.

It is noted that the above $\Delta x$, $\Delta y$ may also be determined by the affine transformation, cubic function transformation, Fourier series, Bessel function, or the like.

When the beam split means 102A for color image sensing is used, the image sensing process is conducted with the gating time of the image sensors 103A to 103C synchronized with one another. In this case, incident light is split by the beam split means 102A into the three of red-light a1, green-light a2, and blue-light a3, and inputted to the image sensors 103A to 103C, as shown in FIG. 26A. Therefore, the color image sensing can be carried out without any loss of the intensity of light. It is noted that the pixel adjustment and brightness adjustment are effected, after the image sensing is once ended, and by the pixel adjustment means 113 and the brightness adjustment means 112 reading signals from the storage means 111. The storage means 129 has stored the correction constant R, the correction coefficient S, and the values of $\Delta x$, $\Delta y$ determined by calibration, and the pixel adjustment means 113 and the brightness adjustment means 112 perform the pixel adjustment and brightness adjustment according to those values.

When the image sensing process is carried out by the beam split means 102B (the high-resolution division beam splitter prism), incident light is divided into every ¼'s light and inputted to the image sensors 103A to 103C, as indicated by b1, b2, b3 in FIG. 26B. Therefore, if the image sensors 103A to 103C are fully synchronized with one another, a high-resolution monochrome image sensing three times as high as the number of pixels can be implemented. In this case, also, if the image sensing time of the image sensors 103A to 103C is delayed, continuous images in the units of three-frame sets can be obtained, where the velocity per time point as well as the acceleration can be known.

In addition, as shown in FIG. 30A, the image sensing time may be delayed by delaying the gating time of the image sensors 103A to 103C. Further, as shown in FIG. 30B, by synchronizing the gating time of the image sensors 103A to 103C with one another, the image sensing time may be delayed by the gating time of the MCP type II 104A to 104C.

When the beam split means 102C (the non-color frequency component beam splitter prism) is mounted, the image sensing process is conducted with the image sensing time of the image sensors 103A to 103C synchronized with one another. In this case, incident light is split into 520 μm or higher band light c1, 500 μm or lower band light c2, and 500 μm to 520 μm band light c3, as shown in FIG. 26C. As the scientific measurement more often involves measurement of light beams of different frequency bands, the beam split means 102C is useful for such cases.

The present invention is not limited to the above described embodiments, and changed or modified in various ways.

For example, in the first to fourth embodiments, it is also possible that the beams of light intensified by the MCP type II are entered to the image sensors.

Whereas six scanning CCDs 32A to 32F have been used to read the charges of the pixels 20 in the first embodiment, only one scanning CCD will do for the reading of electric signals.

Further, whereas the first and second switching means 30A, 30B are provided by MOS transistors in the first embodiment, it is also possible that the switching means are implemented by charge storages of CCDs as in the fifth embodiment.

Furthermore, the pixels may be in the form of an uneven stepped shape or a checkered lattice shape.

Also, in the fifth embodiment, the sensors 23 may be provided in the clearances 69.

Further, since the CCDs generally comprise a drain line for excluding residual charges, brightness may be monitored by inputting the outputs from the drain line to the brightness monitoring means.

Figure 31:
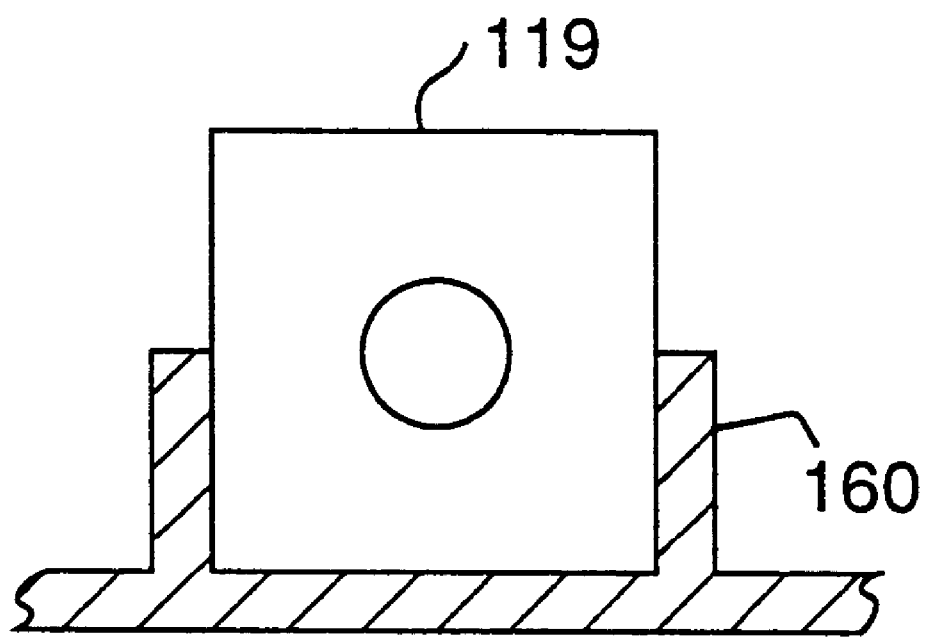
FIG. 31 is a partial sectional view showing the fitting portion of a semiconductor laser emitting device.
Figure 32:
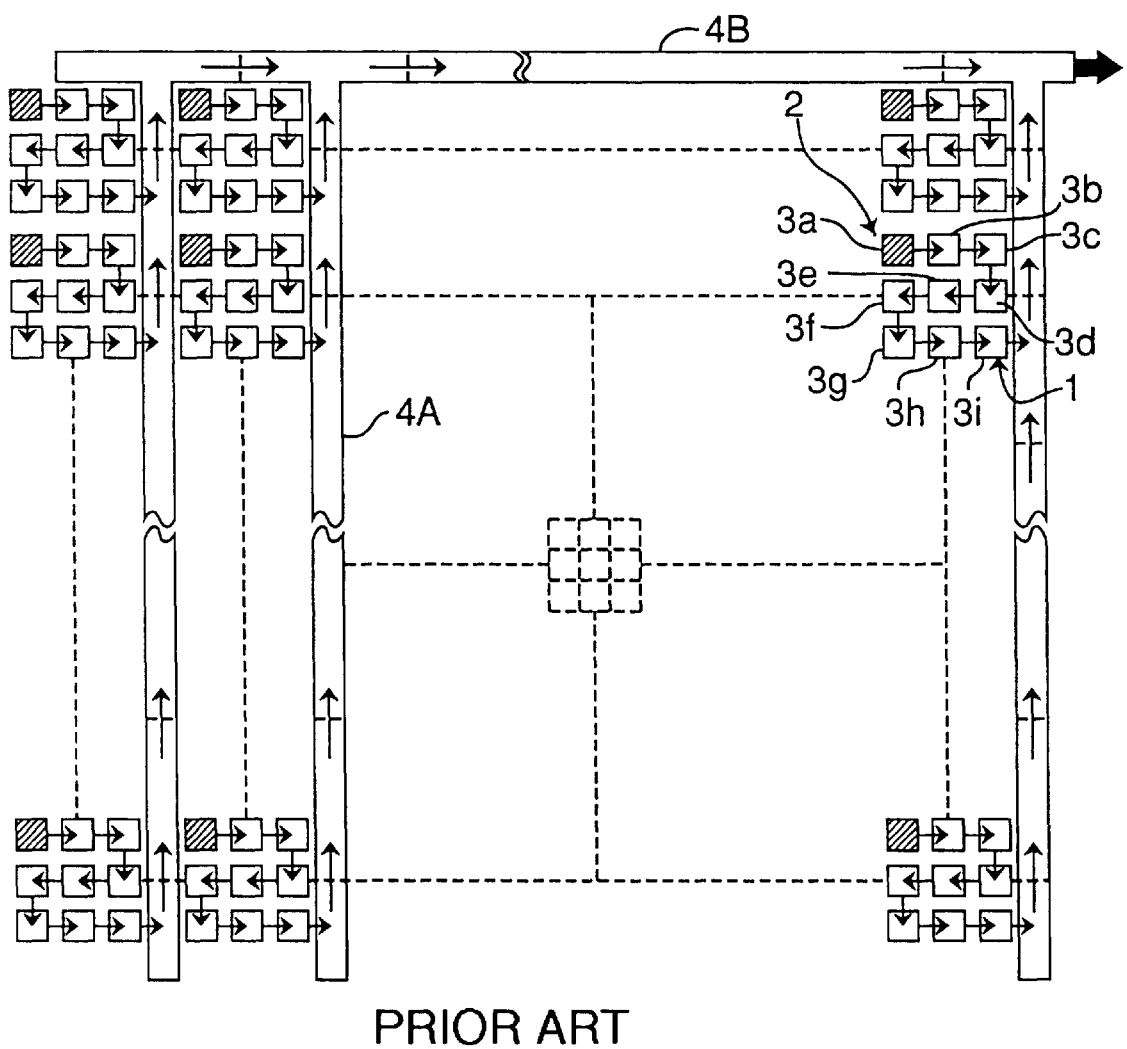
FIG. 32 is a schematic diagram showing an image sensing apparatus according to the prior art.
Figure 33:
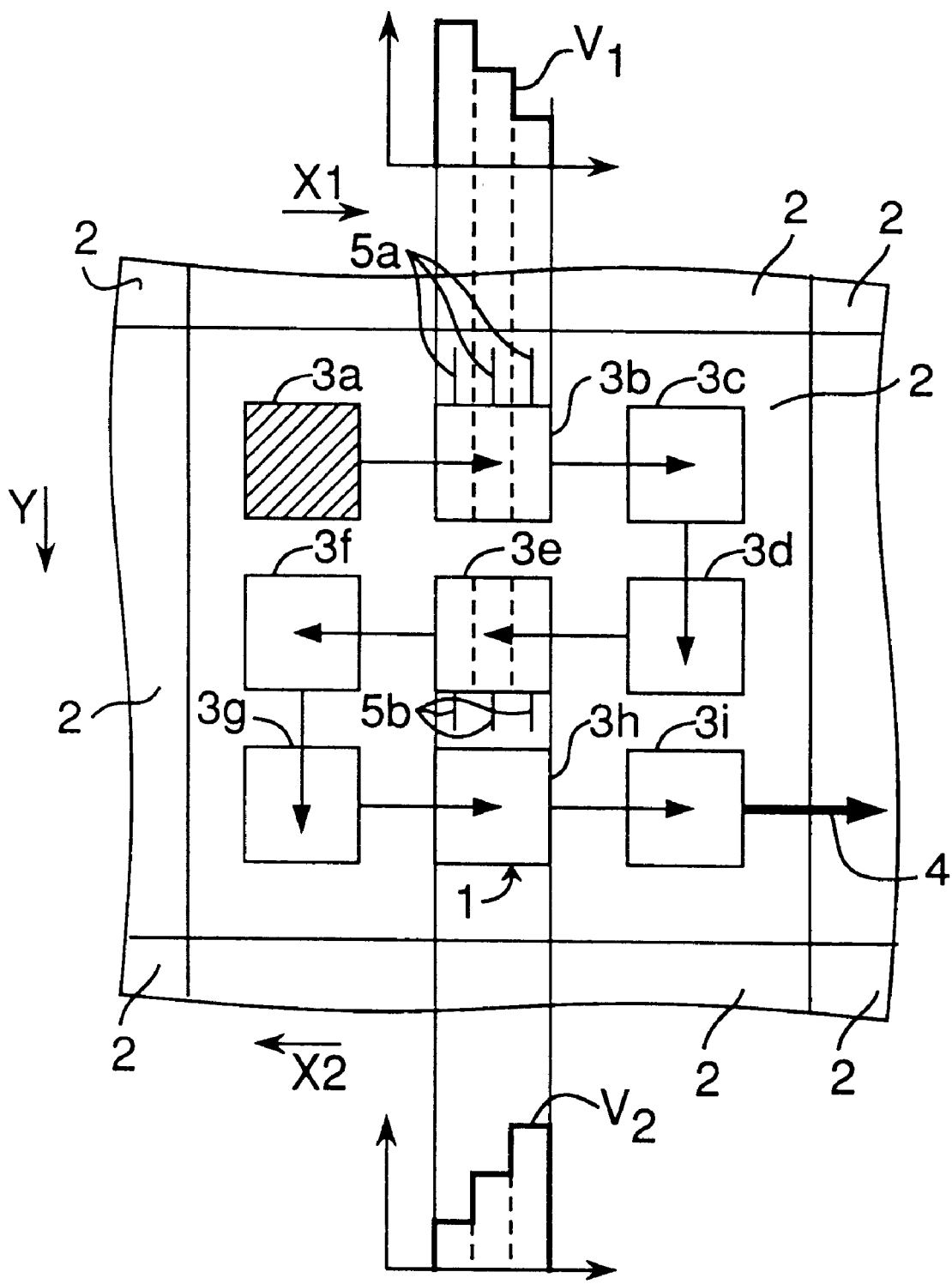
FIG. 33 is a partly enlarged view of FIG. 32.
Figure 34:
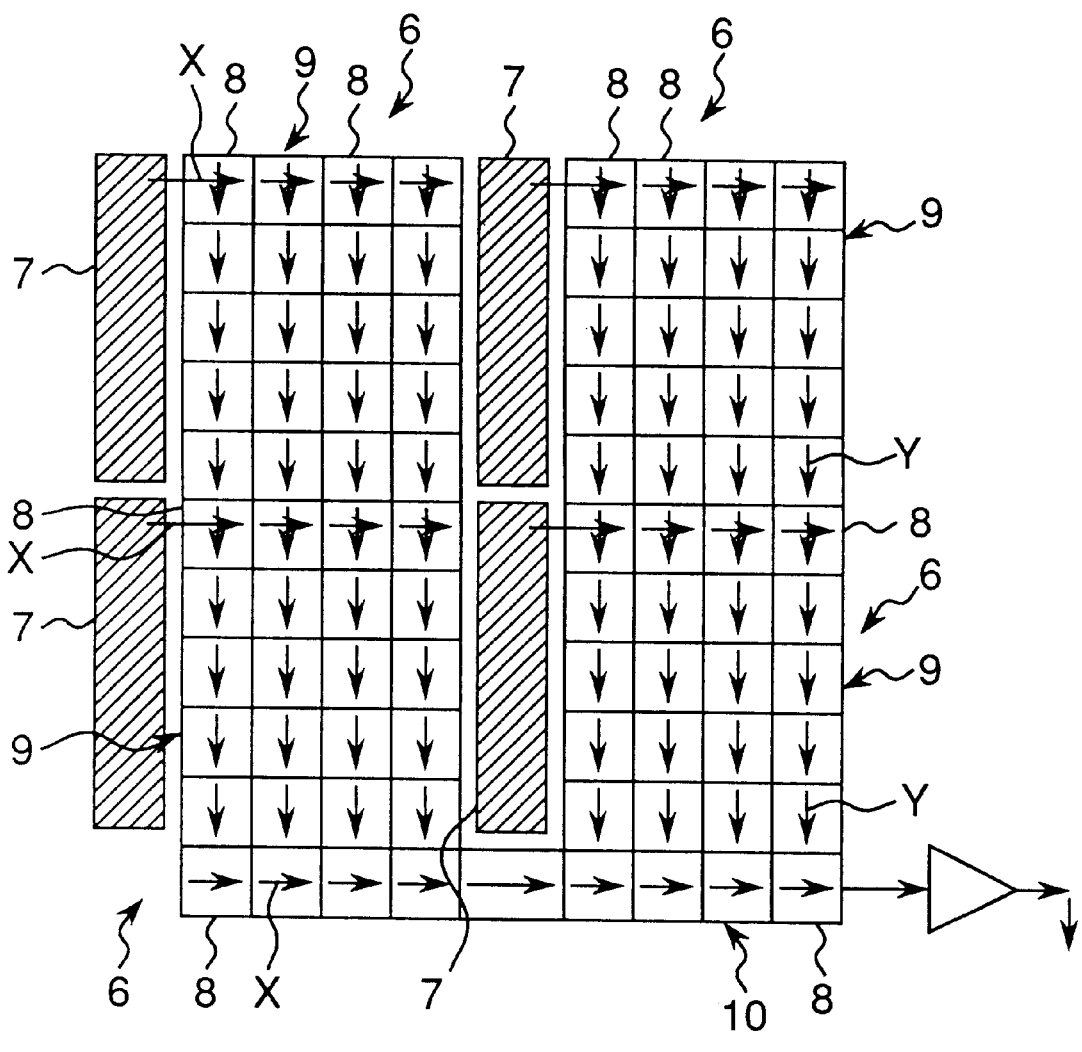
FIG. 34 is a schematic diagram showing another image sensing apparatus according to the prior art.
Figure 35:
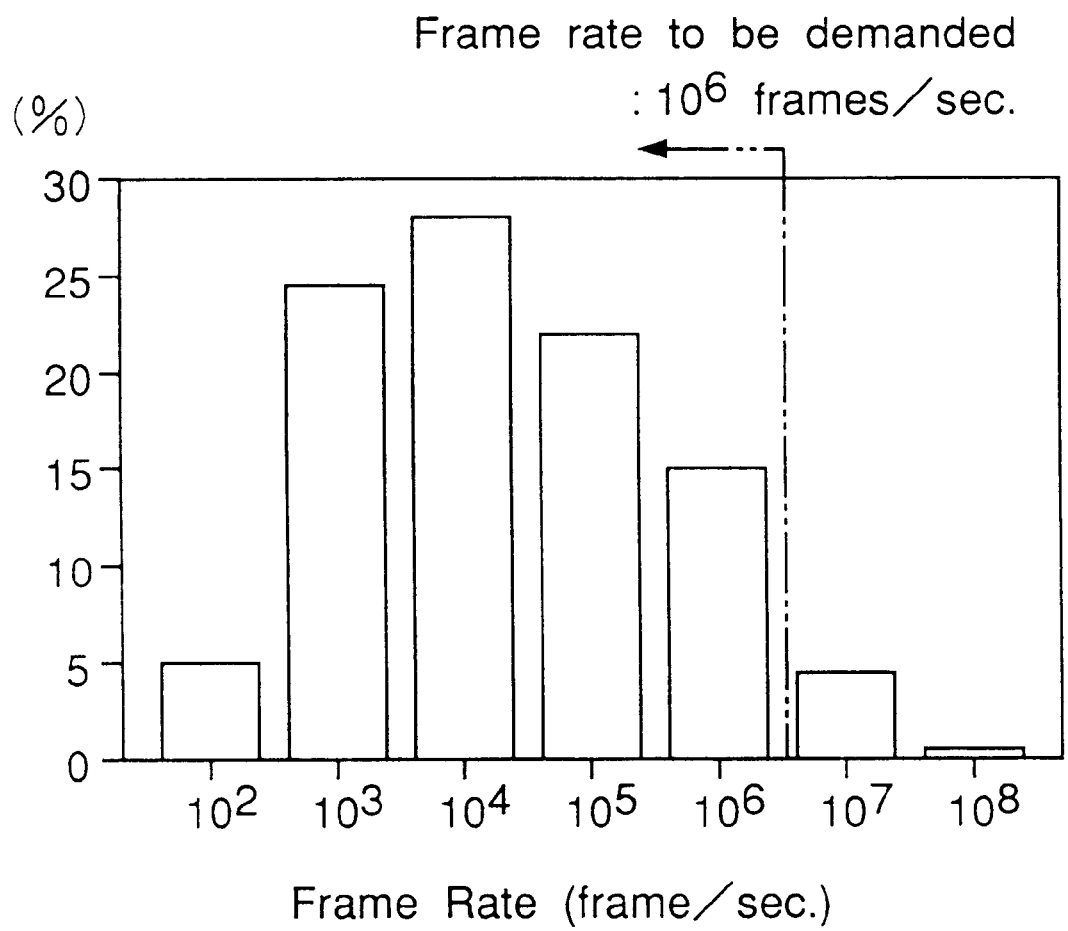
FIG. 35 is a diagram showing the relationship between frame rates of an image sensing apparatus and the ratio of users who demand the frame rates.

In the seventh embodiment, as shown in FIG. 31, the image sensing apparatus may be provided with a mounting member 160 which allows the semiconductor laser emitting means 119 to be removed.

Also in the seventh embodiment, the correction constant R, the correction coefficient S, and the like may be stored in any external storage means such as a floppy disk.

Further in the seventh embodiment, it may also be arranged that incident light of the image sensors 103A to 103C can be finely adjusted in the direction of optical axis. Whereas the image forming positions of the individual image sensors may be mismatched in an image sensing process in which the incident light is split into wider frequency bands, such as into ultraviolet region, visible region, and infrared region, fine adjustment can be made by adjusting the positions of the image sensors 103A to 103C in the direction of optical axis.

What is claimed is:

1. An image sensing apparatus comprising an image sensor which comprises:
   a plurality of pixels forming a photo-receptive area;
   a sensor provided on each pixels, the sensor generating an electric signal in response to a brightness of incident light;
   signal storage/read-out CCDs connected to the sensors, respectively, the signal storage/read-out CCDs each comprising a plurality of charge storages and being elongated over two or more of the plurality of pixels in such a way that a plurality of the linear shaped signal storage/read-out CCDs are arranged parallel within a width of each pixel,
   wherein during an image sensing process, electric signals generated in the sensors of the pixels are transferred parallel in one direction by the plurality of signal storage/read-out CCDs, by which the electric signals generated in the sensors are stored in the charge storages of the signal storage/read-out CCDs, and
   wherein during a signal read process, the electric signals stored in the charge storages of the signal storage/read-out CCDs are transferred parallel in the same direction as in the image sensing process, by which the electric signals are read out of the photo receptive area;
   a brightness monitor device which monitors brightness of incident light which will be reached on an entire area or partial area of the photo-receptive area, and which outputs a detection signal when detecting that an abrupt change has occurred in the brightness; and
   a trigger signal generator device which, upon an input of a detection signal from the brightness monitor device, outputs to an image sensor a trigger signal for commanding a halt or start of image sensing concurrently with or a required time elapse after the input of the detection signal.

2. The image sensing apparatus according to claim 1, wherein the signal storage/read-out CCDs are placed on a surface other than a surface of the pixels on which the sensors are placed.

3. The image sensing apparatus according to claim 1, wherein the signal storage/read-out CCDs are partly formed into meanders.

4. The image sensing apparatus according to claim 1, further comprising a connection for delivering the electric signals generated in the sensors to the brightness monitor device, the connection being located within at least some part of the pixels constituting the photo-receptive area of the image sensor.

5. The image sensing apparatus according to claim 4, wherein the connection for delivering electric signals, the connection being located within pixels, is implemented by dividing the sensor into a first portion and a second portion, and by connecting the first portion to the signal storage/read-out CCDs and connecting the second portion to the brightness monitoring means.

6. An image sensing apparatus of a tri-plate type in which light is split by a beam splitter prism assembly, comprising:
   three image sensors;
   a plurality of beam splitter prism assemblies, comprising at least two of a color component beam splitter prism assembly, a non-color frequency component beam splitter prism assembly, and a high-resolution division beam splitter prism assembly, and each comprising a plurality of assembled prisms that in combination are capable of directing light to said image sensors;
   said assembled prisms of said color component beam splitter prism assembly having two types of filters of a red-light reflecting filter, a blue-light reflecting filter, and a green-light reflecting filter on surfaces thereof;
   said assembled prisms of said non-color frequency component beam splitter prism assembly having filters that reflect beams of light of predetermined non-color frequency bands of the incident light on surfaces thereof;
   said assembled prisms of said high-resolution division beam splitter assembly having filters that transmit ½ of the incident light and reflect ½ of the incident light on surfaces thereof;
   each of said beam splitter prism assemblies being interchangeably mountable in said image sensing apparatus to direct light to said image sensing apparatus, so that each directs light to said image sensors according to predetermined splitting properties when mounted in said image sensing apparatus;

said image sensing apparatus outputting image signals corresponding to said predetermined splitting properties depending on the mounted one of said plurality of beam splitter prism assemblies, and said image sensing apparatus changing said image signals when the mounted one of said plurality of beam splitter prism assemblies is changed.

7. The image sensing apparatus according to claim 6, further comprising a first synchronization device for adjusting one of image sensing time or image sensing delay time of the image sensors depending on the mounted one of said plurality of beam splitter prism assemblies.

8. The image sensing apparatus according to claim 6, further comprising a light intensifying device provided in front of photo-receptive areas of each of the image sensors, and a second synchronization device for adjusting at least one of gating time and delay time of each light intensifying device.

* * * * *